(12) United States Patent
Ling et al.

(10) Patent No.: US 12,540,128 B2
(45) Date of Patent: Feb. 3, 2026

(54) SUBSTITUTED PYRIDAZINONES AS HERBICIDES

(71) Applicant: SYNGENTA CROP PROTECTION AG, Basel (CH)

(72) Inventors: Kenneth Bruce Ling, Bracknell (GB); Christopher John Mathews, Bracknell (GB); Stephen Edward Shanahan, Bracknell (GB); Christiana Kitsiou, Bracknell (GB); Peter Timothy Seden, Bracknell (GB); John Finney, Bracknell (GB); Valerie Druais-Lefevre, Bracknell (GB)

(73) Assignee: SYNGENTA CROP PROTECTION AG, Basel (CH)

( * ) Notice: Subject to any disclaimer, the term of this patent is extended or adjusted under 35 U.S.C. 154(b) by 929 days.

(21) Appl. No.: 17/627,530

(22) PCT Filed: Jul. 17, 2020

(86) PCT No.: PCT/EP2020/070243
§ 371 (c)(1),
(2) Date: Jan. 14, 2022

(87) PCT Pub. No.: WO2021/009335
PCT Pub. Date: Jan. 21, 2021

(65) Prior Publication Data
US 2022/0281837 A1    Sep. 8, 2022

(30) Foreign Application Priority Data
Jul. 18, 2019 (GB) ...................... 1910291

(51) Int. Cl.
| | | |
|---|---|---|
| *C07D 401/10* | (2006.01) | |
| *A01N 43/58* | (2006.01) | |
| *A01N 43/647* | (2006.01) | |
| *A01N 43/76* | (2006.01) | |
| *A01N 43/78* | (2006.01) | |
| *A01N 43/80* | (2006.01) | |
| *A01N 43/90* | (2006.01) | |
| *C07D 237/16* | (2006.01) | |
| *C07D 403/10* | (2006.01) | |
| *C07D 405/10* | (2006.01) | |
| *C07D 409/10* | (2006.01) | |
| *C07D 413/10* | (2006.01) | |
| *C07D 417/10* | (2006.01) | |

(52) U.S. Cl.
CPC ............ *C07D 401/10* (2013.01); *A01N 43/58* (2013.01); *A01N 43/647* (2013.01); *A01N 43/76* (2013.01); *A01N 43/78* (2013.01); *A01N 43/80* (2013.01); *A01N 43/90* (2013.01); *C07D 237/16* (2013.01); *C07D 403/10* (2013.01); *C07D 405/10* (2013.01); *C07D 409/10* (2013.01); *C07D 413/10* (2013.01); *C07D 417/10* (2013.01)

(58) Field of Classification Search
CPC .. C07D 401/10; C07D 237/16; C07D 403/10; C07D 405/10
See application file for complete search history.

(56) References Cited

U.S. PATENT DOCUMENTS

| | | |
|---|---|---|
| 11,330,821 B2 | 5/2022 | Shanahan et al. |
| 2011/0118118 A1 | 5/2011 | Lehr et al. |
| 2022/0281827 A1 | 9/2022 | Ling et al. |

FOREIGN PATENT DOCUMENTS

| | | |
|---|---|---|
| EP | 374753 A2 | 6/1990 |
| EP | 427529 A | 5/1991 |
| EP | 451878 A | 10/1991 |
| JP | 2018-515470 A | 6/2018 |
| JP | 2022-542015 A | 9/2022 |
| WO | 9307278 A1 | 4/1993 |
| WO | 9534656 A1 | 12/1995 |
| WO | 0234048 A1 | 5/2002 |
| WO | 03052073 A2 | 6/2003 |
| WO | 2009086041 A1 | 7/2009 |
| WO | 2011035878 A1 | 3/2011 |

(Continued)

OTHER PUBLICATIONS

Written Opinion of the International Searching Authority and International Search Report for PCT/EP2020/070243, mailed Sep. 23, 2020.

*Primary Examiner* — Adam C Milligan
*Assistant Examiner* — Karen Cheng
(74) *Attorney, Agent, or Firm* — BakerHostetler; Toni-Junell Herbert

(57) ABSTRACT

The present invention relates to herbicidal substituted phenyl-pyridazine-diones and substituted phenyl-pyridazinone derivatives of formula (I), as well as to processes and intermediates used for the preparation of such derivatives. The invention further extends to herbicidal compositions comprising such derivatives, as well as to the use of such compounds and compositions in controlling undesirable plant growth: in particular the use in controlling weeds, such as broad-leaved dicotyledonous weeds, in crops of useful plants.

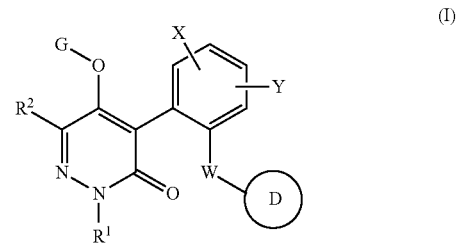

(I)

21 Claims, No Drawings

(56) References Cited

FOREIGN PATENT DOCUMENTS

| | | |
|---|---|---|
| WO | 2011045271 A1 | 4/2011 |
| WO | 2013160126 A1 | 10/2013 |
| WO | 2014119770 A1 | 8/2014 |
| WO | 2015168010 A1 | 11/2015 |
| WO | 2016008816 A1 | 1/2016 |
| WO | 2019137851 A1 | 7/2019 |
| WO | 2020114869 A1 | 6/2020 |

SUBSTITUTED PYRIDAZINONES AS HERBICIDES

CROSS-REFERENCE TO RELATED APPLICATIONS

This application is a 371 National Stage application of International Application No. PCT/EP2020/070243 filed Jul. 17, 2020, which claims the benefit of GB 1910291.2, filed Jul. 18, 2019, the entire contents of these applications are hereby incorporated by reference.

The present invention relates to herbicidal substituted phenyl-pyridazine-diones and substituted phenyl-pyridazinone derivatives of formula (I), as well as to processes and intermediates used for the preparation of such derivatives. The invention further extends to herbicidal compositions comprising such derivatives, as well as to the use of such compounds and compositions in controlling undesirable plant growth: in particular the use in controlling weeds, such as broad-leaved dicotyledonous weeds, in crops of useful plants.

Herbicidal pyridazinones are known from WO2009/086041. In addition, herbicidal 5/6 membered heterocyclyl-substituted pyridazinones are known from WO 2011/045271. Whilst WO2013/160126 describes indolyl-pyridazinone derivatives, which exhibit herbicidal activity.

The present invention is based on the finding substituted phenyl-pyridazine-diones and substituted phenyl-pyridazinone derivatives of formula (I), exhibit surprisingly good herbicidal activity.

Thus, in a first aspect there is provided a compound of formula (I)

or a salt or N-oxide thereof, wherein
$R^1$ is selected from the group consisting of $C_1$-$C_4$alkyl, $C_3$-$C_6$cycloalkyl, $C_3$-$C_6$alkoxy, $C_1$-$C_2$alkoxy-$C_1$-$C_2$alkyl-, $C_2$-$C_4$alkenyl, $C_1$-$C_4$haloalkyl, cyano-$C_1$-$C_4$alkyl, $C_2$-$C_4$haloalkenyl, $C_2$-$C_4$alkynyl and $C_2$-$C_4$haloalkynyl;
$R^2$ is selected from the group consisting of hydrogen, halogen, cyano, $C_1$-$C_6$alkyl, $C_1$-$C_6$haloalkyl, $C_1$-$C_6$haloalkoxy, $C_1$-$C_3$haloalkoxy-$C_1$-$C_3$alkyl-, $C_1$-$C_6$alkoxy, $C_1$-$C_3$alkoxy-$C_1$-$C_3$alkyl-, $C_1$-$C_3$alkoxy-$C_1$-$C_3$alkoxy-$C_1$-$C_3$alkyl-, $C_3$-$C_6$cycloalkyl, $C_2$-$C_6$alkenyl, $C_2$-$C_6$ haloalkenyl, $C_2$-$C_6$alkynyl, $C_1$-$C_6$hydroxyalkyl-, $C_1$-$C_6$alkylcarbonyl-, —S(O)$_m$$C_1$-$C_6$alkyl, amino, $C_1$-$C_6$alkylamino, $C_1$-$C_6$dialkylamino, —C($C_1$-$C_3$alkyl)=N—O—$C_1$-$C_3$alkyl and $C_2$-$C_6$ haloalkynyl;
G is hydrogen, or C(O)R$^3$;
$R^3$ is selected from the group consisting of $C_1$-$C_6$alkyl, $C_2$-$C_6$alkenyl, $C_2$-$C_6$alkynyl, $C_1$-$C_6$alkyl-S—, $C_1$-$C_6$alkoxy, —NR$^4$R$^5$ and phenyl optionally substituted by one or more R$^6$;
each R$^4$ and R$^5$ are independently selected from the group consisting of hydrogen, $C_1$-$C_6$ alkyl, $C_1$-$C_6$ alkoxy, and $C_3$-$C_6$cycloalkyl, or R$^4$ and R$^5$ together can form a morpholinyl ring; and, R$^6$ is selected from the group consisting of halogen, cyano, nitro, $C_1$-$C_3$alkyl, $C_1$-$C_3$haloalkyl, $C_1$-$C_3$alkoxy and $C_1$-$C_3$haloalkoxy;
X and Y are each independently hydrogen, $C_1$-$C_3$alkyl, cyclopropyl, $C_1$-$C_3$alkoxy, $C_1$-$C_3$haloalkyl, $C_1$-$C_3$haloalkoxy, or halogen;
D is either a substituted or unsubstituted naphthalene ring system, or a substituted or unsubstituted 8-10 membered bicyclic saturated, partially saturated or unsaturated, heterocyclic ring system containing 1, 2, 3, or 4 heteroatoms independently selected from oxygen, nitrogen and sulphur, and wherein when D is substituted it is substituted on at least one ring carbon atom with R$^8$ and/or on at least one ring nitrogen atom by R$^9$;
each R$^8$ is independently oxygen, hydroxyl, halogen, cyano, $C_1$-$C_6$alkyl, $C_1$-$C_6$haloalkyl, $C_3$-$C_6$-cycloalkyl, $C_1$-$C_6$alkoxy, $C_1$-$C_6$haloalkoxy, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_2$-$C_6$alkenyl, $C_2$-$C_6$haloalkenyl, $C_2$-$C_6$alkynyl, $C_2$-$C_6$haloalkynyl, $C_1$-$C_6$hydroxyalkyl-, $C_1$-$C_6$alkylcarbonyl-, $C_1$-$C_6$haloalkylcarbonyl-, $C_3$-$C_6$cycloalkylcarbonyl-, $C_1$-$C_6$alkyl-S(O)$_m$—, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, —NR$^4$R$^5$, —C($C_1$-$C_3$alkyl)=N—O—$C_1$-$C_3$alkyl, —C(S)NH$_2$, $C_1$-$C_6$alkylaminothiocarbonyl-, di($C_1$-$C_6$alkyl)aminothiocarbonyl-, $C_3$-$C_6$-cycloalkylamino-thiocarbonyl-S(O)$_2$NH$_2$, —S(O)$_2$NHC(O)$C_1$-$C_3$alkyl, $C_1$-$C_6$alkylaminosulfonyl-, di($C_1$-$C_6$alkyl)aminosulfonyl-, $C_3$-$C_6$-cycloalkylaminosulfonyl-, —C(O)OH, —C(O)OC$_1$-$C_6$alkyl, —C(O)NHS—(O)$_2$$C_1$-$C_6$alkyl, —C(O)NR$^4$R$^5$, —NR$^4$C(O)NR$^4$R$^5$, $C_1$-$C_6$alkylcarbonyl($C_1$-$C_6$alkyl)amino-, $C_1$-$C_6$haloalkylcarbonylamino-, $C_1$-$C_6$haloalkylcarbonyl($C_1$-$C_6$alkyl)amino-, $C_1$-$C_6$alkoxycarbonylamino-, $C_1$-$C_6$alkoxycarbonyl($C_1$-$C_6$alkyl)amino-, $C_1$-$C_6$alkylsulfonylamino-, $C_1$-$C_6$alkylsulfonyl($C_1$-$C_6$alkyl)amino-, $C_1$-$C_6$haloalkylsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, $C_1$-$C_6$alkylaminocarbonylamino-, $C_1$-$C_6$alkylaminocarbonyl($C_1$-$C_6$alkyl)amino, di($C_1$-$C_6$alkyl)aminocarbonylamino-, $C_1$-$C_6$haloalkylaminocarbonylamino-, $C_1$-$C_6$haloalkylamino-carbonyl($C_1$-$C_6$alkyl)amino, di($C_1$-$C_6$haloalkyl)aminocarbonylamino-, di($C_1$-$C_6$haloalkyl)amino-carbonyl($C_1$-$C_6$alkyl)amino-, hydroxyamino-, hydroxy($C_1$-$C_6$alkyl)amino, $C_1$-$C_6$alkoxyamino, $C_1$-$C_6$alkoxy($C_1$-$C_6$alkyl)amino, $C_1$-$C_6$haloalkoxyamino, $C_1$-$C_6$haloalkoxy($C_1$-$C_6$alkyl)amino; or a ring system selected from the group consisting: of a phenyl ring, a 5-6-membered heteroaryl ring and a 3-6-membered heterocyclyl ring, wherein said ring system is substituted by 0 to 5 R$^{16}$;
m is an integer of 0, 1, or 2;
each R$^9$ is independently $C_1$-$C_6$alkyl, $C_1$-$C_6$haloalkyl, hydroxyl, $C_1$-$C_4$alkoxy, $C_1$-$C_4$alkylthio, $C_3$-$C_6$-cycloalkyl, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_1$-$C_6$hydroxyalkyl-, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, or a ring system selected from the group consisting of: a phenyl ring, a 5-6-membered heteroaryl ring and a 3-6-membered heterocyclyl ring, wherein said ring system is substituted by 0 to 5 R$^{16}$;

each $R^{16}$ is independently halogen, cyano, $C_1$-$C_6$alkyl, $C_1$-$C_6$haloalkyl, $C_1$-$C_6$alkoxy or $C_1$-$C_6$haloalkoxy; and, W is

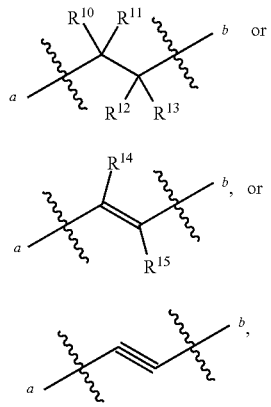

wherein

"a" denotes the point of attachment to the phenyl-pyridazinone/phenyl-pyridazine dione moiety, "b" denotes the point of attachment to ring D, $R^{10}$, $R^{12}$, $R^{14}$ and $R^{15}$ are each independently hydrogen, $C_1$-$C_3$alkyl, or $C_1$-$C_3$haloalkyl; or $R^{10}$ and $R^{12}$ together with the carbon atoms to which they are joined form a $C_3$-$C_6$ carbocyclic ring; and $R^{11}$ and $R^{13}$ are each independently hydrogen, halogen, $C_1$-$C_3$alkyl, or $C_1$-$C_3$haloalkyl, provided that when one of $R^{11}$ or $R^{13}$ is halogen, $C_1$-$C_3$alkyl or $C_1$-$C_3$ haloalkyl, the other is hydrogen.

Compounds of Formula (I) may contain asymmetric centres and may be present as a single enantiomer, pairs of enantiomers in any proportion or, where more than one asymmetric centre are present, contain diastereoisomers in all possible ratios. Typically one of the enantiomers has enhanced biological activity compared to the other possibilities.

Similarly, where there are di-substituted alkenes, these may be present in E or Z form or as mixtures of both in any proportion.

Furthermore, compounds of formula (I) may be in equilibrium with alternative tautomeric forms. For example, a compound of formula (I-i), i.e. a compound of formula (I) wherein $R^2$ is hydrogen and G is hydrogen, can be drawn in at least three tautomeric forms:

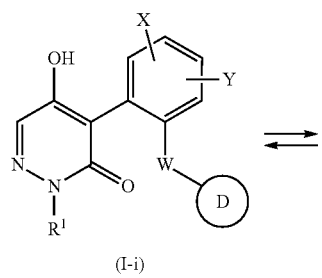

(I-i)

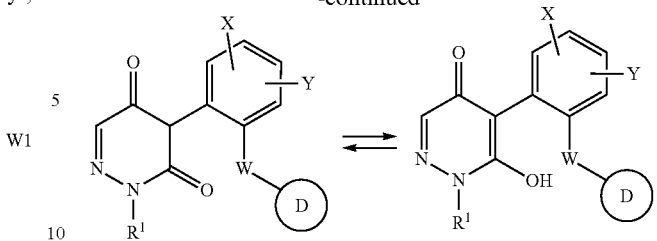

It should be appreciated that all tautomeric forms (single tautomer or mixtures thereof), racemic mixtures and single isomers are included within the scope of the present invention.

Each alkyl moiety either alone or as part of a larger group (such as alkoxy, alkylthio, alkoxycarbonyl, alkylcarbonyl, alkylaminocarbonyl, or dialkylaminocarbonyl, et al.) may be straight-chained or branched. Typically, the alkyl is, for example, methyl, ethyl, n-propyl, isopropyl, n-butyl, sec-butyl, isobutyl, tert-butyl, n-pentyl, neopentyl, or n-hexyl. The alkyl groups are generally $C_1$-$C_6$alkyl groups (except where already defined more narrowly), but are preferably $C_1$-$C_4$alkyl or $C_1$-$C_3$alkyl groups, and, more preferably, are $C_1$-$C_2$alkyl groups (such as methyl).

Alkenyl and alkynyl moieties can be in the form of straight or branched chains, and the alkenyl moieties, where appropriate, can be of either the (E)- or (Z)-configuration. The alkenyl or alkynyl moieties are typically $C_2$-$C_4$alkenyl or $C_2$-$C_4$alkynyl, more specifically vinyl, allyl, ethynyl, propargyl or prop-1-ynyl. Alkenyl and alkynyl moieties can contain one or more double and/or triple bonds in any combination; but preferably contain only one double bond (for alkenyl) or only one triple bond (for alkynyl).

Preferably, the term cycloalkyl refers to cyclopropyl, cyclobutyl, cyclopentyl or cyclohexyl.

In the context of the present specification the term "aryl" preferably means phenyl. The term "heteroaryl" as used herein means a monocyclic or bicyclic aromatic ring system containing at least one ring heteroatom. Preferably, monocyclic ring systems will contain 1, 2 or 3 ring heteroatoms, and bicyclic ring systems will contain 1, 2, 3 or 4 ring heteroatoms, each heteroatom being selected independently from nitrogen, oxygen and sulfur.

Typically a monocyclic heteroaryl ring is selected from the group consisting of furyl, thienyl, pyrrolyl, pyrazolyl, imidazolyl, 1,2,3-triazolyl, 1,2,4-triazolyl, oxazolyl, isoxazolyl, thiazolyl, isothiazolyl, 1,2,4-oxadiazolyl, 1,3,4-oxadiazolyl, 1,2,5-oxadiazolyl, 1,2,3-thiadiazolyl, 1,2,4-thiadiazolyl, 1,3,4-thiadiazolyl, 1,2,5-thiadiazolyl, pyridyl, pyrimidinyl, pyridazinyl, pyrazinyl, 1,2,3-triazinyl, 1,2,4-triazinyl, or 1,3,5-triazinyl ring.

Typically a bi-cyclic heteroaryl ring system is selected from the group consisting of an indolizine, indole, isoindole, 3-H-indole, benzofuran, benzothiophene, 1H-indazole, benzimidazole, benzthiazole, purine, 4H-quinolizine, quinoline, isoquinoline, cinnoline, phthalazine, quinoxaline, 1-8-naphthyridine, or pteridine ring system.

Heterocyclyl groups and heterocyclic rings (either alone or as part of a larger group, such as heterocyclyl-alkyl-) are ring systems containing at least one heteroatom and can be in mono- or bi-cyclic form, and may be partially saturated or fully saturated. Preferably, heterocyclyl groups will contain up to two heteroatoms which will preferably be chosen from nitrogen, oxygen and sulfur. Examples of heterocyclic groups include oxetanyl, thietanyl, azetidinyl and 7-oxabicyclo[2.2.1]hept-2-yl. Heterocyclyl groups containing a single oxygen atom as heteroatom are most preferred.

Halogen (or halo) encompasses fluorine, chlorine, bromine or iodine. The same correspondingly applies to halogen in the context of other definitions, such as haloalkyl or halophenyl.

Haloalkyl groups having a chain length of from 1 to 6 carbon atoms are, for example, fluoromethyl, difluoromethyl, trifluoromethyl, chloromethyl, dichloromethyl, trichloromethyl, 2,2,2-trifluoroethyl, 2-fluoroethyl, 2-chloroethyl, pentafluoroethyl, 1,1-difluoro-2,2,2-trichloroethyl, 2,2,3,3-tetrafluoroethyl and 2,2,2-trichloroethyl, heptafluoro-n-propyl and perfluoro-n-hexyl.

Alkoxy groups preferably have a chain length of from 1 to 6 carbon atoms. Alkoxy is, for example, methoxy, ethoxy, propoxy, isopropoxy, n-butoxy, isobutoxy, sec-butoxy ort-ert-butoxy or a pentyloxy or hexyloxy isomer, preferably methoxy and ethoxy. It should also be appreciated that two alkoxy substituents may be present on the same carbon atom.

Haloalkoxy is, for example, fluoromethoxy, difluoromethoxy, trifluoromethoxy, 2,2,2-trifluoroethoxy, 1,1,2,2-tetrafluoroethoxy, 2-fluoroethoxy, 2-chloroethoxy, 2,2-difluoroethoxy or 2,2,2-trichloroethoxy, preferably difluoromethoxy, 2-chloroethoxy or trifluoromethoxy.

$C_1$-$C_6$alkyl-S— (alkylthio) is, for example, methylthio, ethylthio, propylthio, isopropylthio, n-butylthio, isobutylthio, sec-butylthio or tert-butylthio, preferably methylthio or ethylthio.

$C_1$-$C_6$alkyl-S(O)— (alkylsulfinyl) is, for example, methylsulfinyl, ethylsulfinyl, propylsulfinyl, isopropylsulfinyl, n-butylsulfinyl, isobutylsulfinyl, sec-butylsulfinyl or tert-butylsulfinyl, preferably methylsulfinyl or ethylsulfinyl.

$C_1$-$C_6$alkyl-S(O)$_2$— (alkylsulfonyl) is, for example, methylsulfonyl, ethylsulfonyl, propylsulfonyl, isopropylsulfonyl, n-butylsulfonyl, isobutylsulfonyl, sec-butylsulfonyl or tert-butylsulfonyl, preferably methylsulfonyl or ethylsulfonyl.

The group Q

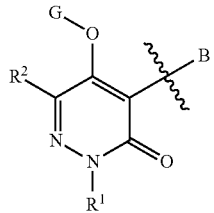

(Q) is referred to herein as the pyridazine dione/pyridazinone moiety, wherein B denotes the point of attachment to the rest of the molecule (i.e. to the optionally substituted phenyl-W-D moiety).

The present invention also includes agronomically acceptable salts that the compounds of formula (I) may form with amines (for example ammonia, dimethylamine and triethylamine), alkali metal and alkaline earth metal bases or quaternary ammonium bases. Among the alkali metal and alkaline earth metal hydroxides, oxides, alkoxides and hydrogen carbonates and carbonates used as salt formers, emphasis is to be given to the hydroxides, alkoxides, oxides and carbonates of lithium, sodium, potassium, magnesium and calcium, but especially those of sodium, magnesium and calcium. The corresponding trimethylsulfonium salt may also be used. The compounds of formula (I) according to the invention also include hydrates which may be formed during the salt formation.

Preferred values of $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, W, D, G, X, Y, Z, and m are as set out below, and a compound of formula (I) according to the invention may comprise any combination of said values. The skilled man will appreciate that values for any specified set of embodiments may combined with values for any other set of embodiments where such combinations are not mutually exclusive.

Preferably $R^1$ is selected from the group consisting of methyl, ethyl, propyl (in particular n- or c-propyl), propargyl or $C_1$haloalkyl. More preferably $R^1$ is methyl, ethyl, cyclopropyl, propargyl or $C_1$fluoroalkyl. More preferably still $R^1$ is methyl, ethyl, cyclopropyl or propargyl. Most preferably, $R^1$ is methyl.

Preferably $R^2$ is selected from the group consisting of hydrogen, halogen, $C_1$-$C_6$alkyl, $C_1$-$C_6$haloalkyl, $C_1$-$C_6$alkoxy, $C_1$-$C_3$alkoxy-$C_1$-$C_3$alkyl, $C_3$-$C_6$cycloalkyl, $C_2$-$C_6$ alkenyl, $C_2$-$C_6$ haloalkenyl, $C_2$-$C_6$ alkynyl and $C_2$-$C_6$ haloalkynyl. More preferably $R^2$ is selected from the group consisting of chloro, fluoro, methyl, ethyl, cyclopropyl, trifluoromethyl and methoxymethyl, more preferably still chloro, cyclopropyl, trifluoromethyl or methyl, most preferably chloro or methyl. In one set of embodiments of the present invention $R^2$ is hydrogen. In a further set of embodiments $R^2$ is cyclopropyl, in a third set of embodiments $R^2$ is methyl, in a fourth set of embodiments $R^2$ is trifluoromethyl, and in a fifth set of embodiments $R^2$ is chloro. As described herein, G may be hydrogen or —C(O)—$R^3$, and $R^3$ is selected from the group consisting of $C_1$-$C_6$alkyl, $C_2$-$C_6$alkenyl, $C_2$-$C_6$alkynyl, $C_1$-$C_6$alkyl-S—, $C_1$-$C_6$alkoxy, —NR$^4$R$^5$ and phenyl optionally substituted by one or more $R^6$. As defined herein, each $R^4$ and $R^5$ are independently selected from the group consisting of hydrogen, $C_1$-$C_6$ alkyl, $C_1$-$C_6$ alkoxy-, and $C_3$-$C_6$cycloalkyl; or they can together form a morpholinyl ring. Preferably $R^4$ and $R^5$ are each independently selected from the group consisting of methyl, ethyl, propyl, methoxy, ethoxy and propoxy. $R^6$ is selected from the group consisting of halogen, cyano, nitro, $C_1$-$C_3$alkyl, $C_1$-$C_3$haloalkyl, $C_1$-$C_3$alkoxy and $C_1$-$C_3$haloalkoxy. Preferably, $R^6$ is selected from the group consisting of halogen, methyl, ethyl, trifluoromethyl, methoxy and ethoxy.

Preferably $R^3$ is $C_1$-$C_4$ alkyl, $C_2$-$C_3$alkenyl, $C_2$-$C_3$alkynyl, $C_1$-$C_4$alkoxy, or —NR$^4$R$^5$ wherein $R^4$ and $R^5$ together form a morpholinyl ring. More preferably $R^3$ is isopropyl, t-butyl, methyl, ethyl, propargyl, methoxy, ethoxy, or tert-butoxy In one set of embodiments G is hydrogen or —C(O)—$R^3$, wherein $R^3$ is $C_1$-$C_4$ alkyl, $C_2$-$C_3$alkenyl, $C_2$-$C_3$alkynyl or —$C_1$-$C_3$alkoxy. In a further set of embodiments G is hydrogen or —C(O)—$R^3$, wherein $R^3$ is isopropyl, t-butyl, methyl, ethyl, propargyl or methoxy. However, it is particularly preferred that G is hydrogen, or —C(O)—$R^3$ wherein $R^3$ is isopropyl.

X is preferably hydrogen, halogen, or $C_1$haloalkyl, more preferably hydrogen, fluoro, chloro, bromo, or $C_1$fluoroalkyl and more preferably still, hydrogen, fluoro, chloro or trifluoromethyl. In one set of embodiments it is preferred that X is ortho (6-position) with respect to the pyridazinone/pyridazine-dione moiety (group Q). It is particularly preferred that X is fluoro, chloro or $C_1$-haloalkyl (in particular $C_1$fluoroalkyl) and is ortho (6-position) with respect to pyridazinone/pyridazine-dione moiety (group Q). Most preferably, X is fluoro and is ortho (6-position) with respect to pyridazinone/pyridazine-dione moiety.

Y is preferably hydrogen, $C_1$-$C_3$ alkyl, cyclopropyl, $C_1$-$C_3$haloalkyl, or halogen. More preferably Y is hydrogen, chloro, fluoro, or bromo.

In one set of embodiments it is preferred that Y is ortho (3-position) with respect to the —W-D moiety. In a further set of embodiments, Y is para with respect to the pyridazinone/pyridazine-dione moiety (group Q).

It is particularly preferred that Y is ortho (3-position) with respect to the —W-D moiety and is halogen, in particular chloro or fluoro; more preferably chloro.

In one particularly preferred set of embodiments, X is fluoro and is ortho (6-position) with respect to pyridazinone/pyridazine-dione moiety and Y is chloro and ortho (3-position) with respect to the —W-D moiety.

As described herein, D is a substituted or unsubstituted naphthalene ring system or a substituted or unsubstituted 8-10-membered bicyclic saturated, partially saturated or unsaturated, heterocyclic ring system containing 1, 2, 3, or 4 heteroatoms independently selected from oxygen, nitrogen and sulphur, and wherein when D is a substituted it is substituted on at least one ring carbon atom with $R^8$ and/or, when appropriate on a ring nitrogen atom with $R^9$. In one set of preferred embodiments, ring system D is linked to the rest of the molecule through a ring carbon atom.

Preferably D is a substituted or unsubstituted naphthalene ring system or is a substituted or unsubstituted 8-10-membered bicyclic heterocyclic ring containing 1, 2, 3, or 4 heteroatoms independently selected from oxygen, nitrogen and sulphur. More preferably D is a substituted (with at least one $R^8$ and/or $R^9$, as described herein) or unsubstituted naphthalene, indolizine, indole, iso-indole, indoline, isoindoline, 3-H-indole, benzofuran, benzothiophene, 1H-indazole, benzimidazole, benzthiazole, benzoxazole, benzodioxole, purine, 4H-quinolizine, quinoline, isoquinoline, tetrahydroquinoline, cinnoline, phthalazine, quinoxaline, 1-8-naphthyridine, pteridine, 1H-pyrrolo[2,3-b]pyridine, imidazo[1,2-a]pyrazine or 1H-benzotriazole ring system.

Even more preferably D is a substituted (with at least one $R^8$ and/or $R^9$, as described herein) or unsubstituted naphthalene, indolizine, indole, iso-indole, 3-H-indole, benzofuran, benzothiophene, 1H-indazole, benzimidazole, benzthiazole, benzoxazole, purine, 4H-quinolizine, quinoline, isoquinoline, tetrahydroquinoline, cinnoline, phthalazine, quinoxaline, 1-8-naphthyridine, or pteridine ring system.

More preferably in such embodiments, D is a substituted (as described herein) or unsubstituted naphthalene, quinoline, tetrahydroquinoline, indole, or benzoxazole ring.

Preferably, each $R^8$ is independently oxygen, hydroxyl, halogen, cyano, $C_1$-$C_6$alkyl, $C_1$-$C_6$haloalkyl, $C_3$-$C_6$-cycloalkyl, $C_1$-$C_6$alkoxy, $C_1$-$C_6$haloalkoxy, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_2$-$C_6$alkenyl, $C_2$-$C_6$haloalkenyl, $C_2$-$C_6$alkynyl, $C_2$-$C_6$ haloalkynyl, $C_1$-$C_6$hydroxyalkyl-, $C_1$-$C_6$alkylcarbonyl-, $C_1$-$C_6$haloalkylcarbonyl-, $C_3$-$C_6$cycloalkylcarbonyl-, $C_1$-$C_6$alkyl-S(O)$_m$—, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, —NR$^4$R$^5$, —C($C_1$-$C_3$alkyl)=N—O—$C_1$-$C_3$alkyl, —C(S)NH$_2$, $C_1$-$C_6$alkylaminothiocarbonyl-, di($C_1$-$C_6$alkyl)aminothiocarbonyl-, $C_3$-$C_6$-cycloalkylamino-thiocarbonyl-S(O)$_2$NH$_2$, —S(O)$_2$NHC(O)$C_1$-$C_3$alkyl, $C_1$-$C_6$alkylaminosulfonyl-, di($C_1$-$C_4$alkyl)aminosulfonyl-, $C_3$-$C_6$-cycloalkylamino-sulfonyl-, —C(O)OH, —C(O)OC$_1$-$C_6$alkyl, —C(O)NHS—(O)$_2$$C_1$-$C_6$alkyl, —C(O)NR$^4$R$^5$, —NR$^4$C(O)NR$^4$R$^5$, $C_1$-$C_6$alkylcarbonyl($C_1$-$C_6$alkyl)amino-, $C_1$-$C_6$haloalkylcarbonylamino-, $C_1$-$C_6$haloalkylcarbonyl($C_1$-$C_6$alkyl)amino-, $C_1$-$C_6$alkoxycarbonylamino-, $C_1$-$C_6$alkoxycarbonyl($C_1$-$C_6$alkyl)amino-, $C_1$-$C_6$alkylsulfonylamino-, $C_1$-$C_6$alkylsulfonyl($C_1$-$C_6$alkyl)amino-, $C_1$-$C_6$haloalkylsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, $C_1$-$C_6$alkylaminocarbonylamino-, $C_1$-$C_6$alkylaminocarbonyl($C_1$-$C_6$alkyl)amino, di($C_1$-$C_6$alkyl)aminocarbonylamino-, $C_1$-$C_6$haloalkylaminocarbonylamino-, $C_1$-$C_6$haloalkylamino-carbonyl($C_1$-$C_6$alkyl)amino-, di($C_1$-$C_6$haloalkyl)aminocarbonylamino-, di($C_1$-$C_6$haloalkyl)amino-carbonyl($C_1$-$C_6$alkyl)amino-, hydroxyamino-, hydroxy($C_1$-$C_6$alkyl)amino, $C_1$-$C_6$alkoxyamino, $C_1$-$C_6$alkoxy($C_1$-$C_6$alkyl)amino, $C_1$-$C_6$haloalkoxyamino, $C_1$-$C_6$haloalkoxy($C_1$-$C_6$alkyl)amino;

More preferably each $R^8$ is independently oxygen, hydroxyl, halogen, cyano, $C_1$-$C_6$alkyl, $C_1$-$C_6$haloalkyl, $C_1$-$C_6$haloalkoxy, $C_1$-$C_3$haloalkoxy-$C_1$-$C_3$alkyl-, $C_1$-$C_6$alkoxy, $C_1$-$C_3$alkoxy-$C_1$-$C_3$alkyl, $C_1$-$C_3$alkoxy-$C_1$-$C_3$alkoxy-$C_1$-$C_3$alkyl-, $C_3$-$C_6$cycloalkyl, $C_2$-$C_6$ alkenyl, $C_2$-$C_6$ haloalkenyl, $C_2$-$C_6$ alkynyl, $C_1$-$C_6$hydroxyalkyl-, $C_1$-$C_6$alkylcarbonyl-, $C_1$-$C_6$alkyl-S(O)$_m$—, amino, $C_1$-$C_6$alkylamino, $C_1$-$C_6$dialkylamino, —C($C_1$-$C_3$alkyl)=N—O—$C_1$-$C_3$alkyl or $C_2$-$C_6$ haloalkynyl.

Even more preferably each $R^8$ is independently hydroxyl, halogen, $C_1$-$C_6$alkyl, $C_1$-$C_6$haloalkyl, $C_1$-$C_6$alkoxy. Even more preferably still each $R^8$ is independently $C_1$-$C_3$alkyl, $C_1$-$C_3$haloalkyl, chloro, fluoro, hydroxyl, or $C_1$-$C_3$alkoxy.

Preferably each $R^9$ is independently $C_1$-$C_4$alkyl, $C_1$-$C_4$haloalkyl, hydroxyl, $C_1$-$C_4$alkoxy, or $C_1$-$C_4$alkylthio. More preferably each $R^9$ is independently, $C_1$-$C_4$ alkyl, or $C_1$-$C_4$alkoxy. Even more preferably each $R^9$ is independently $C_1$-$C_4$ alkyl. Most preferably each $R^9$ is methyl.

m is an integer of 0, 1, or 2. Preferably, m is 0 or 2.

W acts as a linker moiety, linking ring system D to the rest of the molecule (i.e. to the phenyl-pyridazinone/phenyl-pyridazine dione moiety). Compounds of formula (I) wherein the linker is W1 and W3 are herbicidal, whereas compounds of formula (I) wherein the linker is W2 may be not only herbicidal, but also useful intermediates in the production of compounds of formula (I) bearing W1 linkers. Thus, in one set of embodiments, W is W1 or W3 (preferably W1), whereas in a second set of embodiments, W is W2.

Specific examples of W include —CH$_2$—CH$_2$—, and —CH═CH—, —C≡C—, cis

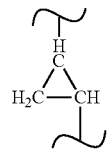

and trans

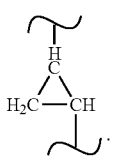

In preferred embodiments W is either —CH₂—CH₂—, —CH=CH—, or —C≡C—.

Preferably $R^{10}$, $R^{11}$, $R^{12}$ and $R^{13}$ are each independently selected from hydrogen or $C_1$-$C_3$ alkyl. In one set of embodiments $R^{10}$, $R^{11}$, $R^{12}$, and $R^{13}$ are all hydrogen.

Preferably $R^{14}$ and $R^{15}$ are each independently selected from hydrogen or $C_1$-$C_3$alkyl. In one set of embodiments $R^{14}$ and $R^{15}$ are both hydrogen.

In one preferred set of embodiments in a compound of formula (I), $R^1$ is methyl, ethyl, cyclopropyl, propargyl or $C_1$fluoroalkyl;
$R^2$ is chloro, cyclopropyl, trifluoromethyl or methyl;
G is hydrogen or —C(O)—$R^3$, wherein $R^3$ is isopropyl, t-butyl, methyl, ethyl, propargyl, methoxy, ethoxy, or tert-butoxy;
X is fluoro, chloro or $C_1$-haloalkyl and is ortho with respect to pyridazinone/pyridazine-dione moiety;
Y is hydrogen, chloro, fluoro, or bromo and ortho with respect to the —W-D moiety;
D is either a substituted or unsubstituted naphthalene ring system, or a substituted or unsubstituted 8-10 membered bicyclic saturated, partially saturated or unsaturated, heterocyclic ring system containing 1, 2, 3, or 4 heteroatoms independently selected from oxygen, nitrogen and sulphur, and wherein when D is substituted it is substituted on at least one ring carbon atom with $R^8$ and/or on at least one ring nitrogen atom by $R^9$;
each $R^8$ is independently hydroxyl, halogen, $C_1$-$C_6$alkyl, $C_1$-$C_6$haloalkyl or $C_1$-$C_6$alkoxy;
each $R^9$ is independently, $C_1$-$C_4$ alkyl, or $C_1$-$C_4$alkoxy;
W is W1; and
$R^{10}$, $R^{11}$, $R^{12}$, and $R^{13}$ are all hydrogen.

In an even more preferred set of embodiments in a compound of formula (I),
$R^1$ is methyl;
$R^2$ is methyl;
G is hydrogen or —C(O)—$R^3$, wherein $R^3$ is isopropyl, t-butyl, methyl, ethyl, propargyl, methoxy, ethoxy, or tert-butoxy;
X is fluoro and is ortho with respect to pyridazinone/pyridazine-dione moiety;
Y is chloro and ortho with respect to the —W-D moiety;
D is a substituted or unsubstituted naphthalene, indolizine, indole, iso-indole, indoline, isoindoline, 3-H-indole, benzofuran, benzothiophene, 1H-indazole, benzimidazole, benzthiazole, benzoxazole, benzodioxole, purine, 4H-quinolizine, quinoline, isoquinoline, tetrahydroquinoline, cinnoline, phthalazine, quinoxaline, 1-8-naphthyridine, pteridine, 1H-pyrrolo[2,3-b]pyridine, imidazo[1,2-a]pyrazine or 1H-benzotriazole ring system and wherein when D is substituted it is substituted on one or two ring carbon atoms with $R^8$ and/or on one ring nitrogen atom with $R^9$;
each $R^8$ is independently $C_1$-$C_3$alkyl, $C_1$-$C_3$haloalkyl, chloro, fluoro, hydroxyl, or $C_1$-$C_3$alkoxy;
$R^9$ is $C_1$-$C_4$ alkyl;
W is W1; and
$R^{10}$, $R^{11}$, $R^{12}$, and $R^{13}$ are all hydrogen.

Tables 1 to 4 below illustrate 2752 specific examples of compounds of formula (I) of the invention. Herbicidal compounds of the present invention. The numbering system used to describe the positions of X and Y is shown for the purposes of clarity only.

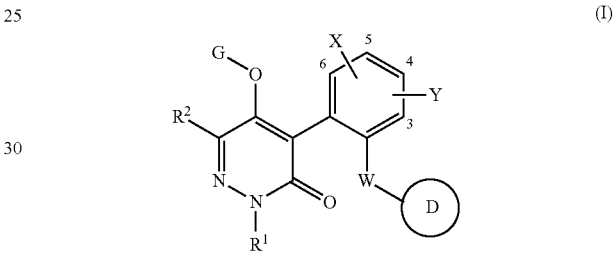

(I)

Table 1 provides 688 compounds A-1.001 to A-1.688 of formula (I) as shown above, wherein G is hydrogen, W is —CH₂—CH₂— and $R^1$, $R^2$, X, Y, D are as defined for Compound Nos. 1.001 to 1.688 respectively in Table A below.

TABLE A

Substituent definitions of $R^1$, $R^2$, X, Y and D for compounds of formula (I)

| Cmpd. No | $R^1$ | $R^2$ | X | Y | D |
|---|---|---|---|---|---|
| 1.001 | —Me | —Me | 6-F | 3-F | 1,2,3,4-tetrahydroquinolin-6-yl- |
| 1.002 | —Me | —Me | 6-F | 3-F | 1H-indol-4-yl- |
| 1.003 | —Me | —Me | 6-F | 3-F | 1H-indol-5-yl- |
| 1.004 | —Me | —Me | 6-F | 3-F | 1H-indol-6-yl- |
| 1.005 | —Me | —Me | 6-F | 3-F | 1-methylindol-4-yl- |
| 1.006 | —Me | —Me | 6-F | 3-F | 1-methylindol-5-yl- |
| 1.007 | —Me | —Me | 6-F | 3-F | 1-methylindol-6-yl- |
| 1.008 | —Me | —Me | 6-F | 3-F | 1-naphthyl- |
| 1.009 | —Me | —Me | 6-F | 3-F | 2-(trifluoromethyl)-4-quinolyl- |
| 1.010 | —Me | —Me | 6-F | 3-F | 2-ethyl-1,3-benzoxazol-6-yl- |
| 1.011 | —Me | —Me | 6-F | 3-F | 2-methyl-1,3-benzoxazol-6-yl- |
| 1.012 | —Me | —Me | 6-F | 3-F | 2-methyl-1,2,3,4-tetrahydroquinolin-6-yl- |
| 1.013 | —Me | —Me | 6-F | 3-F | 2-methyl-6-quinolyl- |
| 1.014 | —Me | —Me | 6-F | 3-F | 2-methyl-6-quinolyl- |
| 1.015 | —Me | —Me | 6-F | 3-F | 2-methyl-6-quinolyl- |
| 1.016 | —Me | —Me | 6-F | 3-F | 2-methyl-6-quinolyl- |
| 1.017 | —Me | —Me | 6-F | 3-F | 2-naphthyl- |
| 1.018 | —Me | —Me | 6-F | 3-F | 4-quinolyl- |
| 1.019 | —Me | —Me | 6-F | 3-Cl | 1,2,3,4-tetrahydroquinolin-6-yl- |
| 1.020 | —Me | —Me | 6-F | 3-Cl | 1H-indol-4-yl- |
| 1.021 | —Me | —Me | 6-F | 3-Cl | 1H-indol-5-yl- |
| 1.022 | —Me | —Me | 6-F | 3-Cl | 1H-indol-6-yl- |
| 1.023 | —Me | —Me | 6-F | 3-Cl | 1-methylindol-4-yl- |
| 1.024 | —Me | —Me | 6-F | 3-Cl | 1-methylindol-5-yl- |

TABLE A-continued

Substituent definitions of R¹, R², X, Y and D for compounds of formula (I)

| Cmpd. No | R¹ | R² | X | Y | D |
|---|---|---|---|---|---|
| 1.025 | —Me | —Me | 6-F | 3-Cl | 1-methylindol-6-yl- |
| 1.026 | —Me | —Me | 6-F | 3-Cl | 1-naphthyl- |
| 1.027 | —Me | —Me | 6-F | 3-Cl | 2-(trifluoromethyl)-4-quinolyl- |
| 1.028 | —Me | —Me | 6-F | 3-Cl | 2-ethyl-1,3-benzoxazol-6-yl- |
| 1.029 | —Me | —Me | 6-F | 3-Cl | 2-methyl-1,3-benzoxazol-6-yl- |
| 1.030 | —Me | —Me | 6-F | 3-Cl | 2-methyl-1,2,3,4-tetrahydroquinolin-6-yl- |
| 1.031 | —Me | —Me | 6-F | 3-Cl | 2-methyl-6-quinolyl- |
| 1.032 | —Me | —Me | 6-F | 3-Cl | 2-methyl-6-quinolyl- |
| 1.033 | —Me | —Me | 6-F | 3-Cl | 2-methyl-6-quinolyl- |
| 1.034 | —Me | —Me | 6-F | 3-Cl | 2-methyl-6-quinolyl- |
| 1.035 | —Me | —Me | 6-F | 3-Cl | 2-naphthyl- |
| 1.036 | —Me | —Me | 6-F | 3-Cl | 4-quinolyl- |
| 1.037 | —Me | —Me | 6-Cl | 3-F | 1,2,3,4-tetrahydroquinolin-6-yl- |
| 1.038 | —Me | —Me | 6-Cl | 3-F | 1H-indol-4-yl- |
| 1.039 | —Me | —Me | 6-Cl | 3-F | 1H-indol-5-yl- |
| 1.040 | —Me | —Me | 6-Cl | 3-F | 1H-indol-6-yl- |
| 1.041 | —Me | —Me | 6-Cl | 3-F | 1-methylindol-4-yl- |
| 1.042 | —Me | —Me | 6-Cl | 3-F | 1-methylindol-5-yl- |
| 1.043 | —Me | —Me | 6-Cl | 3-F | 1-methylindol-6-yl- |
| 1.044 | —Me | —Me | 6-Cl | 3-F | 1-naphthyl- |
| 1.045 | —Me | —Me | 6-Cl | 3-F | 2-(trifluoromethyl)-4-quinolyl- |
| 1.046 | —Me | —Me | 6-Cl | 3-F | 2-ethyl-1,3-benzoxazol-6-yl- |
| 1.047 | —Me | —Me | 6-Cl | 3-F | 2-methyl-1,3-benzoxazol-6-yl- |
| 1.048 | —Me | —Me | 6-Cl | 3-F | 2-methyl-1,2,3,4-tetrahydroquinolin-6-yl- |
| 1.049 | —Me | —Me | 6-Cl | 3-F | 2-methyl-6-quinolyl- |
| 1.050 | —Me | —Me | 6-Cl | 3-F | 2-methyl-6-quinolyl- |
| 1.051 | —Me | —Me | 6-Cl | 3-F | 2-methyl-6-quinolyl- |
| 1.052 | —Me | —Me | 6-Cl | 3-F | 2-methyl-6-quinolyl- |
| 1.053 | —Me | —Me | 6-Cl | 3-F | 2-naphthyl- |
| 1.054 | —Me | —Me | 6-Cl | 3-F | 4-quinolyl- |
| 1.055 | —Me | —Me | 6-Cl | 3-Cl | 1,2,3,4-tetrahydroquinolin-6-yl- |
| 1.056 | —Me | —Me | 6-Cl | 3-Cl | 1H-indol-4-yl- |
| 1.057 | —Me | —Me | 6-Cl | 3-Cl | 1H-indol-5-yl- |
| 1.058 | —Me | —Me | 6-Cl | 3-Cl | 1H-indol-6-yl- |
| 1.059 | —Me | —Me | 6-Cl | 3-Cl | 1-methylindol-4-yl- |
| 1.060 | —Me | —Me | 6-Cl | 3-Cl | 1-methylindol-5-yl- |
| 1.061 | —Me | —Me | 6-Cl | 3-Cl | 1-methylindol-6-yl- |
| 1.062 | —Me | —Me | 6-Cl | 3-Cl | 1-naphthyl- |
| 1.063 | —Me | —Me | 6-Cl | 3-Cl | 2-(trifluoromethyl)-4-quinolyl- |
| 1.064 | —Me | —Me | 6-Cl | 3-Cl | 2-ethyl-1,3-benzoxazol-6-yl- |
| 1.065 | —Me | —Me | 6-Cl | 3-Cl | 2-methyl-1,3-benzoxazol-6-yl- |
| 1.066 | —Me | —Me | 6-Cl | 3-Cl | 2-methyl-1,2,3,4-tetrahydroquinolin-6-yl- |
| 1.067 | —Me | —Me | 6-Cl | 3-Cl | 2-methyl-6-quinolyl- |
| 1.068 | —Me | —Me | 6-Cl | 3-Cl | 2-methyl-6-quinolyl- |
| 1.069 | —Me | —Me | 6-Cl | 3-Cl | 2-methyl-6-quinolyl- |
| 1.070 | —Me | —Me | 6-Cl | 3-Cl | 2-methyl-6-quinolyl- |
| 1.071 | —Me | —Me | 6-Cl | 3-Cl | 2-naphthyl- |
| 1.072 | —Me | —Me | 6-Cl | 3-Cl | 4-quinolyl- |
| 1.073 | —Me | —Cl | 6-F | 3-F | 1,2,3,4-tetrahydroquinolin-6-yl- |
| 1.074 | —Me | —Cl | 6-F | 3-F | 1H-indol-4-yl- |
| 1.075 | —Me | —Cl | 6-F | 3-F | 1H-indol-5-yl- |
| 1.076 | —Me | —Cl | 6-F | 3-F | 1H-indol-6-yl- |
| 1.077 | —Me | —Cl | 6-F | 3-F | 1-methylindol-4-yl- |
| 1.078 | —Me | —Cl | 6-F | 3-F | 1-methylindol-5-yl- |
| 1.079 | —Me | —Cl | 6-F | 3-F | 1-methylindol-6-yl- |
| 1.080 | —Me | —Cl | 6-F | 3-F | 1-naphthyl- |
| 1.081 | —Me | —Cl | 6-F | 3-F | 2-(trifluoromethyl)-4-quinolyl- |
| 1.082 | —Me | —Cl | 6-F | 3-F | 2-ethyl-1,3-benzoxazol-6-yl- |
| 1.083 | —Me | —Cl | 6-F | 3-F | 2-methyl-1,3-benzoxazol-6-yl- |
| 1.084 | —Me | —Cl | 6-F | 3-F | 2-methyl-1,2,3,4-tetrahydroquinolin-6-yl- |
| 1.085 | —Me | —Cl | 6-F | 3-F | 2-methyl-6-quinolyl- |
| 1.086 | —Me | —Cl | 6-F | 3-F | 2-methyl-6-quinolyl- |
| 1.087 | —Me | —Cl | 6-F | 3-F | 2-methyl-6-quinolyl- |
| 1.088 | —Me | —Cl | 6-F | 3-F | 2-methyl-6-quinolyl- |
| 1.089 | —Me | —Cl | 6-F | 3-F | 2-naphthyl- |
| 1.090 | —Me | —Cl | 6-F | 3-F | 4-quinolyl- |
| 1.091 | —Me | —Cl | 6-F | 3-Cl | 1,2,3,4-tetrahydroquinolin-6-yl- |
| 1.092 | —Me | —Cl | 6-F | 3-Cl | 1H-indol-4-yl- |
| 1.093 | —Me | —Cl | 6-F | 3-Cl | 1H-indol-5-yl- |
| 1.094 | —Me | —Cl | 6-F | 3-Cl | 1H-indol-6-yl- |
| 1.095 | —Me | —Cl | 6-F | 3-Cl | 1-methylindol-4-yl- |
| 1.096 | —Me | —Cl | 6-F | 3-Cl | 1-methylindol-5-yl- |
| 1.097 | —Me | —Cl | 6-F | 3-Cl | 1-methylindol-6-yl- |
| 1.098 | —Me | —Cl | 6-F | 3-Cl | 1-naphthyl- |
| 1.099 | —Me | —Cl | 6-F | 3-Cl | 2-(trifluoromethyl)-4-quinolyl- |

TABLE A-continued

Substituent definitions of R¹, R², X, Y and D for compounds of formula (I)

| Cmpd. No | R¹ | R² | X | Y | D |
|---|---|---|---|---|---|
| 1.100 | —Me | —Cl | 6-F | 3-Cl | 2-ethyl-1,3-benzoxazol-6-yl- |
| 1.101 | —Me | —Cl | 6-F | 3-Cl | 2-methyl-1,3-benzoxazol-6-yl- |
| 1.102 | —Me | —Cl | 6-F | 3-Cl | 2-methyl-1,2,3,4-tetrahydroquinolin-6-yl- |
| 1.103 | —Me | —Cl | 6-F | 3-Cl | 2-methyl-6-quinolyl- |
| 1.104 | —Me | —Cl | 6-F | 3-Cl | 2-methyl-6-quinolyl- |
| 1.105 | —Me | —Cl | 6-F | 3-Cl | 2-methyl-6-quinolyl- |
| 1.106 | —Me | —Cl | 6-F | 3-Cl | 2-methyl-6-quinolyl- |
| 1.107 | —Me | —Cl | 6-F | 3-Cl | 2-naphthyl- |
| 1.108 | —Me | —Cl | 6-F | 3-Cl | 4-quinolyl- |
| 1.109 | —Me | —Cl | 6-Cl | 3-F | 1,2,3,4-tetrahydroquinolin-6-yl- |
| 1.110 | —Me | —Cl | 6-Cl | 3-F | 1H-indol-4-yl- |
| 1.111 | —Me | —Cl | 6-Cl | 3-F | 1H-indol-5-yl- |
| 1.112 | —Me | —Cl | 6-Cl | 3-F | 1H-indol-6-yl- |
| 1.113 | —Me | —Cl | 6-Cl | 3-F | 1-methylindol-4-yl- |
| 1.114 | —Me | —Cl | 6-Cl | 3-F | 1-methylindol-5-yl- |
| 1.115 | —Me | —Cl | 6-Cl | 3-F | 1-methylindol-6-yl- |
| 1.116 | —Me | —Cl | 6-Cl | 3-F | 1-naphthyl- |
| 1.117 | —Me | —Cl | 6-Cl | 3-F | 2-(trifluoromethyl)-4-quinolyl- |
| 1.118 | —Me | —Cl | 6-Cl | 3-F | 2-ethyl-1,3-benzoxazol-6-yl- |
| 1.119 | —Me | —Cl | 6-Cl | 3-F | 2-methyl-1,3-benzoxazol-6-yl- |
| 1.120 | —Me | —Cl | 6-Cl | 3-F | 2-methyl-1,2,3,4-tetrahydroquinolin-6-yl- |
| 1.121 | —Me | —Cl | 6-Cl | 3-F | 2-methyl-6-quinolyl- |
| 1.122 | —Me | —Cl | 6-Cl | 3-F | 2-methyl-6-quinolyl- |
| 1.123 | —Me | —Cl | 6-Cl | 3-F | 2-methyl-6-quinolyl- |
| 1.124 | —Me | —Cl | 6-Cl | 3-F | 2-methyl-6-quinolyl- |
| 1.125 | —Me | —Cl | 6-Cl | 3-F | 2-naphthyl- |
| 1.126 | —Me | —Cl | 6-Cl | 3-F | 4-quinolyl- |
| 1.127 | —Me | —Cl | 6-Cl | 3-Cl | 1,2,3,4-tetrahydroquinolin-6-yl- |
| 1.128 | —Me | —Cl | 6-Cl | 3-Cl | 1H-indol-4-yl- |
| 1.129 | —Me | —Cl | 6-Cl | 3-Cl | 1H-indol-5-yl- |
| 1.130 | —Me | —Cl | 6-Cl | 3-Cl | 1H-indol-6-yl- |
| 1.131 | —Me | —Cl | 6-Cl | 3-Cl | 1-methylindol-4-yl- |
| 1.132 | —Me | —Cl | 6-Cl | 3-Cl | 1-methylindol-5-yl- |
| 1.133 | —Me | —Cl | 6-Cl | 3-Cl | 1-methylindol-6-yl- |
| 1.134 | —Me | —Cl | 6-Cl | 3-Cl | 1-naphthyl- |
| 1.135 | —Me | —Cl | 6-Cl | 3-Cl | 2-(trifluoromethyl)-4-quinolyl- |
| 1.136 | —Me | —Cl | 6-Cl | 3-Cl | 2-ethyl-1,3-benzoxazol-6-yl- |
| 1.137 | —Me | —Cl | 6-Cl | 3-Cl | 2-methyl-1,3-benzoxazol-6-yl- |
| 1.138 | —Me | —Cl | 6-Cl | 3-Cl | 2-methyl-1,2,3,4-tetrahydroquinolin-6-yl- |
| 1.139 | —Me | —Cl | 6-Cl | 3-Cl | 2-methyl-6-quinolyl- |
| 1.140 | —Me | —Cl | 6-Cl | 3-Cl | 2-methyl-6-quinolyl- |
| 1.141 | —Me | —Cl | 6-Cl | 3-Cl | 2-methyl-6-quinolyl- |
| 1.142 | —Me | —Cl | 6-Cl | 3-Cl | 2-methyl-6-quinolyl- |
| 1.143 | —Me | —Cl | 6-Cl | 3-Cl | 2-naphthyl- |
| 1.144 | —Me | —Cl | 6-Cl | 3-Cl | 4-quinolyl- |
| 1.145 | —CH₂-C≡CH | —Me | 6-F | 3-F | 1,2,3,4-tetrahydroquinolin-6-yl- |
| 1.146 | —CH₂-C≡CH | —Me | 6-F | 3-F | 1H-indol-4-yl- |
| 1.147 | —CH₂-C≡CH | —Me | 6-F | 3-F | 1H-indol-5-yl- |
| 1.148 | —CH₂-C≡CH | —Me | 6-F | 3-F | 1H-indol-6-yl- |
| 1.149 | —CH₂-C≡CH | —Me | 6-F | 3-F | 1-methylindol-4-yl- |
| 1.150 | —CH₂-C≡CH | —Me | 6-F | 3-F | 1-methylindol-5-yl- |
| 1.151 | —CH₂-C≡CH | —Me | 6-F | 3-F | 1-methylindol-6-yl- |
| 1.152 | —CH₂-C≡CH | —Me | 6-F | 3-F | 1-naphthyl- |
| 1.153 | —CH₂-C≡CH | —Me | 6-F | 3-F | 2-(trifluoromethyl)-4-quinolyl- |
| 1.154 | —CH₂-C≡CH | —Me | 6-F | 3-F | 2-ethyl-1,3-benzoxazol-6-yl- |
| 1.155 | —CH₂-C≡CH | —Me | 6-F | 3-F | 2-methyl-1,3-benzoxazol-6-yl- |
| 1.156 | —CH₂-C≡CH | —Me | 6-F | 3-F | 2-methyl-1,2,3,4-tetrahydroquinolin-6-yl- |
| 1.157 | —CH₂-C≡CH | —Me | 6-F | 3-F | 2-methyl-6-quinolyl- |
| 1.158 | —CH₂-C≡CH | —Me | 6-F | 3-F | 2-methyl-6-quinolyl- |
| 1.159 | —CH₂-C≡CH | —Me | 6-F | 3-F | 2-methyl-6-quinolyl- |
| 1.160 | —CH₂-C≡CH | —Me | 6-F | 3-F | 2-methyl-6-quinolyl- |
| 1.161 | —CH₂-C≡CH | —Me | 6-F | 3-F | 2-naphthyl- |
| 1.162 | —CH₂-C≡CH | —Me | 6-F | 3-F | 4-quinolyl- |
| 1.163 | —CH₂-C≡CH | —Me | 6-F | 3-Cl | 1,2,3,4-tetrahydroquinolin-6-yl- |
| 1.164 | —CH₂-C≡CH | —Me | 6-F | 3-Cl | 1H-indol-4-yl- |
| 1.165 | —CH₂-C≡CH | —Me | 6-F | 3-Cl | 1H-indol-5-yl- |
| 1.166 | —CH₂-C≡CH | —Me | 6-F | 3-Cl | 1H-indol-6-yl- |
| 1.167 | —CH₂-C≡CH | —Me | 6-F | 3-Cl | 1-methylindol-4-yl- |
| 1.168 | —CH₂-C≡CH | —Me | 6-F | 3-Cl | 1-methylindol-5-yl- |
| 1.169 | —CH₂-C≡CH | —Me | 6-F | 3-Cl | 1-methylindol-6-yl- |
| 1.170 | —CH₂-C≡CH | —Me | 6-F | 3-Cl | 1-naphthyl- |
| 1.171 | —CH₂-C≡CH | —Me | 6-F | 3-Cl | 2-(trifluoromethyl)-4-quinolyl- |
| 1.172 | —CH₂-C≡CH | —Me | 6-F | 3-Cl | 2-ethyl-1,3-benzoxazol-6-yl- |
| 1.173 | —CH₂-C≡CH | —Me | 6-F | 3-Cl | 2-methyl-1,3-benzoxazol-6-yl- |
| 1.174 | —CH₂-C≡CH | —Me | 6-F | 3-Cl | 2-methyl-1,2,3,4-tetrahydroquinolin-6-yl- |

TABLE A-continued

Substituent definitions of R¹, R², X, Y and D for compounds of formula (I)

| Cmpd. No | R¹ | R² | X | Y | D |
|---|---|---|---|---|---|
| 1.175 | —CH₂-C≡CH | —Me | 6-F | 3-Cl | 2-methyl-6-quinolyl- |
| 1.176 | —CH₂-C≡CH | —Me | 6-F | 3-Cl | 2-methyl-6-quinolyl- |
| 1.177 | —CH₂-C≡CH | —Me | 6-F | 3-Cl | 2-methyl-6-quinolyl- |
| 1.178 | —CH₂-C≡CH | —Me | 6-F | 3-Cl | 2-methyl-6-quinolyl- |
| 1.179 | —CH₂-C≡CH | —Me | 6-F | 3-Cl | 2-naphthyl- |
| 1.180 | —CH₂-C≡CH | —Me | 6-F | 3-Cl | 4-quinolyl- |
| 1.181 | —CH₂-C≡CH | —Me | 6-Cl | 3-F | 1,2,3,4-tetrahydroquinolin-6-yl- |
| 1.182 | —CH₂-C≡CH | —Me | 6-Cl | 3-F | 1H-indol-4-yl- |
| 1.183 | —CH₂-C≡CH | —Me | 6-Cl | 3-F | 1H-indol-5-yl- |
| 1.184 | —CH₂-C≡CH | —Me | 6-Cl | 3-F | 1H-indol-6-yl- |
| 1.185 | —CH₂-C≡CH | —Me | 6-Cl | 3-F | 1-methylindol-4-yl- |
| 1.186 | —CH₂-C≡CH | —Me | 6-Cl | 3-F | 1-methylindol-5-yl- |
| 1.187 | —CH₂-C≡CH | —Me | 6-Cl | 3-F | 1-methylindol-6-yl- |
| 1.188 | —CH₂-C≡CH | —Me | 6-Cl | 3-F | 1-naphthyl- |
| 1.189 | —CH₂-C≡CH | —Me | 6-Cl | 3-F | 2-(trifluoromethyl)-4-quinolyl- |
| 1.190 | —CH₂-C≡CH | —Me | 6-Cl | 3-F | 2-ethyl-1,3-benzoxazol-6-yl- |
| 1.191 | —CH₂-C≡CH | —Me | 6-Cl | 3-F | 2-methyl-1,3-benzoxazol-6-yl- |
| 1.192 | —CH₂-C≡CH | —Me | 6-Cl | 3-F | 2-methyl-1,2,3,4-tetrahydroquinolin-6-yl- |
| 1.193 | —CH₂-C≡CH | —Me | 6-Cl | 3-F | 2-methyl-6-quinolyl- |
| 1.194 | —CH₂-C≡CH | —Me | 6-Cl | 3-F | 2-methyl-6-quinolyl- |
| 1.195 | —CH₂-C≡CH | —Me | 6-Cl | 3-F | 2-methyl-6-quinolyl- |
| 1.196 | —CH₂-C≡CH | —Me | 6-Cl | 3-F | 2-methyl-6-quinolyl- |
| 1.197 | —CH₂-C≡CH | —Me | 6-Cl | 3-F | 2-naphthyl- |
| 1.198 | —CH₂-C≡CH | —Me | 6-Cl | 3-F | 4-quinolyl- |
| 1.199 | —CH₂-C≡CH | —Me | 6-Cl | 3-Cl | 1,2,3,4-tetrahydroquinolin-6-yl- |
| 1.200 | —CH₂-C≡CH | —Me | 6-Cl | 3-Cl | 1H-indol-4-yl- |
| 1.201 | —CH₂-C≡CH | —Me | 6-Cl | 3-Cl | 1H-indol-5-yl- |
| 1.202 | —CH₂-C≡CH | —Me | 6-Cl | 3-Cl | 1H-indol-6-yl- |
| 1.203 | —CH₂-C≡CH | —Me | 6-Cl | 3-Cl | 1-methylindol-4-yl- |
| 1.204 | —CH₂-C≡CH | —Me | 6-Cl | 3-Cl | 1-methylindol-5-yl- |
| 1.205 | —CH₂-C≡CH | —Me | 6-Cl | 3-Cl | 1-methylindol-6-yl- |
| 1.206 | —CH₂-C≡CH | —Me | 6-Cl | 3-Cl | 1-naphthyl- |
| 1.207 | —CH₂-C≡CH | —Me | 6-Cl | 3-Cl | 2-(trifluoromethyl)-4-quinolyl- |
| 1.208 | —CH₂-C≡CH | —Me | 6-Cl | 3-Cl | 2-ethyl-1,3-benzoxazol-6-yl- |
| 1.209 | —CH₂-C≡CH | —Me | 6-Cl | 3-Cl | 2-methyl-1,3-benzoxazol-6-yl- |
| 1.210 | —CH₂-C≡CH | —Me | 6-Cl | 3-Cl | 2-methyl-1,2,3,4-tetrahydroquinolin-6-yl- |
| 1.211 | —CH₂-C≡CH | —Me | 6-Cl | 3-Cl | 2-methyl-6-quinolyl- |
| 1.212 | —CH₂-C≡CH | —Me | 6-Cl | 3-Cl | 2-methyl-6-quinolyl- |
| 1.213 | —CH₂-C≡CH | —Me | 6-Cl | 3-Cl | 2-methyl-6-quinolyl- |
| 1.214 | —CH₂-C≡CH | —Me | 6-Cl | 3-Cl | 2-methyl-6-quinolyl- |
| 1.215 | —CH₂-C≡CH | —Me | 6-Cl | 3-Cl | 2-naphthyl- |
| 1.216 | —CH₂-C≡CH | —Me | 6-Cl | 3-Cl | 4-quinolyl- |
| 1.217 | —CH₂-C≡CH | —Cl | 6-F | 3-F | 1,2,3,4-tetrahydroquinolin-6-yl- |
| 1.218 | —CH₂-C≡CH | —Cl | 6-F | 3-F | 1H-indol-4-yl- |
| 1.219 | —CH₂-C≡CH | —Cl | 6-F | 3-F | 1H-indol-5-yl- |
| 1.220 | —CH₂-C≡CH | —Cl | 6-F | 3-F | 1H-indol-6-yl- |
| 1.221 | —CH₂-C≡CH | —Cl | 6-F | 3-F | 1-methylindol-4-yl- |
| 1.222 | —CH₂-C≡CH | —Cl | 6-F | 3-F | 1-methylindol-5-yl- |
| 1.223 | —CH₂-C≡CH | —Cl | 6-F | 3-F | 1-methylindol-6-yl- |
| 1.224 | —CH₂-C≡CH | —Cl | 6-F | 3-F | 1-naphthyl- |
| 1.225 | —CH₂-C≡CH | —Cl | 6-F | 3-F | 2-(trifluoromethyl)-4-quinolyl- |
| 1.226 | —CH₂-C≡CH | —Cl | 6-F | 3-F | 2-ethyl-1,3-benzoxazol-6-yl- |
| 1.227 | —CH₂-C≡CH | —Cl | 6-F | 3-F | 2-methyl-1,3-benzoxazol-6-yl- |
| 1.228 | —CH₂-C≡CH | —Cl | 6-F | 3-F | 2-methyl-1,2,3,4-tetrahydroquinolin-6-yl- |
| 1.229 | —CH₂-C≡CH | —Cl | 6-F | 3-F | 2-methyl-6-quinolyl- |
| 1.230 | —CH₂-C≡CH | —Cl | 6-F | 3-F | 2-methyl-6-quinolyl- |
| 1.231 | —CH₂-C≡CH | —Cl | 6-F | 3-F | 2-methyl-6-quinolyl- |
| 1.232 | —CH₂-C≡CH | —Cl | 6-F | 3-F | 2-methyl-6-quinolyl- |
| 1.233 | —CH₂-C≡CH | —Cl | 6-F | 3-F | 2-naphthyl- |
| 1.234 | —CH₂-C≡CH | —Cl | 6-F | 3-F | 4-quinolyl- |
| 1.235 | —CH₂-C≡CH | —Cl | 6-F | 3-Cl | 1,2,3,4-tetrahydroquinolin-6-yl- |
| 1.236 | —CH₂-C≡CH | —Cl | 6-F | 3-Cl | 1H-indol-4-yl- |
| 1.237 | —CH₂-C≡CH | —Cl | 6-F | 3-Cl | 1H-indol-5-yl- |
| 1.238 | —CH₂-C≡CH | —Cl | 6-F | 3-Cl | 1H-indol-6-yl- |
| 1.239 | —CH₂-C≡CH | —Cl | 6-F | 3-Cl | 1-methylindol-4-yl- |
| 1.240 | —CH₂-C≡CH | —Cl | 6-F | 3-Cl | 1-methylindol-5-yl- |
| 1.241 | —CH₂-C≡CH | —Cl | 6-F | 3-Cl | 1-methylindol-6-yl- |
| 1.242 | —CH₂-C≡CH | —Cl | 6-F | 3-Cl | 1-naphthyl- |
| 1.243 | —CH₂-C≡CH | —Cl | 6-F | 3-Cl | 2-(trifluoromethyl)-4-quinolyl- |
| 1.244 | —CH₂-C≡CH | —Cl | 6-F | 3-Cl | 2-ethyl-1,3-benzoxazol-6-yl- |
| 1.245 | —CH₂-C≡CH | —Cl | 6-F | 3-Cl | 2-methyl-1,3-benzoxazol-6-yl- |
| 1.246 | —CH₂-C≡CH | —Cl | 6-F | 3-Cl | 2-methyl-1,2,3,4-tetrahydroquinolin-6-yl- |
| 1.247 | —CH₂-C≡CH | —Cl | 6-F | 3-Cl | 2-methyl-6-quinolyl- |
| 1.248 | —CH₂-C≡CH | —Cl | 6-F | 3-Cl | 2-methyl-6-quinolyl- |
| 1.249 | —CH₂-C≡CH | —Cl | 6-F | 3-Cl | 2-methyl-6-quinolyl- |

TABLE A-continued

Substituent definitions of R¹, R², X, Y and D for compounds of formula (I)

| Cmpd. No | R¹ | R² | X | Y | D |
|---|---|---|---|---|---|
| 1.250 | —CH₂-C≡CH | —Cl | 6-F | 3-Cl | 2-methyl-6-quinolyl- |
| 1.251 | —CH₂-C≡CH | —Cl | 6-F | 3-Cl | 2-naphthyl- |
| 1.252 | —CH₂-C≡CH | —Cl | 6-F | 3-Cl | 4-quinolyl- |
| 1.253 | —CH₂-C≡CH | —Cl | 6-Cl | 3-F | 1,2,3,4-tetrahydroquinolin-6-yl- |
| 1.254 | —CH₂-C≡CH | —Cl | 6-Cl | 3-F | 1H-indol-4-yl- |
| 1.255 | —CH₂-C≡CH | —Cl | 6-Cl | 3-F | 1H-indol-5-yl- |
| 1.256 | —CH₂-C≡CH | —Cl | 6-Cl | 3-F | 1H-indol-6-yl- |
| 1.257 | —CH₂-C≡CH | —Cl | 6-Cl | 3-F | 1-methylindol-4-yl- |
| 1.258 | —CH₂-C≡CH | —Cl | 6-Cl | 3-F | 1-methylindol-5-yl- |
| 1.259 | —CH₂-C≡CH | —Cl | 6-Cl | 3-F | 1-methylindol-6-yl- |
| 1.260 | —CH₂-C≡CH | —Cl | 6-Cl | 3-F | 1-naphthyl- |
| 1.261 | —CH₂-C≡CH | —Cl | 6-Cl | 3-F | 2-(trifluoromethyl)-4-quinolyl- |
| 1.262 | —CH₂-C≡CH | —Cl | 6-Cl | 3-F | 2-ethyl-1,3-benzoxazol-6-yl- |
| 1.263 | —CH₂-C≡CH | —Cl | 6-Cl | 3-F | 2-methyl-1,3-benzoxazol-6-yl- |
| 1.264 | —CH₂-C≡CH | —Cl | 6-Cl | 3-F | 2-methyl-1,2,3,4-tetrahydroquinolin-6-yl- |
| 1.265 | —CH₂-C≡CH | —Cl | 6-Cl | 3-F | 2-methyl-6-quinolyl- |
| 1.266 | —CH₂-C≡CH | —Cl | 6-Cl | 3-F | 2-methyl-6-quinolyl- |
| 1.267 | —CH₂-C≡CH | —Cl | 6-Cl | 3-F | 2-methyl-6-quinolyl- |
| 1.268 | —CH₂-C≡CH | —Cl | 6-Cl | 3-F | 2-methyl-6-quinolyl- |
| 1.269 | —CH₂-C≡CH | —Cl | 6-Cl | 3-F | 2-naphthyl- |
| 1.270 | —CH₂-C≡CH | —Cl | 6-Cl | 3-F | 4-quinolyl- |
| 1.271 | —CH₂-C≡CH | —Cl | 6-Cl | 3-Cl | 1,2,3,4-tetrahydroquinolin-6-yl- |
| 1.272 | —CH₂-C≡CH | —Cl | 6-Cl | 3-Cl | 1H-indol-4-yl- |
| 1.273 | —CH₂-C≡CH | —Cl | 6-Cl | 3-Cl | 1H-indol-5-yl- |
| 1.274 | —CH₂-C≡CH | —Cl | 6-Cl | 3-Cl | 1H-indol-6-yl- |
| 1.275 | —CH₂-C≡CH | —Cl | 6-Cl | 3-Cl | 1-methylindol-4-yl- |
| 1.276 | —CH₂-C≡CH | —Cl | 6-Cl | 3-Cl | 1-methylindol-5-yl- |
| 1.277 | —CH₂-C≡CH | —Cl | 6-Cl | 3-Cl | 1-methylindol-6-yl- |
| 1.278 | —CH₂-C≡CH | —Cl | 6-Cl | 3-Cl | 1-naphthyl- |
| 1.279 | —CH₂-C≡CH | —Cl | 6-Cl | 3-Cl | 2-(trifluoromethyl)-4-quinolyl- |
| 1.280 | —CH₂-C≡CH | —Cl | 6-Cl | 3-Cl | 2-ethyl-1,3-benzoxazol-6-yl- |
| 1.281 | —CH₂-C≡CH | —Cl | 6-Cl | 3-Cl | 2-methyl-1,3-benzoxazol-6-yl- |
| 1.282 | —CH₂-C≡CH | —Cl | 6-Cl | 3-Cl | 2-methyl-1,2,3,4-tetrahydroquinolin-6-yl- |
| 1.283 | —CH₂-C≡CH | —Cl | 6-Cl | 3-Cl | 2-methyl-6-quinolyl- |
| 1.284 | —CH₂-C≡CH | —Cl | 6-Cl | 3-Cl | 2-methyl-6-quinolyl- |
| 1.285 | —CH₂-C≡CH | —Cl | 6-Cl | 3-Cl | 2-methyl-6-quinolyl- |
| 1.286 | —CH₂-C≡CH | —Cl | 6-Cl | 3-Cl | 2-methyl-6-quinolyl- |
| 1.287 | —CH₂-C≡CH | —Cl | 6-Cl | 3-Cl | 2-naphthyl- |
| 1.288 | —CH₂-C≡CH | —Cl | 6-Cl | 3-Cl | 4-quinolyl- |
| 1.289 | —Me | —Me | 6-F | 3-F | 2-methyl-5-1,3-benzothiazolyl- |
| 1.290 | —Me | —Me | 6-F | 3-F | 2,2-dimethyl-6-3H-benzofuranyl- |
| 1.291 | —Me | —Me | 6-F | 3-F | 2-methyl-6-1,3-benzoxazolyl- |
| 1.292 | —Me | —Me | 6-F | 3-F | 2,2-difluoro-5-1,3-benzodioxolyl- |
| 1.293 | —Me | —Me | 6-F | 3-F | 3-methyl-5-benzotriazolyl- |
| 1.294 | —Me | —Me | 6-F | 3-F | 1-methyl-3-indazolyl- |
| 1.295 | —Me | —Me | 6-F | 3-F | 1-methyl-5-pyrrolo[2,3-b]pyridinyl- |
| 1.296 | —Me | —Me | 6-F | 3-F | 5-benzofuranyl- |
| 1.297 | —Me | —Me | 6-F | 3-F | 6-benzothiophenyl- |
| 1.298 | —Me | —Me | 6-F | 3-F | 5-benzothiophenyl- |
| 1.299 | —Me | —Me | 6-F | 3-F | 6-1,3-benzothiazolyl- |
| 1.300 | —Me | —Me | 6-F | 3-F | 5-1,3-benzothiazolyl- |
| 1.301 | —Me | —Me | 6-F | 3-F | 3-methyl-6-1,2-benzoxazolyl- |
| 1.302 | —Me | —Me | 6-F | 3-F | 5-2-oxo-3H-1,3-benzoxazolyl- |
| 1.303 | —Me | —Me | 6-F | 3-F | 6-1-methylindazolyl- |
| 1.304 | —Me | —Me | 6-F | 3-F | 5-1-methylindazolyl- |
| 1.305 | —Me | —Me | 6-F | 3-F | 6-1-methylindolyl- |
| 1.306 | —Me | —Me | 6-F | 3-F | 5-1-methylindolyl- |
| 1.307 | —Me | —Me | 6-F | 3-F | 5-2-oxoindolinyl- |
| 1.308 | —Me | —Me | 6-F | 3-F | 2-methyl-1,3-dioxo-isoindolin-5-yl |
| 1.309 | —Me | —Me | 6-F | 3-F | 2-1,3-benzoxazolyl- |
| 1.310 | —Me | —Me | 6-F | 3-F | 2-1,3-benzothiazolyl |
| 1.311 | —Me | —Me | 6-F | 3-F | 5-2,2-dimethyl-1,3-benzodioxolyl- |
| 1.312 | —Me | —Me | 6-F | 3-F | 6-2,2-dimethyl-3H-benzofuranyl- |
| 1.313 | —Me | —Me | 6-F | 3-F | 6-imidazo[1,2-a]pyrazinyl- |
| 1.314 | —Me | —Me | 6-F | 3-Cl | 2-methyl-5-1,3-benzothiazolyl- |
| 1.315 | —Me | —Me | 6-F | 3-Cl | 2,2-dimethyl-6-3H-benzofuranyl- |
| 1.316 | —Me | —Me | 6-F | 3-Cl | 2-methyl-6-1,3-benzoxazolyl- |
| 1.317 | —Me | —Me | 6-F | 3-Cl | 2,2-difluoro-5-1,3-benzodioxolyl- |
| 1.318 | —Me | —Me | 6-F | 3-Cl | 3-methyl-5-benzotriazolyl- |
| 1.319 | —Me | —Me | 6-F | 3-Cl | 1-methyl-3-indazolyl- |
| 1.320 | —Me | —Me | 6-F | 3-Cl | 1-methyl-5-pyrrolo[2,3-b]pyridinyl- |
| 1.321 | —Me | —Me | 6-F | 3-Cl | 5-benzofuranyl- |
| 1.322 | —Me | —Me | 6-F | 3-Cl | 6-benzothiophenyl- |
| 1.323 | —Me | —Me | 6-F | 3-Cl | 5-benzothiophenyl- |
| 1.324 | —Me | —Me | 6-F | 3-Cl | 6-1,3-benzothiazolyl- |

TABLE A-continued

Substituent definitions of R¹, R², X, Y and D for compounds of formula (I)

| Cmpd. No | R¹ | R² | X | Y | D |
|---|---|---|---|---|---|
| 1.325 | —Me | —Me | 6-F | 3-Cl | 5-1,3-benzothiazolyl- |
| 1.326 | —Me | —Me | 6-F | 3-Cl | 3-methyl-6-1,2-benzoxazolyl- |
| 1.327 | —Me | —Me | 6-F | 3-Cl | 5-2-oxo-3H-1,3-benzoxazolyl- |
| 1.328 | —Me | —Me | 6-F | 3-Cl | 6-1-methylindazolyl- |
| 1.329 | —Me | —Me | 6-F | 3-Cl | 5-1-methylindazolyl- |
| 1.330 | —Me | —Me | 6-F | 3-Cl | 6-1-methylindolyl- |
| 1.331 | —Me | —Me | 6-F | 3-Cl | 5-1-methylindolyl- |
| 1.332 | —Me | —Me | 6-F | 3-Cl | 5-2-oxoindolinyl- |
| 1.333 | —Me | —Me | 6-F | 3-Cl | 2-methyl-1,3-dioxo-isoindolin-5-yl |
| 1.334 | —Me | —Me | 6-F | 3-Cl | 2-1,3-benzoxazolyl- |
| 1.335 | —Me | —Me | 6-F | 3-Cl | 2-1,3-benzothiazolyl |
| 1.336 | —Me | —Me | 6-F | 3-Cl | 5-2,2-dimethyl-1,3-benzodioxolyl- |
| 1.337 | —Me | —Me | 6-F | 3-Cl | 6-2,2-dimethyl-3H-benzofuranyl- |
| 1.338 | —Me | —Me | 6-F | 3-Cl | 6-imidazo[1,2-a]pyrazinyl- |
| 1.339 | —Me | —Me | 6-Cl | 3-F | 2-methyl-5-1,3-benzothiazolyl- |
| 1.340 | —Me | —Me | 6-Cl | 3-F | 2,2-dimethyl-6-3H-benzofuranyl- |
| 1.341 | —Me | —Me | 6-Cl | 3-F | 2-methyl-6-1,3-benzoxazolyl- |
| 1.342 | —Me | —Me | 6-Cl | 3-F | 2,2-difluoro-5-1,3-benzodioxolyl- |
| 1.343 | —Me | —Me | 6-Cl | 3-F | 3-methyl-5-benzotriazolyl- |
| 1.344 | —Me | —Me | 6-Cl | 3-F | 1-methyl-3-indazolyl- |
| 1.345 | —Me | —Me | 6-Cl | 3-F | 1-methyl-5-pyrrolo[2,3-b]pyridinyl- |
| 1.346 | —Me | —Me | 6-Cl | 3-F | 5-benzofuranyl- |
| 1.347 | —Me | —Me | 6-Cl | 3-F | 6-benzothiophenyl- |
| 1.348 | —Me | —Me | 6-Cl | 3-F | 5-benzothiophenyl- |
| 1.349 | —Me | —Me | 6-Cl | 3-F | 6-1,3-benzothiazolyl- |
| 1.350 | —Me | —Me | 6-Cl | 3-F | 5-1,3-benzothiazolyl- |
| 1.351 | —Me | —Me | 6-Cl | 3-F | 3-methyl-6-1,2-benzoxazolyl- |
| 1.352 | —Me | —Me | 6-Cl | 3-F | 5-2-oxo-3H-1,3-benzoxazolyl- |
| 1.353 | —Me | —Me | 6-Cl | 3-F | 6-1-methylindazolyl- |
| 1.354 | —Me | —Me | 6-Cl | 3-F | 5-1-methylindazolyl- |
| 1.355 | —Me | —Me | 6-Cl | 3-F | 6-1-methylindolyl- |
| 1.356 | —Me | —Me | 6-Cl | 3-F | 5-1-methylindolyl- |
| 1.357 | —Me | —Me | 6-Cl | 3-F | 5-2-oxoindolinyl- |
| 1.358 | —Me | —Me | 6-Cl | 3-F | 2-methyl-1,3-dioxo-isoindolin-5-yl |
| 1.359 | —Me | —Me | 6-Cl | 3-F | 2-1,3-benzoxazolyl- |
| 1.360 | —Me | —Me | 6-Cl | 3-F | 2-1,3-benzothiazoly |
| 1.361 | —Me | —Me | 6-Cl | 3-F | 5-2,2-dimethyl-1,3-benzodioxolyl- |
| 1.362 | —Me | —Me | 6-Cl | 3-F | 6-2,2-dimethyl-3H-benzofuranyl- |
| 1.363 | —Me | —Me | 6-Cl | 3-F | 6-imidazo[1,2-a]pyrazinyl- |
| 1.364 | —Me | —Me | 6-Cl | 3-Cl | 2-methyl-5-1,3-benzothiazolyl- |
| 1.365 | —Me | —Me | 6-Cl | 3-Cl | 2,2-dimethyl-6-3H-benzofuranyl- |
| 1.366 | —Me | —Me | 6-Cl | 3-Cl | 2-methyl-6-1,3-benzoxazolyl- |
| 1.367 | —Me | —Me | 6-Cl | 3-Cl | 2,2-difluoro-5-1,3-benzodioxolyl- |
| 1.368 | —Me | —Me | 6-Cl | 3-Cl | 3-methyl-5-benzotriazolyl- |
| 1.369 | —Me | —Me | 6-Cl | 3-Cl | 1-methyl-3-indazolyl- |
| 1.370 | —Me | —Me | 6-Cl | 3-Cl | 1-methyl-5-pyrrolo[2,3-b]pyridinyl- |
| 1.371 | —Me | —Me | 6-Cl | 3-Cl | 5-benzofuranyl- |
| 1.372 | —Me | —Me | 6-Cl | 3-Cl | 6-benzothiophenyl- |
| 1.373 | —Me | —Me | 6-Cl | 3-Cl | 5-benzothiophenyl- |
| 1.374 | —Me | —Me | 6-Cl | 3-Cl | 6-1,3-benzothiazolyl- |
| 1.375 | —Me | —Me | 6-Cl | 3-Cl | 5-1,3-benzothiazolyl- |
| 1.376 | —Me | —Me | 6-Cl | 3-Cl | 3-methyl-6-1,2-benzoxazolyl- |
| 1.377 | —Me | —Me | 6-Cl | 3-Cl | 5-2-oxo-3H-1,3-benzoxazolyl- |
| 1.378 | —Me | —Me | 6-Cl | 3-Cl | 6-1-methylindazolyl- |
| 1.379 | —Me | —Me | 6-Cl | 3-Cl | 5-1-methylindazolyl- |
| 1.380 | —Me | —Me | 6-Cl | 3-Cl | 6-1-methylindolyl- |
| 1.381 | —Me | —Me | 6-Cl | 3-Cl | 5-1-methylindolyl- |
| 1.382 | —Me | —Me | 6-Cl | 3-Cl | 5-2-oxoindolinyl- |
| 1.383 | —Me | —Me | 6-Cl | 3-Cl | 2-methyl-1,3-dioxo-isoindolin-5-yl |
| 1.384 | —Me | —Me | 6-Cl | 3-Cl | 2-1,3-benzoxazolyl- |
| 1.385 | —Me | —Me | 6-Cl | 3-Cl | 2-1,3-benzothiazolyl |
| 1.386 | —Me | —Me | 6-Cl | 3-Cl | 5-2,2-dimethyl-1,3-benzodioxolyl- |
| 1.387 | —Me | —Me | 6-Cl | 3-Cl | 6-2,2-dimethyl-3H-benzofuranyl- |
| 1.388 | —Me | —Me | 6-Cl | 3-Cl | 6-imidazo[1,2-a]pyrazinyl- |
| 1.389 | —Me | —Cl | 6-F | 3-F | 2-methyl-5-1,3-benzothiazolyl- |
| 1.390 | —Me | —Cl | 6-F | 3-F | 2,2-dimethyl-6-3H-benzofuranyl- |
| 1.391 | —Me | —Cl | 6-F | 3-F | 2-methyl-6-1,3-benzoxazolyl- |
| 1.392 | —Me | —Cl | 6-F | 3-F | 2,2-difluoro-5-1,3-benzodioxolyl- |
| 1.393 | —Me | —Cl | 6-F | 3-F | 3-methyl-5-benzotriazolyl- |
| 1.394 | —Me | —Cl | 6-F | 3-F | 1-methyl-3-indazolyl- |
| 1.395 | —Me | —Cl | 6-F | 3-F | 1-methyl-5-pyrrolo[2,3-b]pyridinyl- |
| 1.396 | —Me | —Cl | 6-F | 3-F | 5-benzofuranyl- |
| 1.397 | —Me | —Cl | 6-F | 3-F | 6-benzothiophenyl- |
| 1.398 | —Me | —Cl | 6-F | 3-F | 5-benzothiophenyl- |
| 1.399 | —Me | —Cl | 6-F | 3-F | 6-1,3-benzothiazolyl- |

TABLE A-continued

Substituent definitions of R¹, R², X, Y and D for compounds of formula (I)

| Cmpd. No | R¹ | R² | X | Y | D |
|---|---|---|---|---|---|
| 1.400 | —Me | —Cl | 6-F | 3-F | 5-1,3-benzothiazolyl- |
| 1.401 | —Me | —Cl | 6-F | 3-F | 3-methyl-6-1,2-benzoxazolyl- |
| 1.402 | —Me | —Cl | 6-F | 3-F | 5-2-oxo-3H-1,3-benzoxazolyl- |
| 1.403 | —Me | —Cl | 6-F | 3-F | 6-1-methylindazolyl- |
| 1.404 | —Me | —Cl | 6-F | 3-F | 5-1-methylindazolyl- |
| 1.405 | —Me | —Cl | 6-F | 3-F | 6-1-methylindolyl- |
| 1.406 | —Me | —Cl | 6-F | 3-F | 5-1-methylindolyl- |
| 1.407 | —Me | —Cl | 6-F | 3-F | 5-2-oxoindolinyl- |
| 1.408 | —Me | —Cl | 6-F | 3-F | 2-methyl-1,3-dioxo-isoindolin-5-yl |
| 1.409 | —Me | —Cl | 6-F | 3-F | 2-1,3-benzoxazolyl- |
| 1.410 | —Me | —Cl | 6-F | 3-F | 2-1,3-benzothiazoly |
| 1.411 | —Me | —Cl | 6-F | 3-F | 5-2,2-dimethyl-1,3-benzodioxolyl- |
| 1.412 | —Me | —Cl | 6-F | 3-F | 6-2,2-dimethyl-3H-benzofuranyl- |
| 1.413 | —Me | —Cl | 6-F | 3-F | 6-imidazo[1,2-a]pyrazinyl- |
| 1.414 | —Me | —Cl | 6-F | 3-Cl | 2-methyl-5-1,3-benzothiazolyl- |
| 1.415 | —Me | —Cl | 6-F | 3-Cl | 2,2-dimethyl-6-3H-benzofuranyl- |
| 1.416 | —Me | —Cl | 6-F | 3-Cl | 2-methyl-6-1,3-benzoxazolyl- |
| 1.417 | —Me | —Cl | 6-F | 3-Cl | 2,2-difluoro-5-1,3-benzodioxolyl- |
| 1.418 | —Me | —Cl | 6-F | 3-Cl | 3-methyl-5-benzotriazolyl- |
| 1.419 | —Me | —Cl | 6-F | 3-Cl | 1-methyl-3-indazolyl- |
| 1.420 | —Me | —Cl | 6-F | 3-Cl | 1-methyl-5-pyrrolo[2,3-b]pyridinyl- |
| 1.421 | —Me | —Cl | 6-F | 3-Cl | 5-benzofuranyl- |
| 1.422 | —Me | —Cl | 6-F | 3-Cl | 6-benzothiophenyl- |
| 1.423 | —Me | —Cl | 6-F | 3-Cl | 5-benzothiophenyl- |
| 1.424 | —Me | —Cl | 6-F | 3-Cl | 6-1,3-benzothiazolyl- |
| 1.425 | —Me | —Cl | 6-F | 3-Cl | 5-1,3-benzothiazolyl- |
| 1.426 | —Me | —Cl | 6-F | 3-Cl | 3-methyl-6-1,2-benzoxazolyl- |
| 1.427 | —Me | —Cl | 6-F | 3-Cl | 5-2-oxo-3H-1,3-benzoxazolyl- |
| 1.428 | —Me | —Cl | 6-F | 3-Cl | 6-1-methylindazolyl- |
| 1.429 | —Me | —Cl | 6-F | 3-Cl | 5-1-methylindazolyl- |
| 1.430 | —Me | —Cl | 6-F | 3-Cl | 6-1-methylindolyl- |
| 1.431 | —Me | —Cl | 6-F | 3-Cl | 5-1-methylindolyl- |
| 1.432 | —Me | —Cl | 6-F | 3-Cl | 5-2-oxoindolinyl- |
| 1.433 | —Me | —Cl | 6-F | 3-Cl | 2-methyl-1,3-dioxo-isoindolin-5-yl |
| 1.434 | —Me | —Cl | 6-F | 3-Cl | 2-1,3-benzoxazolyl- |
| 1.435 | —Me | —Cl | 6-F | 3-Cl | 2-1,3-benzothiazolyl |
| 1.436 | —Me | —Cl | 6-F | 3-Cl | 5-2,2-dimethyl-1,3-benzodioxolyl- |
| 1.437 | —Me | —Cl | 6-F | 3-Cl | 6-2,2-dimethyl-3H-benzofuranyl- |
| 1.438 | —Me | —Cl | 6-F | 3-Cl | 6-imidazo[1,2-a]pyrazinyl- |
| 1.439 | —Me | —Cl | 6-Cl | 3-F | 2-methyl-5-1,3-benzothiazolyl- |
| 1.440 | —Me | —Cl | 6-Cl | 3-F | 2,2-dimethyl-6-3H-benzofuranyl- |
| 1.441 | —Me | —Cl | 6-Cl | 3-F | 2-methyl-6-1,3-benzoxazolyl- |
| 1.442 | —Me | —Cl | 6-Cl | 3-F | 2,2-difluoro-5-1,3-benzodioxolyl- |
| 1.443 | —Me | —Cl | 6-Cl | 3-F | 3-methyl-5-benzotriazolyl- |
| 1.444 | —Me | —Cl | 6-Cl | 3-F | 1-methyl-3-indazolyl- |
| 1.445 | —Me | —Cl | 6-Cl | 3-F | 1-methyl-5-pyrrolo[2,3-b]pyridinyl- |
| 1.446 | —Me | —Cl | 6-Cl | 3-F | 5-benzofuranyl- |
| 1.447 | —Me | —Cl | 6-Cl | 3-F | 6-benzothiophenyl- |
| 1.448 | —Me | —Cl | 6-Cl | 3-F | 5-benzothiophenyl- |
| 1.449 | —Me | —Cl | 6-Cl | 3-F | 6-1,3-benzothiazolyl- |
| 1.450 | —Me | —Cl | 6-Cl | 3-F | 5-1,3-benzothiazolyl- |
| 1.451 | —Me | —Cl | 6-Cl | 3-F | 3-methyl-6-1,2-benzoxazolyl- |
| 1.452 | —Me | —Cl | 6-Cl | 3-F | 5-2-oxo-3H-1,3-benzoxazolyl- |
| 1.453 | —Me | —Cl | 6-Cl | 3-F | 6-1-methylindazolyl- |
| 1.454 | —Me | —Cl | 6-Cl | 3-F | 5-1-methylindazolyl- |
| 1.455 | —Me | —Cl | 6-Cl | 3-F | 6-1-methylindolyl- |
| 1.456 | —Me | —Cl | 6-Cl | 3-F | 5-1-methylindolyl- |
| 1.457 | —Me | —Cl | 6-Cl | 3-F | 5-2-oxoindolinyl- |
| 1.458 | —Me | —Cl | 6-Cl | 3-F | 2-methyl-1,3-dioxo-isoindolin-5-yl |
| 1.459 | —Me | —Cl | 6-Cl | 3-F | 2-1,3-benzoxazolyl- |
| 1.460 | —Me | —Cl | 6-Cl | 3-F | 2-1,3-benzothiazoly |
| 1.461 | —Me | —Cl | 6-Cl | 3-F | 5-2,2-dimethyl-1,3-benzodioxolyl- |
| 1.462 | —Me | —Cl | 6-Cl | 3-F | 6-2,2-dimethyl-3H-benzofuranyl- |
| 1.463 | —Me | —Cl | 6-Cl | 3-F | 6-imidazo[1,2-a]pyrazinyl- |
| 1.464 | —Me | —Cl | 6-Cl | 3-Cl | 2-methyl-5-1,3-benzothiazolyl- |
| 1.465 | —Me | —Cl | 6-Cl | 3-Cl | 2,2-dimethyl-6-3H-benzofuranyl- |
| 1.466 | —Me | —Cl | 6-Cl | 3-Cl | 2-methyl-6-1,3-benzoxazolyl- |
| 1.467 | —Me | —Cl | 6-Cl | 3-Cl | 2,2-difluoro-5-1,3-benzodioxolyl- |
| 1.468 | —Me | —Cl | 6-Cl | 3-Cl | 3-methyl-5-benzotriazolyl- |
| 1.469 | —Me | —Cl | 6-Cl | 3-Cl | 1-methyl-3-indazolyl- |
| 1.470 | —Me | —Cl | 6-Cl | 3-Cl | 1-methyl-5-pyrrolo[2,3-b]pyridinyl- |
| 1.471 | —Me | —Cl | 6-Cl | 3-Cl | 5-benzofuranyl- |
| 1.472 | —Me | —Cl | 6-Cl | 3-Cl | 6-benzothiophenyl- |
| 1.473 | —Me | —Cl | 6-Cl | 3-Cl | 5-benzothiophenyl- |
| 1.474 | —Me | —Cl | 6-Cl | 3-Cl | 6-1,3-benzothiazolyl- |

TABLE A-continued

Substituent definitions of $R^1$, $R^2$, X, Y and D for compounds of formula (I)

| Cmpd. No | $R^1$ | $R^2$ | X | Y | D |
|---|---|---|---|---|---|
| 1.475 | —Me | —Cl | 6-Cl | 3-Cl | 5-1,3-benzothiazolyl- |
| 1.476 | —Me | —Cl | 6-Cl | 3-Cl | 3-methyl-6-1,2-benzoxazolyl- |
| 1.477 | —Me | —Cl | 6-Cl | 3-Cl | 5-2-oxo-3H-1,3-benzoxazolyl- |
| 1.478 | —Me | —Cl | 6-Cl | 3-Cl | 6-1-methylindazolyl- |
| 1.479 | —Me | —Cl | 6-Cl | 3-Cl | 5-1-methylindazolyl- |
| 1.480 | —Me | —Cl | 6-Cl | 3-Cl | 6-1-methylindolyl- |
| 1.481 | —Me | —Cl | 6-Cl | 3-Cl | 5-1-methylindolyl- |
| 1.482 | —Me | —Cl | 6-Cl | 3-Cl | 5-2-oxoindolinyl- |
| 1.483 | —Me | —Cl | 6-Cl | 3-Cl | 2-methyl-1,3-dioxo-isoindolin-5-yl |
| 1.484 | —Me | —Cl | 6-Cl | 3-Cl | 2-1,3-benzoxazolyl- |
| 1.485 | —Me | —Cl | 6-Cl | 3-Cl | 2-1,3-benzothiazolyl |
| 1.486 | —Me | —Cl | 6-Cl | 3-Cl | 5-2,2-dimethyl-1,3-benzodioxolyl- |
| 1.487 | —Me | —Cl | 6-Cl | 3-Cl | 6-2,2-dimethyl-3H-benzofuranyl- |
| 1.488 | —Me | —Cl | 6-Cl | 3-Cl | 6-imidazo[1,2-a]pyrazinyl- |
| 1.489 | —CH$_2$-C≡CH | —Me | 6-F | 3-F | 2-methyl-5-1,3-benzothiazolyl- |
| 1.490 | —CH$_2$-C≡CH | —Me | 6-F | 3-F | 2,2-dimethyl-6-3H-benzofuranyl- |
| 1.491 | —CH$_2$-C≡CH | —Me | 6-F | 3-F | 2-methyl-6-1,3-benzoxazolyl- |
| 1.492 | —CH$_2$-C≡CH | —Me | 6-F | 3-F | 2,2-difluoro-5-1,3-benzodioxolyl- |
| 1.493 | —CH$_2$-C≡CH | —Me | 6-F | 3-F | 3-methyl-5-benzotriazolyl- |
| 1.494 | —CH$_2$-C≡CH | —Me | 6-F | 3-F | 1-methyl-3-indazolyl- |
| 1.495 | —CH$_2$-C≡CH | —Me | 6-F | 3-F | 1-methyl-5-pyrrolo[2,3-b]pyridinyl- |
| 1.496 | —CH$_2$-C≡CH | —Me | 6-F | 3-F | 5-benzofuranyl- |
| 1.497 | —CH$_2$-C≡CH | —Me | 6-F | 3-F | 6-benzothiophenyl- |
| 1.498 | —CH$_2$-C≡CH | —Me | 6-F | 3-F | 5-benzothiophenyl- |
| 1.499 | —CH$_2$-C≡CH | —Me | 6-F | 3-F | 6-1,3-benzothiazolyl- |
| 1.500 | —CH$_2$-C≡CH | —Me | 6-F | 3-F | 5-1,3-benzothiazolyl- |
| 1.501 | —CH$_2$-C≡CH | —Me | 6-F | 3-F | 3-methyl-6-1,2-benzoxazolyl- |
| 1.502 | —CH$_2$-C≡CH | —Me | 6-F | 3-F | 5-2-oxo-3H-1,3-benzoxazolyl- |
| 1.503 | —CH$_2$-C≡CH | —Me | 6-F | 3-F | 6-1-methylindazolyl- |
| 1.504 | —CH$_2$-C≡CH | —Me | 6-F | 3-F | 5-1-methylindazolyl- |
| 1.505 | —CH$_2$-C≡CH | —Me | 6-F | 3-F | 6-1-methylindolyl- |
| 1.506 | —CH$_2$-C≡CH | —Me | 6-F | 3-F | 5-1-methylindolyl- |
| 1.507 | —CH$_2$-C≡CH | —Me | 6-F | 3-F | 5-2-oxoindolinyl- |
| 1.508 | —CH$_2$-C≡CH | —Me | 6-F | 3-F | 2-methyl-1,3-dioxo-isoindolin-5-yl |
| 1.509 | —CH$_2$-C≡CH | —Me | 6-F | 3-F | 2-1,3-benzoxazolyl- |
| 1.510 | —CH$_2$-C≡CH | —Me | 6-F | 3-F | 2-1,3-benzothiazolyl |
| 1.511 | —CH$_2$-C≡CH | —Me | 6-F | 3-F | 5-2,2-dimethyl-1,3-benzodioxolyl- |
| 1.512 | —CH$_2$-C≡CH | —Me | 6-F | 3-F | 6-2,2-dimethyl-3H-benzofuranyl- |
| 1.513 | —CH$_2$-C≡CH | —Me | 6-F | 3-F | 6-imidazo[1,2-a]pyrazinyl- |
| 1.514 | —CH$_2$-C≡CH | —Me | 6-F | 3-Cl | 2-methyl-5-1,3-benzothiazolyl- |
| 1.515 | —CH$_2$-C≡CH | —Me | 6-F | 3-Cl | 2,2-dimethyl-6-3H-benzofuranyl- |
| 1.516 | —CH$_2$-C≡CH | —Me | 6-F | 3-Cl | 2-methyl-6-1,3-benzoxazolyl- |
| 1.517 | —CH$_2$-C≡CH | —Me | 6-F | 3-Cl | 2,2-difluoro-5-1,3-benzodioxolyl- |
| 1.518 | —CH$_2$-C≡CH | —Me | 6-F | 3-Cl | 3-methyl-5-benzotriazolyl- |
| 1.519 | —CH$_2$-C≡CH | —Me | 6-F | 3-Cl | 1-methyl-3-indazolyl- |
| 1.520 | —CH$_2$-C≡CH | —Me | 6-F | 3-Cl | 1-methyl-5-pyrrolo[2,3-b]pyridinyl- |
| 1.521 | —CH$_2$-C≡CH | —Me | 6-F | 3-Cl | 5-benzofuranyl- |
| 1.522 | —CH$_2$-C≡CH | —Me | 6-F | 3-Cl | 6-benzothiophenyl- |
| 1.523 | —CH$_2$-C≡CH | —Me | 6-F | 3-Cl | 5-benzothiophenyl- |
| 1.524 | —CH$_2$-C≡CH | —Me | 6-F | 3-Cl | 6-1,3-benzothiazolyl- |
| 1.525 | —CH$_2$-C≡CH | —Me | 6-F | 3-Cl | 5-1,3-benzothiazolyl- |
| 1.526 | —CH$_2$-C≡CH | —Me | 6-F | 3-Cl | 3-methyl-6-1,2-benzoxazolyl- |
| 1.527 | —CH$_2$-C≡CH | —Me | 6-F | 3-Cl | 5-2-oxo-3H-1,3-benzoxazolyl- |
| 1.528 | —CH$_2$-C≡CH | —Me | 6-F | 3-Cl | 6-1-methylindazolyl- |
| 1.529 | —CH$_2$-C≡CH | —Me | 6-F | 3-Cl | 5-1-methylindazolyl- |
| 1.530 | —CH$_2$-C≡CH | —Me | 6-F | 3-Cl | 6-1-methylindolyl- |
| 1.531 | —CH$_2$-C≡CH | —Me | 6-F | 3-Cl | 5-1-methylindolyl- |
| 1.532 | —CH$_2$-C≡CH | —Me | 6-F | 3-Cl | 5-2-oxoindolinyl- |
| 1.533 | —CH$_2$-C≡CH | —Me | 6-F | 3-Cl | 2-methyl-1,3-dioxo-isoindolin-5-yl |
| 1.534 | —CH$_2$-C≡CH | —Me | 6-F | 3-Cl | 2-1,3-benzoxazolyl- |
| 1.535 | —CH$_2$-C≡CH | —Me | 6-F | 3-Cl | 2-1,3-benzothiazolyl |
| 1.536 | —CH$_2$-C≡CH | —Me | 6-F | 3-Cl | 5-2,2-dimethyl-1,3-benzodioxolyl- |
| 1.537 | —CH$_2$-C≡CH | —Me | 6-F | 3-Cl | 6-2,2-dimethyl-3H-benzofuranyl- |
| 1.538 | —CH$_2$-C≡CH | —Me | 6-F | 3-Cl | 6-imidazo[1,2-a]pyrazinyl- |
| 1.539 | —CH$_2$-C≡CH | —Me | 6-Cl | 3-F | 2-methyl-5-1,3-benzothiazolyl- |
| 1.540 | —CH$_2$-C≡CH | —Me | 6-Cl | 3-F | 2,2-dimethyl-6-3H-benzofuranyl- |
| 1.541 | —CH$_2$-C≡CH | —Me | 6-Cl | 3-F | 2-methyl-6-1,3-benzoxazolyl- |
| 1.542 | —CH$_2$-C≡CH | —Me | 6-Cl | 3-F | 2,2-difluoro-5-1,3-benzodioxolyl- |
| 1.543 | —CH$_2$-C≡CH | —Me | 6-Cl | 3-F | 3-methyl-5-benzotriazolyl- |
| 1.544 | —CH$_2$-C≡CH | —Me | 6-Cl | 3-F | 1-methyl-3-indazolyl- |
| 1.545 | —CH$_2$-C≡CH | —Me | 6-Cl | 3-F | 1-methyl-5-pyrrolo[2,3-b]pyridinyl- |
| 1.546 | —CH$_2$-C≡CH | —Me | 6-Cl | 3-F | 5-benzofuranyl- |
| 1.547 | —CH$_2$-C≡CH | —Me | 6-Cl | 3-F | 6-benzothiophenyl- |
| 1.548 | —CH$_2$-C≡CH | —Me | 6-Cl | 3-F | 5-benzothiophenyl- |
| 1.549 | —CH$_2$-C≡CH | —Me | 6-Cl | 3-F | 6-1,3-benzothiazolyl- |

TABLE A-continued

Substituent definitions of R¹, R², X, Y and D for compounds of formula (I)

| Cmpd. No | R¹ | R² | X | Y | D |
|---|---|---|---|---|---|
| 1.550 | —CH₂-C≡CH | —Me | 6-Cl | 3-F | 5-1,3-benzothiazolyl- |
| 1.551 | —CH₂-C≡CH | —Me | 6-Cl | 3-F | 3-methyl-6-1,2-benzoxazolyl- |
| 1.552 | —CH₂-C≡CH | —Me | 6-Cl | 3-F | 5-2-oxo-3H-1,3-benzoxazolyl- |
| 1.553 | —CH₂-C≡CH | —Me | 6-Cl | 3-F | 6-1-methylindazolyl- |
| 1.554 | —CH₂-C≡CH | —Me | 6-Cl | 3-F | 5-1-methylindazolyl- |
| 1.555 | —CH₂-C≡CH | —Me | 6-Cl | 3-F | 6-1-methylindolyl- |
| 1.556 | —CH₂-C≡CH | —Me | 6-Cl | 3-F | 5-1-methylindolyl- |
| 1.557 | —CH₂-C≡CH | —Me | 6-Cl | 3-F | 5-2-oxoindolinyl- |
| 1.558 | —CH₂-C≡CH | —Me | 6-Cl | 3-F | 2-methyl-1,3-dioxo-isoindolin-5-yl |
| 1.559 | —CH₂-C≡CH | —Me | 6-Cl | 3-F | 2-1,3-benzoxazolyl- |
| 1.560 | —CH₂-C≡CH | —Me | 6-Cl | 3-F | 2-1,3-benzothiazolyl |
| 1.561 | —CH₂-C≡CH | —Me | 6-Cl | 3-F | 5-2,2-dimethyl-1,3-benzodioxolyl- |
| 1.562 | —CH₂-C≡CH | —Me | 6-Cl | 3-F | 6-2,2-dimethyl-3H-benzofuranyl- |
| 1.563 | —CH₂-C≡CH | —Me | 6-Cl | 3-F | 6-imidazo[1,2-a]pyrazinyl- |
| 1.564 | —CH₂-C≡CH | —Me | 6-Cl | 3-Cl | 2-methyl-5-1,3-benzothiazolyl- |
| 1.565 | —CH₂-C≡CH | —Me | 6-Cl | 3-Cl | 2,2-dimethyl-6-3H-benzofuranyl- |
| 1.566 | —CH₂-C≡CH | —Me | 6-Cl | 3-Cl | 2-methyl-6-1,3-benzoxazolyl- |
| 1.567 | —CH₂-C≡CH | —Me | 6-Cl | 3-Cl | 2,2-difluoro-5-1,3-benzodioxolyl- |
| 1.568 | —CH₂-C≡CH | —Me | 6-Cl | 3-Cl | 3-methyl-5-benzotriazolyl- |
| 1.569 | —CH₂-C≡CH | —Me | 6-Cl | 3-Cl | 1-methyl-3-indazolyl- |
| 1.570 | —CH₂-C≡CH | —Me | 6-Cl | 3-Cl | 1-methyl-5-pyrrolo[2,3-b]pyridinyl- |
| 1.571 | —CH₂-C≡CH | —Me | 6-Cl | 3-Cl | 5-benzofuranyl- |
| 1.572 | —CH₂-C≡CH | —Me | 6-Cl | 3-Cl | 6-benzothiophenyl- |
| 1.573 | —CH₂-C≡CH | —Me | 6-Cl | 3-Cl | 5-benzothiophenyl- |
| 1.574 | —CH₂-C≡CH | —Me | 6-Cl | 3-Cl | 6-1,3-benzothiazolyl- |
| 1.575 | —CH₂-C≡CH | —Me | 6-Cl | 3-Cl | 5-1,3-benzothiazolyl- |
| 1.576 | —CH₂-C≡CH | —Me | 6-Cl | 3-Cl | 3-methyl-6-1,2-benzoxazolyl- |
| 1.577 | —CH₂-C≡CH | —Me | 6-Cl | 3-Cl | 5-2-oxo-3H-1,3-benzoxazolyl- |
| 1.578 | —CH₂-C≡CH | —Me | 6-Cl | 3-Cl | 6-1-methylindazolyl- |
| 1.579 | —CH₂-C≡CH | —Me | 6-Cl | 3-Cl | 5-1-methylindazolyl- |
| 1.580 | —CH₂-C≡CH | —Me | 6-Cl | 3-Cl | 6-1-methylindolyl- |
| 1.581 | —CH₂-C≡CH | —Me | 6-Cl | 3-Cl | 5-1-methylindolyl- |
| 1.582 | —CH₂-C≡CH | —Me | 6-Cl | 3-Cl | 5-2-oxoindolinyl- |
| 1.583 | —CH₂-C≡CH | —Me | 6-Cl | 3-Cl | 2-methyl-1,3-dioxo-isoindolin-5-yl |
| 1.584 | —CH₂-C≡CH | —Me | 6-Cl | 3-Cl | 2-1,3-benzoxazolyl- |
| 1.585 | —CH₂-C≡CH | —Me | 6-Cl | 3-Cl | 2-1,3-benzothiazoly |
| 1.586 | —CH₂-C≡CH | —Me | 6-Cl | 3-Cl | 5-2,2-dimethyl-1,3-benzodioxolyl- |
| 1.587 | —CH₂-C≡CH | —Me | 6-Cl | 3-Cl | 6-2,2-dimethyl-3H-benzofuranyl- |
| 1.588 | —CH₂-C≡CH | —Me | 6-Cl | 3-Cl | 6-imidazo[1,2-a]pyrazinyl- |
| 1.589 | —CH₂-C≡CH | —Cl | 6-F | 3-F | 2-methyl-5-1,3-benzothiazolyl- |
| 1.590 | —CH₂-C≡CH | —Cl | 6-F | 3-F | 2,2-dimethyl-6-3H-benzofuranyl- |
| 1.591 | —CH₂-C≡CH | —Cl | 6-F | 3-F | 2-methyl-6-1,3-benzoxazolyl- |
| 1.592 | —CH₂-C≡CH | —Cl | 6-F | 3-F | 2,2-difluoro-5-1,3-benzodioxolyl- |
| 1.593 | —CH₂-C≡CH | —Cl | 6-F | 3-F | 3-methyl-5-benzotriazolyl- |
| 1.594 | —CH₂-C≡CH | —Cl | 6-F | 3-F | 1-methyl-3-indazolyl- |
| 1.595 | —CH₂-C≡CH | —Cl | 6-F | 3-F | 1-methyl-5-pyrrolo[2,3-b]pyridinyl- |
| 1.596 | —CH₂-C≡CH | —Cl | 6-F | 3-F | 5-benzofuranyl- |
| 1.597 | —CH₂-C≡CH | —Cl | 6-F | 3-F | 6-benzothiophenyl- |
| 1.598 | —CH₂-C≡CH | —Cl | 6-F | 3-F | 5-benzothiophenyl- |
| 1.599 | —CH₂-C≡CH | —Cl | 6-F | 3-F | 6-1,3-benzothiazolyl- |
| 1.600 | —CH₂-C≡CH | —Cl | 6-F | 3-F | 5-1,3-benzothiazolyl- |
| 1.601 | —CH₂-C≡CH | —Cl | 6-F | 3-F | 3-methyl-6-1,2-benzoxazolyl- |
| 1.602 | —CH₂-C≡CH | —Cl | 6-F | 3-F | 5-2-oxo-3H-1,3-benzoxazolyl- |
| 1.603 | —CH₂-C≡CH | —Cl | 6-F | 3-F | 6-1-methylindazolyl- |
| 1.604 | —CH₂-C≡CH | —Cl | 6-F | 3-F | 5-1-methylindazolyl- |
| 1.605 | —CH₂-C≡CH | —Cl | 6-F | 3-F | 6-1-methylindolyl- |
| 1.606 | —CH₂-C≡CH | —Cl | 6-F | 3-F | 5-1-methylindolyl- |
| 1.607 | —CH₂-C≡CH | —Cl | 6-F | 3-F | 5-2-oxoindolinyl- |
| 1.608 | —CH₂-C≡CH | —Cl | 6-F | 3-F | 2-methyl-1,3-dioxo-isoindolin-5-yl |
| 1.609 | —CH₂-C≡CH | —Cl | 6-F | 3-F | 2-1,3-benzoxazolyl- |
| 1.610 | —CH₂-C≡CH | —Cl | 6-F | 3-F | 2-1,3-benzothiazolyl |
| 1.611 | —CH₂-C≡CH | —Cl | 6-F | 3-F | 5-2,2-dimethyl-1,3-benzodioxolyl- |
| 1.612 | —CH₂-C≡CH | —Cl | 6-F | 3-F | 6-2,2-dimethyl-3H-benzofuranyl- |
| 1.613 | —CH₂-C≡CH | —Cl | 6-F | 3-F | 6-imidazo[1,2-a]pyrazinyl- |
| 1.614 | —CH₂-C≡CH | —Cl | 6-F | 3-Cl | 2-methyl-5-1,3-benzothiazolyl- |
| 1.615 | —CH₂-C≡CH | —Cl | 6-F | 3-Cl | 2,2-dimethyl-6-3H-benzofuranyl- |
| 1.616 | —CH₂-C≡CH | —Cl | 6-F | 3-Cl | 2-methyl-6-1,3-benzoxazolyl- |
| 1.617 | —CH₂-C≡CH | —Cl | 6-F | 3-Cl | 2,2-difluoro-5-1,3-benzodioxolyl- |
| 1.618 | —CH₂-C≡CH | —Cl | 6-F | 3-Cl | 3-methyl-5-benzotriazolyl- |
| 1.619 | —CH₂-C≡CH | —Cl | 6-F | 3-Cl | 1-methyl-3-indazolyl- |
| 1.620 | —CH₂-C≡CH | —Cl | 6-F | 3-Cl | 1-methyl-5-pyrrolo[2,3-b]pyridinyl- |
| 1.621 | —CH₂-C≡CH | —Cl | 6-F | 3-Cl | 5-benzofuranyl- |
| 1.622 | —CH₂-C≡CH | —Cl | 6-F | 3-Cl | 6-benzothiophenyl- |
| 1.623 | —CH₂-C≡CH | —Cl | 6-F | 3-Cl | 5-benzothiophenyl- |
| 1.624 | —CH₂-C≡CH | —Cl | 6-F | 3-Cl | 6-1,3-benzothiazolyl- |

TABLE A-continued

Substituent definitions of R¹, R², X, Y and D for compounds of formula (I)

| Cmpd. No | R¹ | R² | X | Y | D |
|---|---|---|---|---|---|
| 1.625 | —CH₂-C≡CH | —Cl | 6-F | 3-Cl | 5-1,3-benzothiazolyl- |
| 1.626 | —CH₂-C≡CH | —Cl | 6-F | 3-Cl | 3-methyl-6-1,2-benzoxazolyl- |
| 1.627 | —CH₂-C≡CH | —Cl | 6-F | 3-Cl | 5-2-oxo-3H-1,3-benzoxazolyl- |
| 1.628 | —CH₂-C≡CH | —Cl | 6-F | 3-Cl | 6-1-methylindazolyl- |
| 1.629 | —CH₂-C≡CH | —Cl | 6-F | 3-Cl | 5-1-methylindazolyl- |
| 1.630 | —CH₂-C≡CH | —Cl | 6-F | 3-Cl | 6-1-methylindolyl- |
| 1.631 | —CH₂-C≡CH | —Cl | 6-F | 3-Cl | 5-1-methylindolyl- |
| 1.632 | —CH₂-C≡CH | —Cl | 6-F | 3-Cl | 5-2-oxoindolinyl- |
| 1.633 | —CH₂-C≡CH | —Cl | 6-F | 3-Cl | 2-methyl-1,3-dioxo-isoindolin-5-yl |
| 1.634 | —CH₂-C≡CH | —Cl | 6-F | 3-Cl | 2-1,3-benzoxazolyl- |
| 1.635 | —CH₂-C≡CH | —Cl | 6-F | 3-Cl | 2-1,3-benzothiazoly |
| 1.636 | —CH₂-C≡CH | —Cl | 6-F | 3-Cl | 5-2,2-dimethyl-1,3-benzodioxolyl- |
| 1.637 | —CH₂-C≡CH | —Cl | 6-F | 3-Cl | 6-2,2-dimethyl-3H-benzofuranyl- |
| 1.638 | —CH₂-C≡CH | —Cl | 6-F | 3-Cl | 6-imidazo[1,2-a]pyrazinyl- |
| 1.639 | —CH₂-C≡CH | —Cl | 6-Cl | 3-F | 2-methyl-5-1,3-benzothiazolyl- |
| 1.640 | —CH₂-C≡CH | —Cl | 6-Cl | 3-F | 2,2-dimethyl-6-3H-benzofuranyl- |
| 1.641 | —CH₂-C≡CH | —Cl | 6-Cl | 3-F | 2-methyl-6-1,3-benzoxazolyl- |
| 1.642 | —CH₂-C≡CH | —Cl | 6-Cl | 3-F | 2,2-difluoro-5-1,3-benzodioxolyl- |
| 1.643 | —CH₂-C≡CH | —Cl | 6-Cl | 3-F | 3-methyl-5-benzotriazolyl- |
| 1.644 | —CH₂-C≡CH | —Cl | 6-Cl | 3-F | 1-methyl-3-indazolyl- |
| 1.645 | —CH₂-C≡CH | —Cl | 6-Cl | 3-F | 1-methyl-5-pyrrolo[2,3-b]pyridinyl- |
| 1.646 | —CH₂-C≡CH | —Cl | 6-Cl | 3-F | 5-benzofuranyl- |
| 1.647 | —CH₂-C≡CH | —Cl | 6-Cl | 3-F | 6-benzothiophenyl- |
| 1.648 | —CH₂-C≡CH | —Cl | 6-Cl | 3-F | 5-benzothiophenyl- |
| 1.649 | —CH₂-C≡CH | —Cl | 6-Cl | 3-F | 6-1,3-benzothiazolyl- |
| 1.650 | —CH₂-C≡CH | —Cl | 6-Cl | 3-F | 5-1,3-benzothiazolyl- |
| 1.651 | —CH₂-C≡CH | —Cl | 6-Cl | 3-F | 3-methyl-6-1,2-benzoxazolyl- |
| 1.652 | —CH₂-C≡CH | —Cl | 6-Cl | 3-F | 5-2-oxo-3H-1,3-benzoxazolyl- |
| 1.653 | —CH₂-C≡CH | —Cl | 6-Cl | 3-F | 6-1-methylindazolyl- |
| 1.654 | —CH₂-C≡CH | —Cl | 6-Cl | 3-F | 5-1-methylindazolyl- |
| 1.655 | —CH₂-C≡CH | —Cl | 6-Cl | 3-F | 6-1-methylindolyl- |
| 1.656 | —CH₂-C≡CH | —Cl | 6-Cl | 3-F | 5-1-methylindolyl- |
| 1.657 | —CH₂-C≡CH | —Cl | 6-Cl | 3-F | 5-2-oxoindolinyl- |
| 1.658 | —CH₂-C≡CH | —Cl | 6-Cl | 3-F | 2-methyl-1,3-dioxo-isoindolin-5-yl |
| 1.659 | —CH₂-C≡CH | —Cl | 6-Cl | 3-F | 2-1,3-benzoxazolyl- |
| 1.660 | —CH₂-C≡CH | —Cl | 6-Cl | 3-F | 2-1,3-benzothiazolyl |
| 1.661 | —CH₂-C≡CH | —Cl | 6-Cl | 3-F | 5-2,2-dimethyl-1,3-benzodioxolyl- |
| 1.662 | —CH₂-C≡CH | —Cl | 6-Cl | 3-F | 6-2,2-dimethyl-3H-benzofuranyl- |
| 1.663 | —CH₂-C≡CH | —Cl | 6-Cl | 3-F | 6-imidazo[1,2-a]pyrazinyl- |
| 1.664 | —CH₂-C≡CH | —Cl | 6-Cl | 3-Cl | 2-methyl-5-1,3-benzothiazolyl- |
| 1.665 | —CH₂-C≡CH | —Cl | 6-Cl | 3-Cl | 2,2-dimethyl-6-3H-benzofuranyl- |
| 1.666 | —CH₂-C≡CH | —Cl | 6-Cl | 3-Cl | 2-methyl-6-1,3-benzoxazolyl- |
| 1.667 | —CH₂-C≡CH | —Cl | 6-Cl | 3-Cl | 2,2-difluoro-5-1,3-benzodioxolyl- |
| 1.668 | —CH₂-C≡CH | —Cl | 6-Cl | 3-Cl | 3-methyl-5-benzotriazolyl- |
| 1.669 | —CH₂-C≡CH | —Cl | 6-Cl | 3-Cl | 1-methyl-3-indazolyl- |
| 1.670 | —CH₂-C≡CH | —Cl | 6-Cl | 3-Cl | 1-methyl-5-pyrrolo[2,3-b]pyridinyl- |
| 1.671 | —CH₂-C≡CH | —Cl | 6-Cl | 3-Cl | 5-benzofuranyl- |
| 1.672 | —CH₂-C≡CH | —Cl | 6-Cl | 3-Cl | 6-benzothiophenyl- |
| 1.673 | —CH₂-C≡CH | —Cl | 6-Cl | 3-Cl | 5-benzothiophenyl- |
| 1.674 | —CH₂-C≡CH | —Cl | 6-Cl | 3-Cl | 6-1,3-benzothiazolyl- |
| 1.675 | —CH₂-C≡CH | —Cl | 6-Cl | 3-Cl | 5-1,3-benzothiazolyl- |
| 1.676 | —CH₂-C≡CH | —Cl | 6-Cl | 3-Cl | 3-methyl-6-1,2-benzoxazolyl- |
| 1.677 | —CH₂-C≡CH | —Cl | 6-Cl | 3-Cl | 5-2-oxo-3H-1,3-benzoxazolyl- |
| 1.678 | —CH₂-C≡CH | —Cl | 6-Cl | 3-Cl | 6-1-methylindazolyl- |
| 1.679 | —CH₂-C≡CH | —Cl | 6-Cl | 3-Cl | 5-1-methylindazolyl- |
| 1.680 | —CH₂-C≡CH | —Cl | 6-Cl | 3-Cl | 6-1-methylindolyl- |
| 1.681 | —CH₂-C≡CH | —Cl | 6-Cl | 3-Cl | 5-1-methylindolyl- |
| 1.682 | —CH₂-C≡CH | —Cl | 6-Cl | 3-Cl | 5-2-oxoindolinyl- |
| 1.683 | —CH₂-C≡CH | —Cl | 6-Cl | 3-Cl | 2-methyl-1,3-dioxo-isoindolin-5-yl |
| 1.684 | —CH₂-C≡CH | —Cl | 6-Cl | 3-Cl | 2-1,3-benzoxazolyl- |
| 1.685 | —CH₂-C≡CH | —Cl | 6-Cl | 3-Cl | 2-1,3-benzothiazoly |
| 1.686 | —CH₂-C≡CH | —Cl | 6-Cl | 3-Cl | 5-2,2-dimethyl-1,3-benzodioxolyl- |
| 1.687 | —CH₂-C≡CH | —Cl | 6-Cl | 3-Cl | 6-2,2-dimethyl-3H-benzofuranyl- |
| 1.688 | —CH₂-C≡CH | —Cl | 6-Cl | 3-Cl | 6-imidazo[1,2-a]pyrazinyl- |

Table 2 provides 688 compounds A-2.001 to A-2.688 of formula (I) as shown above, wherein G is hydrogen, W is (E)-CH=CH— and $R^1$, $R^2$, X, Y, D are as defined for compound Nos. 1.001 to 1.688 respectively in Table A above.

Table 3 provides 688 compounds A-3.001 to A-3.688 of formula (I) as shown above, wherein G is —(C=O)iPr, W is —$CH_2$—$CH_2$— and $R^1$, $R^2$, X, Y, D are as defined for compound Nos. 1.001 to 1.288 respectively in Table A above.

Table 4 provides 688 compounds A-4.001 to A-4.688 of formula (I) as shown above, wherein G is —(C=O)iPr, W is (E)-CH=CH— and $R^1$, $R^2$, X, Y, D are as defined for compound Nos. 1.001 to 1.288 respectively in Table A above.

The compounds of the present invention may be prepared according to the following schemes, in which the substituents $R^1$, $R^2$, $R^3$, $R^4$, $R^5$, $R^6$, $R^8$, $R^9$, $R^{10}$, $R^{11}$, $R^{12}$, $R^{13}$, $R^{14}$, $R^{15}$, $R^{16}$ W, D, G, X, Y, Z, and m have (unless otherwise stated explicitly) the definitions described hereinbefore.

Certain compounds (I-ii) of the present invention may be prepared from compounds (2) as shown in Reaction scheme 1. Compounds (I-ii) are compounds of formula (I) in which W is —$CH_2$—$CH_2$—.

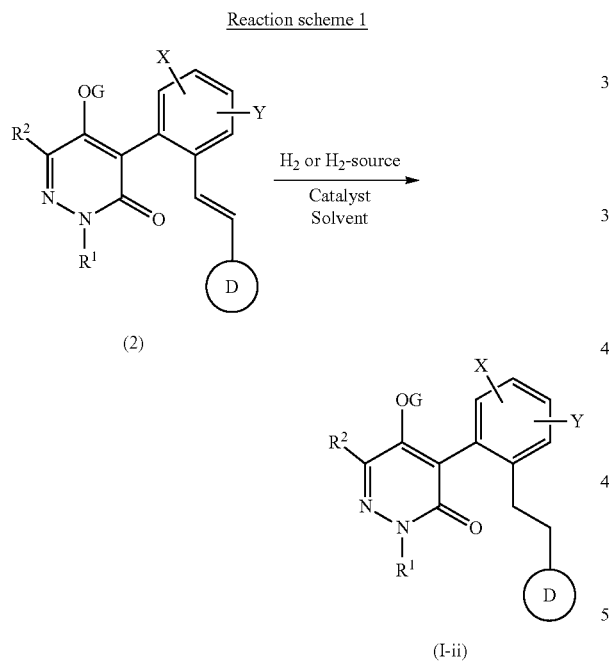

Compounds (I-ii) may be prepared by catalytic hydrogenation of compounds (2) with hydrogen gas in a suitable solvent [such as tetrahydrofuran, methanol, ethanol, acetic acid or ethyl acetate] in the presence of a suitable catalyst [such as Pd/C, Pd/CaCO$_3$, Rh/Al$_2$O$_3$ or sponge nickel] at a temperature between −10 and 100° C.

Alternatively, compounds (I-ii) may also be prepared by catalytic transfer-hydrogenation of compounds (2) by treatment with a suitable hydrogen source in a suitable solvent in the presence of a suitable catalyst at a temperature between −10 and 100° C. Examples of suitable systems are tetrahydroxydiboron in dichloromethane/water or dichloromethane/methanol mixtures in the presence of Pd/C, Pd(OAc)$_2$ or Pd(OH)$_2$/C (*J. Am. Chem. Soc.*, 2016, 138, 6107-6110) or, diethyl 1,4-dihydro-2,6-dimethyl-3,5-pyridinedicarboxylate in ethanol in the presence of Pd/C (*Tetrahedron Letters*, 2009, 50, 1026).

Alternatively, compounds (I-ii) may also be prepared by reduction with diimide generated in-situ from a suitable pre-cursor in a suitable solvent at a temperature between −10 and 200° C. Examples of suitable reagents for generation of diimide include substituted arylsulfonyl hydrazides such as 2,4,6-triisopropylbenzenesulfonyl hydrazide, optionally in the presence of a suitable base. Examples of suitable bases include triethylamine, diisopropylethylamine, potassium carbonate and sodium carbonate. Suitable solvents include tetrahydrofuran, 1,4-dioxane, ethyl acetate, acetonitrile and dimethylformamide.

Compounds (2) may be prepared from compounds (3) and compounds (4) as shown in Reaction scheme 2, according to either the Suzuki Protocol or the Heck Protocol described. When employing the Suzuki Protocol, compounds (4) are organoboron compounds such as boronic acids, boronic esters or trifluoroborate potassium salts. When employing the Heck Protocol, compounds (4) are styrenes.

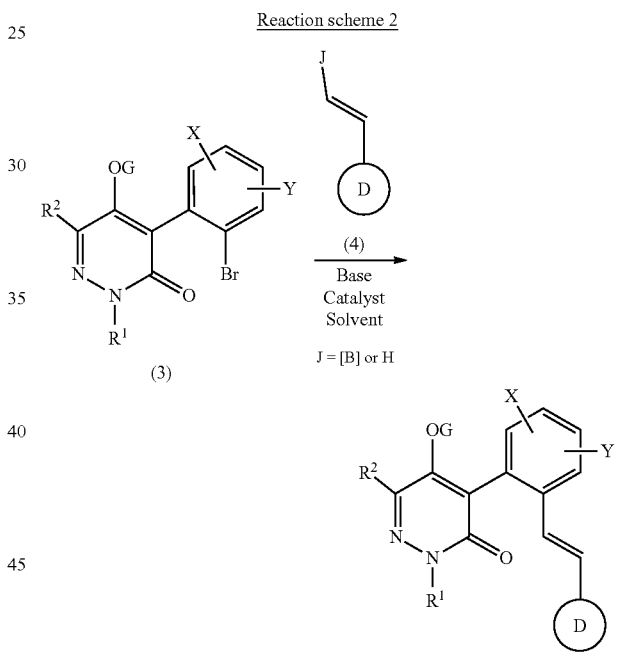

Suzuki Protocol

Compounds (2) may be prepared by treatment of compounds (3) with compounds (4) in the presence of a suitable base and a suitable catalyst in a suitable solvent at a temperature between 10 and 150° C. Examples of suitable bases are potassium carbonate, potassium phosphate, sodium carbonate, sodium bicarbonate and potassium fluoride. Examples of suitable catalysts are 1,1'-bis(diphenylphosphino)ferrocene]dichloropalladium(II) dichloromethane complex [PdCl$_2$(dppf).DCM], tetrakis(triphenylphosphine)palladium(0) [Pd(PPh$_3$)$_4$], and a catalytic system formed in-situ from a mixture of palladium (II)acetate and triphenylphosphine. Examples of suitable solvents are water, 1,4-dioxane, 2-methyltetrahydrofuran, tetrahydrofuran, acetonitrile and toluene. Many compounds (4) are commercially available [such as 4,4,5,5-tetramethyl- 2-[(E)-2-(2-naphthyl)vinyl]-1,3,2-dioxaborolane] or can be made by known methods. Examples of compounds (3) with particular utility in the Suzuki Protocol are isobutyryl esters (3-i) wherein G is isobutyryl.

The skilled man will appreciate that the conditions of the Suzuki Protocol are liable to cleave ester groups, so that Reaction scheme 2 may also describe a reaction wherein starting material (3) contains an ester moiety [such that G is an acyl group], but product (2) does not [such that G is hydrogen].

Heck Protocol

Compounds (2) may be prepared by treatment of compounds (3) with compounds (4) in the presence of a suitable base and a suitable catalyst at a temperature between 10 and 150° C. An additional solvent may optionally be included. Examples of suitable bases are triethylamine, morpholine, N-methylmorpholine, diisopropylethylamine and pyridine. Examples of suitable catalysts are tetrakis(triphenylphosphine)palladium(0) [Pd(PPh$_3$)$_4$], a catalytic system formed in-situ from a mixture of palladium(II)acetate and triphenylphosphine, a catalytic system formed in-situ from a mixture of tris(dibenzylideneacetone)dipalladium(0) and tri-tertbutylphosphonium tetrafluoroborate and a catalytic system formed in-situ from a palladacycle pre-catalyst such as chloro[(tri-tert-butylphosphine)-2-(2-aminobiphenyl)] palladium(II). Examples of the optional additional solvent are 1,4-dioxane, tetrahydrofuran, acetonitrile and toluene. Many compounds (4) are commercially available [such as 2-vinylnaphthalene] or can be made by known methods. Examples of compounds (3) with particular utility in the Heck Protocol are isobutyryl esters (3-i) wherein G is isobutyryl.

Compounds (3-i) may be prepared from compounds (5) as shown in Reaction scheme 3.

Compounds (3-i) may be prepared by treatment of compounds (5) with isobutyryl chloride in a suitable solvent [such as dichloromethane, acetonitrile or toluene] in the presence of a suitable base [such as triethylamine, diisopropylethylamine or pyridine] at a temperature between −10 and 60° C. A catalyst [such as 4-(dimethylamino)pyridine] may optionally be included.

Compounds (5) may be prepared from compounds (6) as shown in Reaction scheme 4, by heating compounds (6) with a base (such as 1,8-diazabicyclo[5.4.0]undec-7-ene, sodium hexamethyldisilazide or lithium hexamethyldisilazide) in a solvent [such as acetonitrile, N,N-dimethylformamide or toluene] at a temperature between 50 and 200° C. Conventional heating or microwave heating may be used.

Reaction scheme 3

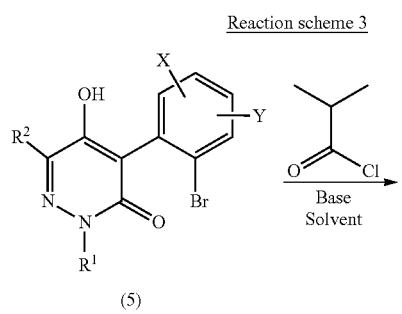

(5)

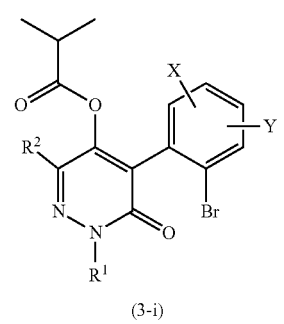

(3-i)

Reaction scheme 4

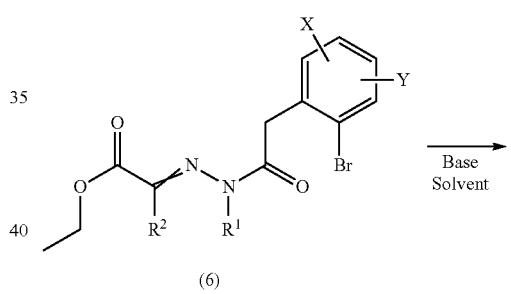

(6)

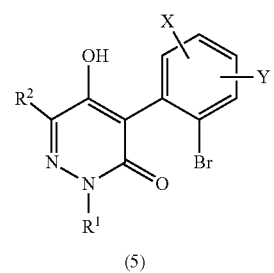

(5)

Compounds (6) may be prepared from phenylacetic acids (7) as shown in Reaction scheme 5.

Reaction scheme 5

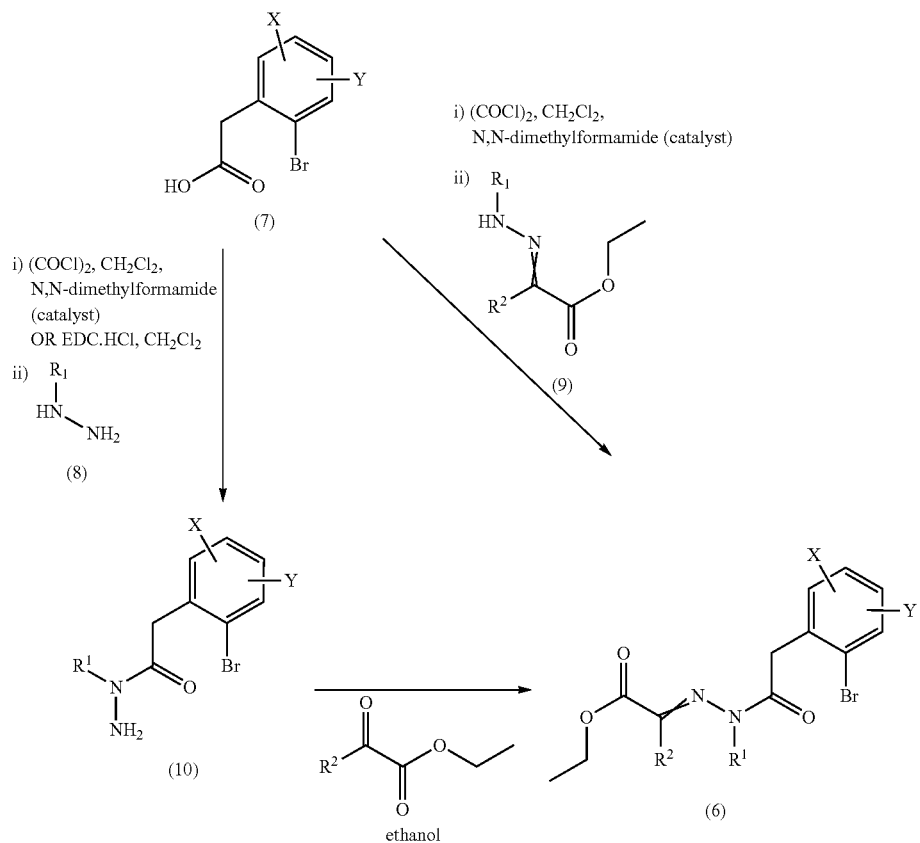

With respect to Reaction scheme 5, an example of hydrazines (8) is methylhydrazine, and an example of ketoesters (10) is ethyl pyruvate. An example of hydrazones (9) is ethyl(2E/Z)-2-(methylhydrazono)propanoate, prepared according to methods described in PCT patent application WO2016/008816. An example of phenylacetic acids (7) is (2-bromo-6-fluoro-phenyl)acetic acid, which may be synthesised according to Reaction scheme 10. A further example of phenylacetic acids (7) is (2-bromo-3-chloro-6-fluoro-phenyl)acetic acid, which may be synthesised according to Reaction scheme 11.

Reaction scheme 6

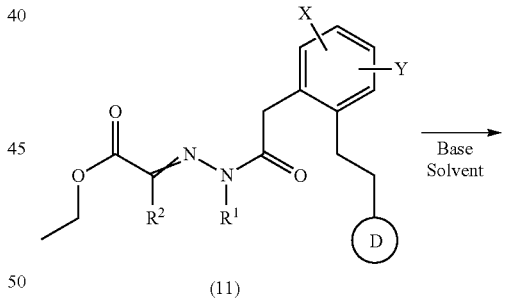

Certain compounds (1-iii) of the present invention may be prepared from compounds (11) as shown in Reaction scheme 6 or from compounds (1-iv) as shown in Reaction scheme 12. Compounds (1-iii) are compounds of formula (I) in which W is —CH$_2$—CH$_2$— and G is hydrogen.

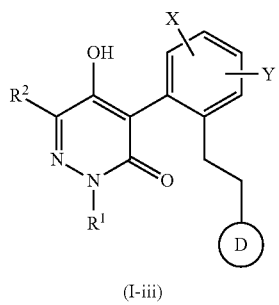

Compounds (1-iii) may be prepared by heating compounds (11) with a base (such as 1,8-diazabicyclo[5.4.0]undec-7-ene, sodium hexamethyldisilazide or lithium hexamethyldisilazide) in a solvent [such as acetonitrile, N,N-dimethylformamide or toluene] at a temperature between 50 and 200° C. Conventional heating or microwave heating may be used.

Compounds (11) may be prepared from compounds (12) as shown in Reaction scheme 7 below.

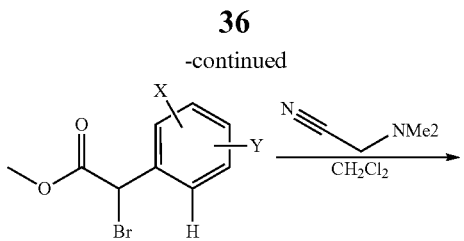

Reaction scheme 7

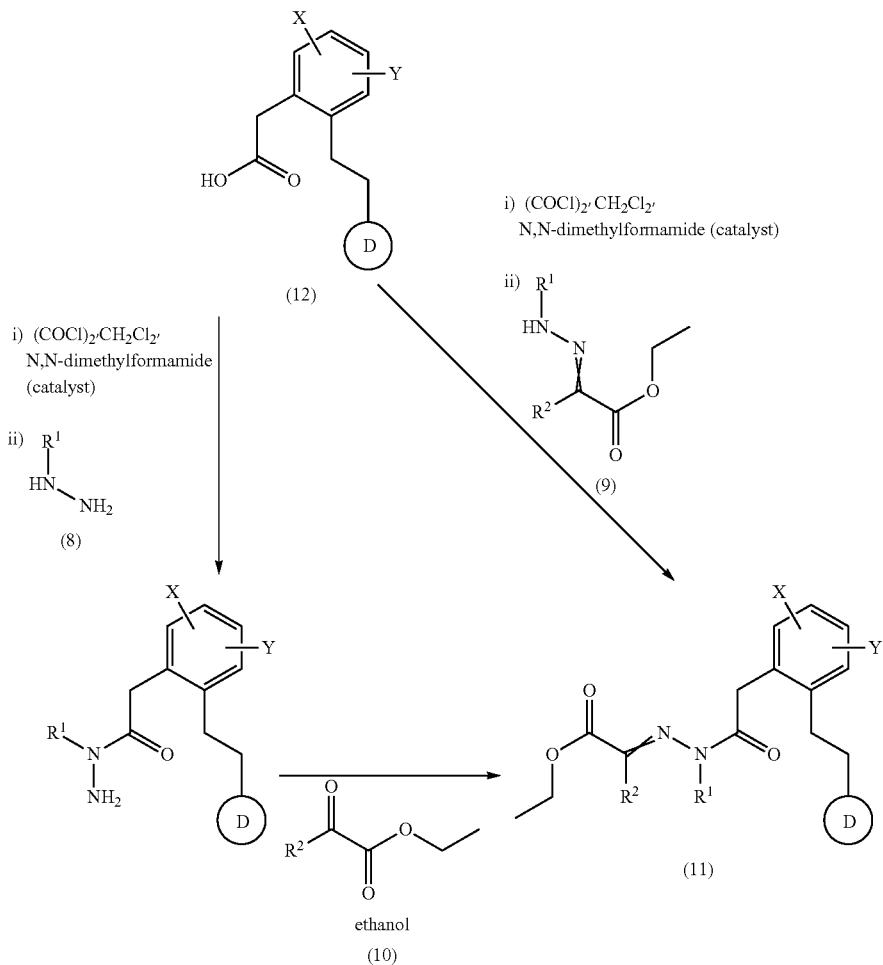

Compounds (12) can be prepared from compounds (13) as shown in Reaction scheme 8. Many compounds (13) are commercially available [such as methyl 2-phenylacetate and methyl 2-(2-fluorophenyl)acetate].

Reaction scheme 8

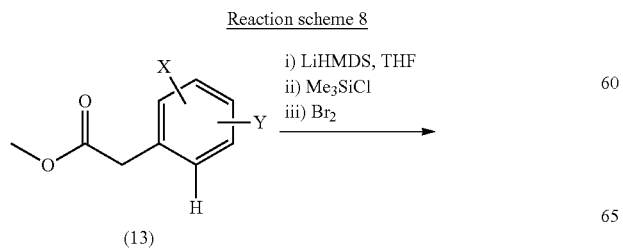

-continued

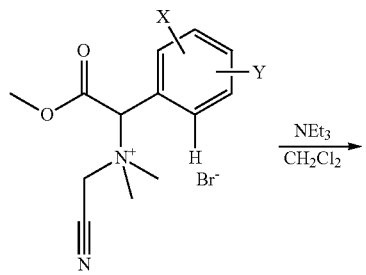

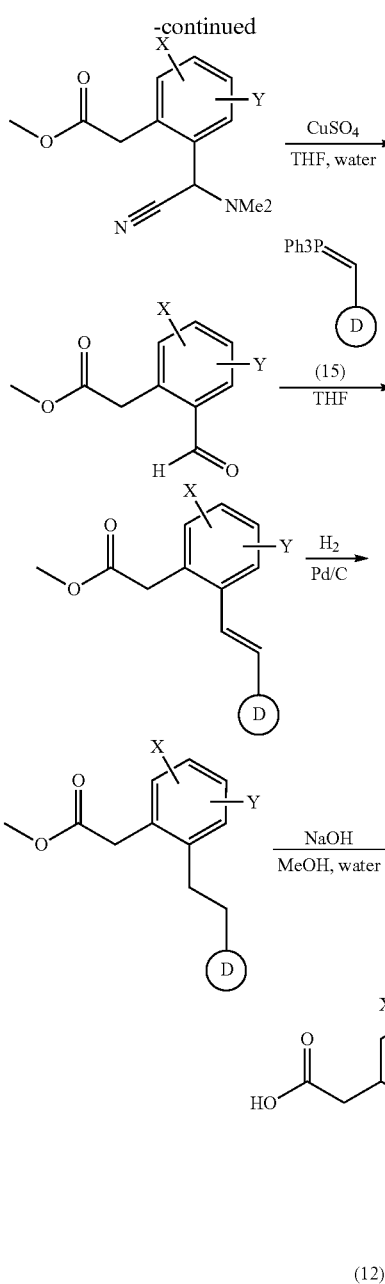

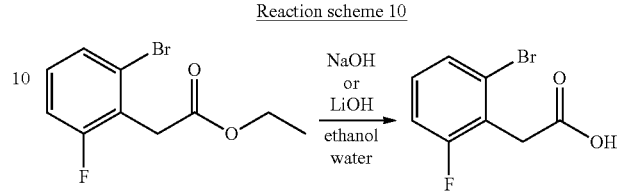

wherein LG is a Leaving Group [such as chloride, bromide, iodide, tosylate or mesylate]. Many compounds (16) are commercially available [such as 4-chlorobenzyl bromide or 2-chloro-5-chloromethylthiazole].

Reaction scheme 10

With respect to Reaction scheme 10, (2-Bromo-6-fluoro-phenyl)acetic acid ethyl ester may be prepared as described in Lundgren et al. *JACS* 2016, 138, 13826-13829.

Reaction scheme 11

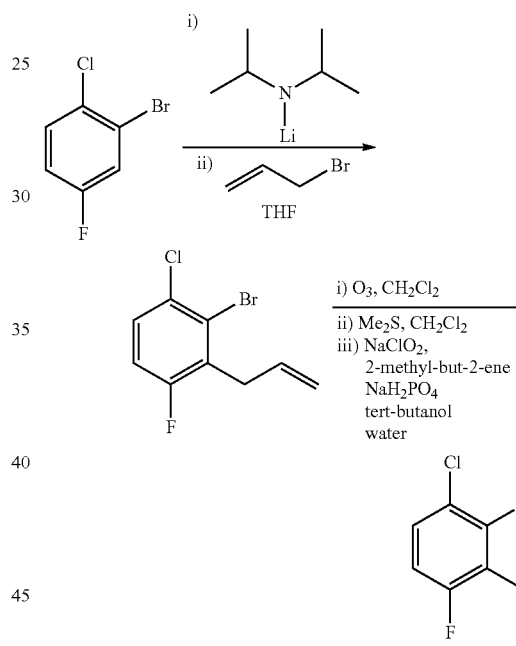

With respect to Reaction scheme [1,2-Bromo-1-chloro-4-fluoro-benzene is commercially available.

Reaction scheme 12

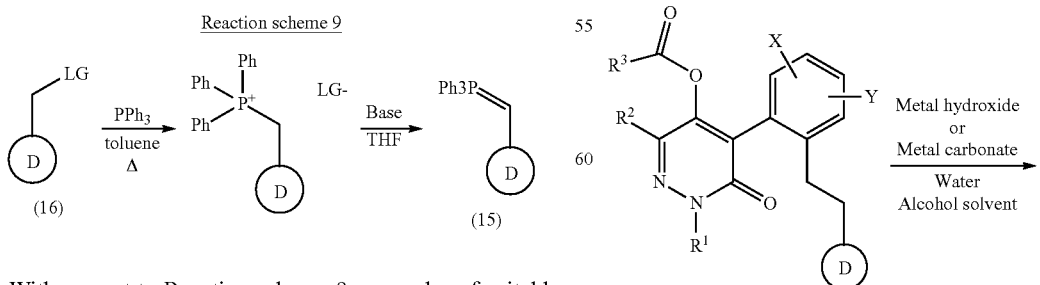

With respect to Reaction scheme 8, phosphoranes (15) can be made according to Reaction scheme 9.

Reaction scheme 9

With respect to Reaction scheme 9, examples of suitable bases are sodium hydride, sodium hexamethyldisilazide and potassium tert-butoxide. Compounds (16) are electrophiles

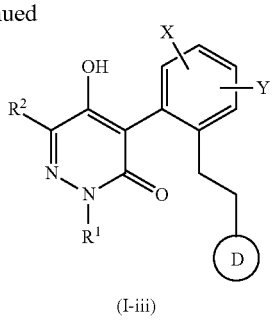

(I-iii)

Compounds (I-iii) may be prepared by treating compounds (I-iv) with a metal hydroxide [such as sodium hydroxide, lithium hydroxide or potassium hydroxide] in a mixture of water and a suitable solvent [such as methanol, ethanol or tetrahydrofuran]; or by treating compounds (I-iv) with a metal carbonate [such as sodium carbonate or potassium carbonate] in an alcohol solvent [such as methanol or ethanol] at a temperature between 0° C. and 100° C. Compounds (I-iv) are compounds of formula (I) in which W is —$CH_2$—$CH_2$— and G is $C(O)R^3$.

Compounds (2) may be prepared from compounds (14) and compounds (15) as shown in Reaction scheme 13, according to either the Suzuki Protocol or the Heck Protocol described. When employing the Suzuki Protocol, compounds (14) are organoboron compounds such as boronic acids, boronic esters or trifluoroborate potassium salts and compounds (15) are halide or pseudo-halide compounds such as chlorides, bromides, iodides or triflates. When employing the Heck Protocol, compounds (14) are styrenes and compounds (15) are halide or pseudo-halide compounds such as chlorides, bromides, iodides or triflates.

Reaction scheme 13

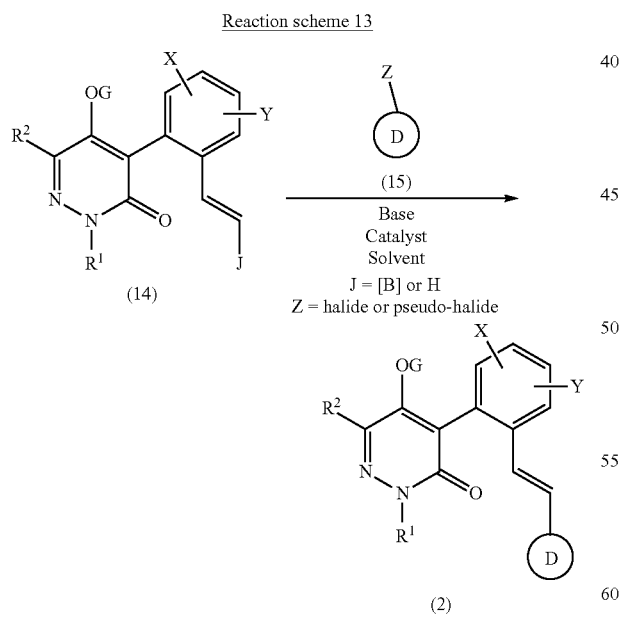

Suzuki Protocol

Compounds (2) may be prepared by treatment of compounds (14) with compounds (15) in the presence of a suitable base and a suitable catalyst in a suitable solvent at a temperature between 10 and 150° C. Examples of suitable bases are potassium carbonate, potassium phosphate, sodium carbonate, sodium bicarbonate and potassium fluoride. Examples of suitable catalysts are 1,1'-bis(diphenylphosphino)ferrocene]dichloropalladium(II) dichloromethane complex [$PdCl_2$(dppf).DCM], tetrakis(triphenylphosphine)palladium(0) [$Pd(PPh_3)_4$], and a catalytic system formed in-situ from a mixture of palladium (II)acetate and triphenylphosphine. Examples of suitable solvents are water, 1,4-dioxane, 2-methyltetrahydrofuran, tetrahydrofuran, acetonitrile and toluene. Many compounds (15) are commercially available or can be made by known methods. Examples of compounds (14) with particular utility in the Suzuki Protocol are isobutyryl esters (14-i) wherein G is isobutyryl.

The skilled man will appreciate that the conditions of the Suzuki Protocol are liable to cleave ester groups, so that Reaction scheme 13 may also describe a reaction wherein starting material (14) contains an ester moiety [such that G is an acyl group], but product (2) does not [such that G is hydrogen].

Heck Protocol

Compounds (2) may be prepared by treatment of compounds (14) with compounds (15) in the presence of a suitable base and a suitable catalyst at a temperature between 10 and 150° C. An additional solvent may optionally be included. Examples of suitable bases are triethylamine, morpholine, N-methylmorpholine, diisopropylethylamine and pyridine. Examples of suitable catalysts are tetrakis(triphenylphosphine)palladium(0) [$Pd(PPh_3)_4$], a catalytic system formed in-situ from a mixture of palladium(II) acetate and triphenylphosphine, a catalytic system formed in-situ from a mixture of tris(dibenzylideneacetone)dipalladium(0) and tri-tertbutylphosphonium tetrafluoroborate and a catalytic system formed in-situ from a palladacycle precatalyst such as chloro[(tri-tert-butylphosphine)-2-(2-aminobiphenyl)] palladium(II). Examples of the optional additional solvent are 1,4-dioxane, tetrahydrofuran, acetonitrile and toluene. Many compounds (15) are commercially available or can be made by known methods. Examples of compounds (14) with particular utility in the Heck Protocol are isobutyryl esters (14-i) wherein G is isobutyryl.

Compounds (14-ii), wherein J is an organoboron species such as a boronic ester, may be prepared from compounds (3) and compounds (16) as shown in Reaction scheme 14.

Reaction scheme 14

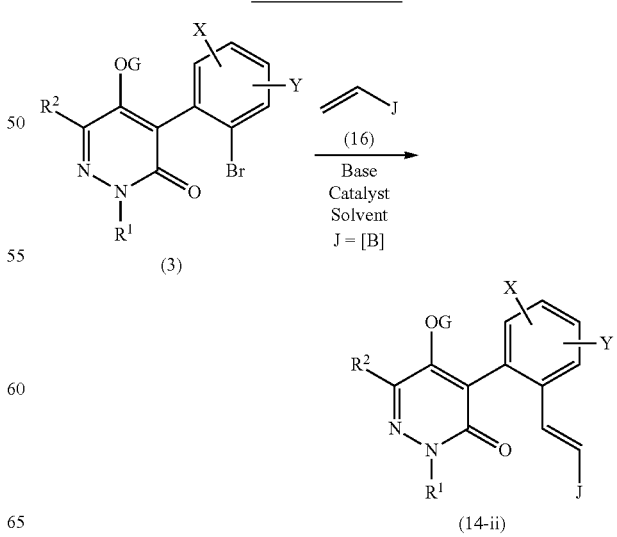

Compounds (14-ii) may be prepared by treatment of compounds (3) with compounds (16) in the presence of a suitable base and a suitable catalyst at a temperature between 10 and 150° C. An additional solvent may optionally be included. Examples of suitable bases are triethylamine, morpholine, N-methylmorpholine, diisopropylethylamine and pyridine. Examples of suitable catalysts are tetrakis(triphenylphosphine)palladium(0) [Pd(PPh$_3$)$_4$], a catalytic system formed in-situ from a mixture of palladium(II) acetate and triphenylphosphine, and a catalytic system formed in-situ from a mixture of tris(dibenzylideneacetone)dipalladium(0) and tri-tertbutylphosphonium tetrafluoroborate. Examples of the optional additional solvent are 1,4-dioxane, tetrahydrofuran, acetonitrile and toluene. Many compounds (16) are commercially available, such as vinylboronic acid MIDA ester or vinylboronic acid pinacol ester, or can be made by known methods. Examples of compounds (3) with particular utility in the Heck Protocol are isobutyryl esters (3-i) wherein G is isobutyryl.

Compounds (18) may be prepared from compounds (3) through a Sonogashira reaction as shown in Reaction scheme 16.

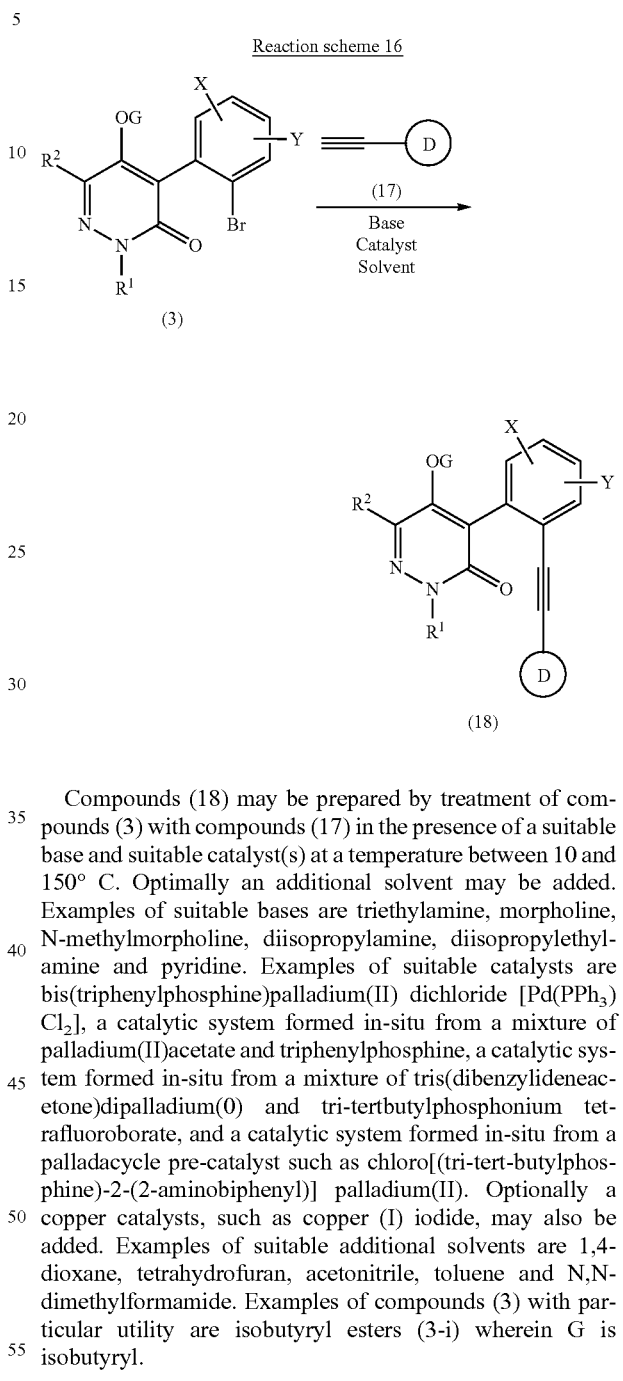

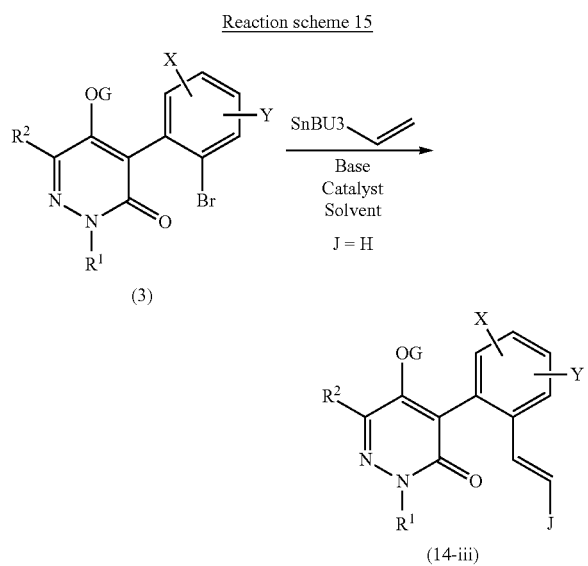

Compounds (14-iii), wherein J is hydrogen, may be prepared from compounds (3) as shown in Reaction scheme 15 above.

Compounds (14-iii) may be prepared by treatment of compounds (3) with tributyl(vinyl)stannane, optionally in the presence of a suitable base, in the presence of a suitable catalyst at a temperature between 10 and 150° C. in a suitable solvent. Examples of the optional base are triethylamine, morpholine, N-methylmorpholine, diisopropylethylamine and pyridine. Examples of suitable catalysts are 1,1'-bis(diphenylphosphino)ferrocene]dichloropalladium (II) dichloromethane complex [PdCl$_2$(dppf).DCM], tetrakis(triphenylphosphine)palladium(0) [Pd(PPh$_3$)$_4$], a catalytic system formed in-situ from a mixture of palladium(II) acetate and triphenylphosphine, a catalytic system formed in-situ from a mixture of tris(dibenzylideneacetone)dipalladium(0) and tri-tertbutylphosphonium tetrafluoroborate, and a catalytic system formed in-situ from a palladacycle pre-catalyst such as chloro[(tri-tert-butylphosphine)-2-(2-aminobiphenyl)] palladium(II). Examples of suitable solvents are 1,4-dioxane, tetrahydrofuran, acetonitrile and toluene. Examples of compounds (3) with particular utility are isobutyryl esters (3-i) wherein G is isobutyryl.

Compounds (18) may be prepared by treatment of compounds (3) with compounds (17) in the presence of a suitable base and suitable catalyst(s) at a temperature between 10 and 150° C. Optimally an additional solvent may be added. Examples of suitable bases are triethylamine, morpholine, N-methylmorpholine, diisopropylamine, diisopropylethylamine and pyridine. Examples of suitable catalysts are bis(triphenylphosphine)palladium(II) dichloride [Pd(PPh$_3$)Cl$_2$], a catalytic system formed in-situ from a mixture of palladium(II)acetate and triphenylphosphine, a catalytic system formed in-situ from a mixture of tris(dibenzylideneacetone)dipalladium(0) and tri-tertbutylphosphonium tetrafluoroborate, and a catalytic system formed in-situ from a palladacycle pre-catalyst such as chloro[(tri-tert-butylphosphine)-2-(2-aminobiphenyl)] palladium(II). Optionally a copper catalysts, such as copper (I) iodide, may also be added. Examples of suitable additional solvents are 1,4-dioxane, tetrahydrofuran, acetonitrile, toluene and N,N-dimethylformamide. Examples of compounds (3) with particular utility are isobutyryl esters (3-i) wherein G is isobutyryl.

The skilled man will appreciate that the conditions of the Sonogashira reaction are liable to cleave ester groups, so that Reaction scheme 16 may also describe a reaction wherein starting material (3) contains an ester moiety [such that G is an acyl group], but product (18) does not [such that G is hydrogen].

Compounds (19) may be prepared from compounds (3) and compounds (20) as shown in Reaction scheme 17, through a Suzuki reaction, wherein compound (20) is a suitable organoboron species, such as a borinic acid, boronate ester or potassium trifluoroborate salt.

Reaction scheme 17

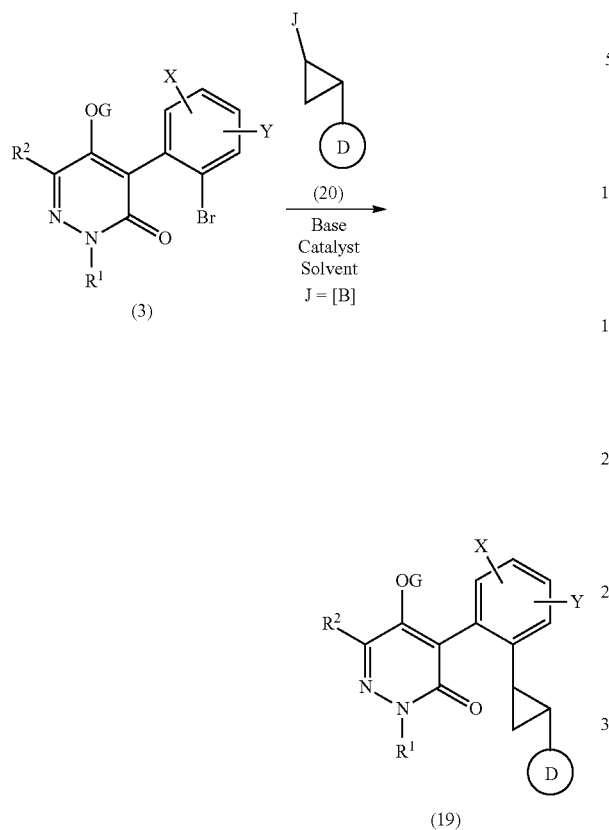

Reaction scheme 18

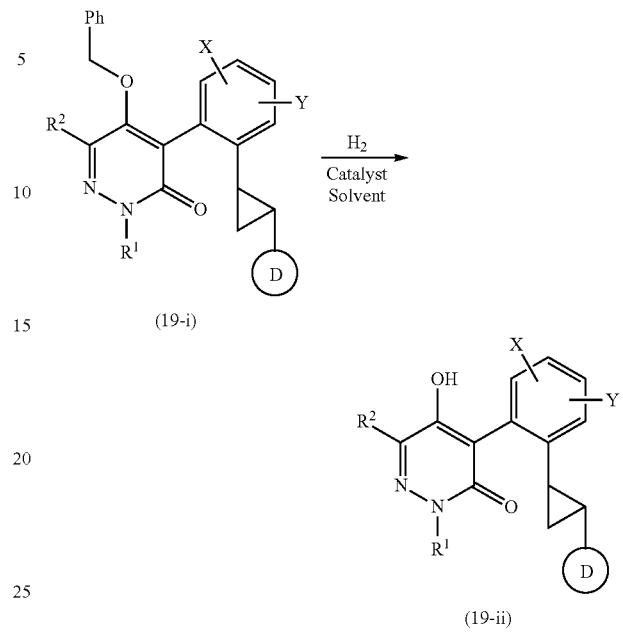

Compounds (19-ii) may be prepared by catalytic hydrogenation of compounds (19-i) with hydrogen gas in a suitable solvent [such as tetrahydrofuran, methanol, ethanol, acetic acid or ethyl acetate] in the presence of a suitable catalyst [such as Pd/C, Pd/CaCO$_3$, Rh/Al$_2$CO$_3$ or sponge nickel] at a temperature between −10 and 100° C.

Certain compounds (I-ii) of the present invention may be prepared from compounds (21) as shown in Reaction scheme 19. Compounds (I-ii) are compounds of formula (I) in which W is —CH$_2$—CH$_2$—.

Compounds (19) may be prepared by treatment of compounds (3) with compounds (20) in the presence of a suitable base and a suitable catalyst in a suitable solvent at a temperature between 10 and 150° C. Examples of suitable bases are potassium carbonate, potassium phosphate, sodium carbonate, sodium bicarbonate and potassium fluoride. Examples of suitable catalysts are 1,1'-bis(diphenylphosphino)ferrocene]dichloropalladium(II) dichloromethane complex [PdCl$_2$(dppf).DCM], a catalytic system formed in-situ from a mixture of tris(dibenzylideneacetone)dipalladium(0) and tri-tertbutylphosphonium tetrafluoroborate, a catalytic system formed in-situ from a mixture of tris(dibenzylideneacetone)dipalladium(0) and tricyclohexylphosphine, a catalytic system formed in-situ from a palladacycle pre-catalyst such as chloro[(tri-tert-butylphosphine)-2-(2-aminobiphenyl)] palladium(II), and a catalytic system formed in-situ from a palladacycle pre-catalyst such as chloro[(tricyclohexylphosphine)-2-(2'-aminobiphenyl)] palladium(II). Examples of suitable solvents are water, 1,4-dioxane, 2-methyltetrahydrofuran, tetrahydrofuran, acetonitrile and toluene. Some compounds (20) are commercially available or can be made by known methods (see for example methods described in Org. Process Res. Dev. 2012, 16, 87-95). Examples of compounds (3) with particular utility in the Suzuki reaction are benzyl ethers (3-ii) wherein G is benzyl.

Reaction scheme 19

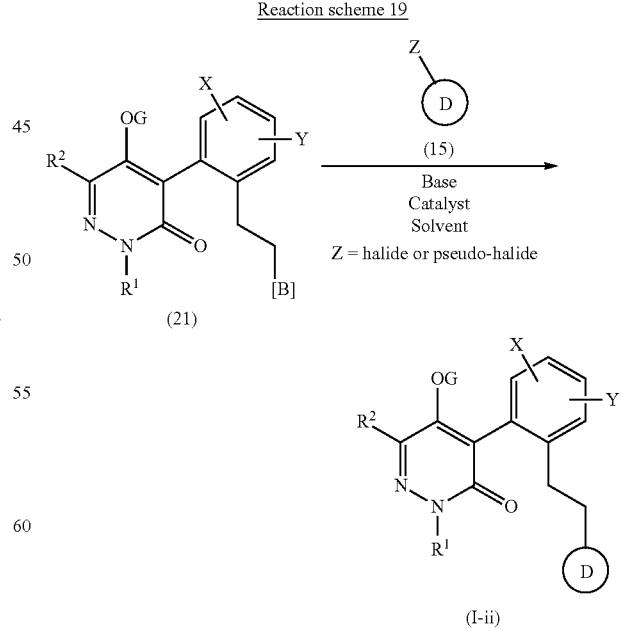

Compounds (I-ii) may be prepared by treatment of compounds (21) where [B] may be a trialkyl borane, alkyl boronic acid, alkyl boronic ester or alkyl potassium trifluoroborate salt, with compounds (15) in the presence of a suitable base and a suitable catalyst in a suitable solvent at a temperature between 10 and 150° C. Examples of suitable bases are potassium carbonate, potassium phosphate, sodium carbonate, caesium carbonate, sodium bicarbonate and potassium fluoride. Examples of suitable catalysts are 1,1'-bis(diphenylphosphino)ferrocene]dichloropalladium (II) dichloromethane complex [PdCl$_2$(dppf).DCM], [1,3-Bis (2,6-Di-3-pentylphenyl)imidazol-2-ylidene](3-chloropyridyl)dichloropalladium(II) [Pd-PEPPSI™-IPent], a catalytic system formed in-situ from a palladacycle pre-catalyst such as chloro(2-dicyclohexylphosphino-2',6'-diisopropoxy-1,1'-biphenyl)[2-(2'-amino-1,1'-biphenyl)]palladium(II) [RuPhos-Pd-G2], [Dicyclohexyl[2',4',6'-tris(1-methylethyl)[1,1'-biphenyl]-2-yl]phosphine] (methanesulfonato-κO)[2'-(methylamino-κN)[1,1'-biphenyl]-2-yl-κC]palladium [XPhos-Pd-G4], and [(4-(N,N-Dimethylamino)phenyl)di-tert-butyl phosphine] (methanesulfonato-κO)[2'-(methylamino-κN)[1,1'-biphenyl]-2-yl-κC]palladium [APhos-Pd-G4]. Examples of suitable solvents are water, 1,4-dioxane, 2-methyltetrahydrofuran, tetrahydrofuran, acetonitrile and toluene. Many compounds (15) are commercially available or can be made by known methods. Examples of compounds (21) with particular utility in the Suzuki Protocol are isobutyryl esters (21-i) wherein G is isobutyryl.

The skilled man will appreciate that the conditions of the Suzuki Protocol are liable to cleave ester groups, so that Reaction Scheme 19 may also describe a reaction wherein starting material (21) contains an ester moiety [such that G is an acyl group], but product (I-ii) does not [such that G is hydrogen].

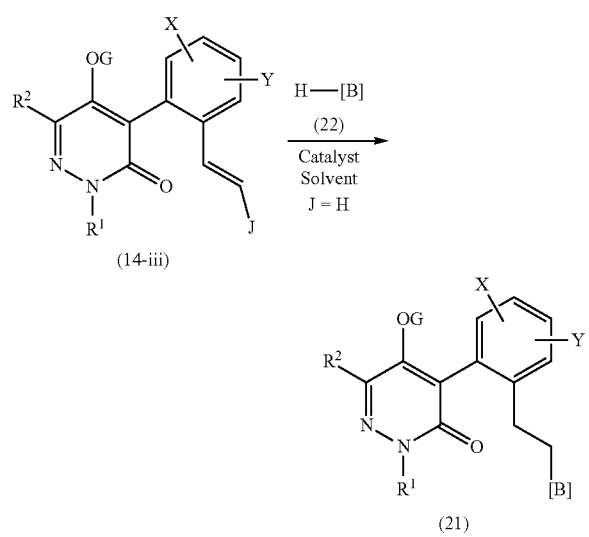

Reaction scheme 20

Compounds (21) may be prepared by hydroboration of alkenes (14-iii) using a suitable hydroborating reagent (22) in a suitable solvent with the optional addition of a suitable catalyst at a temperature between 0° C. and 100° C. Examples of hydroborating reagents include borane, dichloroborane, dibromoborane, 4,4,5,5-tetramethyl-1,3,2-dioxaborolane [pinacolborane], 1,3,2-benzodioxaborole [Catecholborane] or 9-Borylbicyclo[3.3.1]nonane [9-BBN]. Examples of suitable solvents include tetrahydrofuran, 2-methyltetrahydrofuran, 1,4-dioxane, 2-methoxy-2-methyl-propane [MTBE) and diethyl ether. Examples of suitable catalysts include a catalytic system formed in situ from bis(1,5-cyclooctadiene)diiridium(I) dichloride [[Ir (COD)Cl]$_2$], and 4-diphenylphosphanylbutyl(diphenyl) phosphane [DPPB] [*J. Am. Chem. Soc.*, 2004, 126, 9200-9201].

Where [B] is an alkyl boronic ester, this can be converted to the corresponding boronic acid by treatment with methylboronic acid [MeB(OH)$_2$] and trifluoroacetic acid in a suitable solvent such as dichloromethane [DCM] at temperatures between 0 and 40° C. [*Org. Lett.*, 2019, 21, 3048-3052]. Where [B] is an alkyl boronic acid or ester, this may be converted to the corresponding alkyl potassium trifluoroborate salt by treatment with potassium hydrogenfluoride in a suitable solvent such as methanol or acetone at temperatures between 0 and 40° C.

The compounds according to the invention can be used as herbicidal agents in unmodified form, but they are generally formulated into compositions in various ways using formulation adjuvants, such as carriers, solvents and surface-active substances. The formulations can be in various physical forms, e.g. in the form of dusting powders, gels, wettable powders, water-dispersible granules, water-dispersible tablets, effervescent pellets, emulsifiable concentrates, microemulsifiable concentrates, oil-in-water emulsions, oil-flowables, aqueous dispersions, oily dispersions, suspoemulsions, capsule suspensions, emulsifiable granules, soluble liquids, water-soluble concentrates (with water or a water-miscible organic solvent as carrier), impregnated polymer films or in other forms known e.g. from the Manual on Development and Use of FAO and WHO Specifications for Pesticides, United Nations, First Edition, Second Revision (2010). Such formulations can either be used directly or diluted prior to use. The dilutions can be made, for example, with water, liquid fertilisers, micronutrients, biological organisms, oil or solvents.

The formulations can be prepared e.g. by mixing the active ingredient with the formulation adjuvants in order to obtain compositions in the form of finely divided solids, granules, solutions, dispersions or emulsions. The active ingredients can also be formulated with other adjuvants, such as finely divided solids, mineral oils, oils of vegetable or animal origin, modified oils of vegetable or animal origin, organic solvents, water, surface-active substances or combinations thereof.

The active ingredients can also be contained in very fine microcapsules. Microcapsules contain the active ingredients in a porous carrier. This enables the active ingredients to be released into the environment in controlled amounts (e.g. slow-release). Microcapsules usually have a diameter of from 0.1 to 500 microns. They contain active ingredients in an amount of about from 25 to 95% by weight of the capsule weight. The active ingredients can be in the form of a monolithic solid, in the form of fine particles in solid or liquid dispersion or in the form of a suitable solution. The encapsulating membranes can comprise, for example, natural or synthetic rubbers, cellulose, styrene/butadiene copolymers, polyacrylonitrile, polyacrylate, polyesters, polyamides, polyureas, polyurethane or chemically modified polymers and starch xanthates or other polymers that are known to the person skilled in the art. Alternatively, very fine microcapsules can be formed in which the active ingredient is contained in the form of finely divided particles in a solid matrix of base substance, but the microcapsules are not themselves encapsulated.

The formulation adjuvants that are suitable for the preparation of the compositions according to the invention are known per se. As liquid carriers there may be used: water, toluene, xylene, petroleum ether, vegetable oils, acetone, methyl ethyl ketone, cyclohexanone, acid anhydrides, acetonitrile, acetophenone, amyl acetate, 2-butanone, butylene carbonate, chlorobenzene, cyclohexane, cyclohexanol, alkyl esters of acetic acid, diacetone alcohol, 1,2-dichloropropane, diethanolamine, p-diethylbenzene, diethylene glycol, diethylene glycol abietate, diethylene glycol butyl ether, diethylene glycol ethyl ether, diethylene glycol methyl ether, N,N-dimethylformamide, dimethyl sulfoxide, 1,4-dioxane, dipropylene glycol, dipropylene glycol methyl ether, dipropylene glycol dibenzoate, diproxitol, alkylpyrrolidone, ethyl acetate, 2-ethylhexanol, ethylene carbonate, 1,1,1-trichloroethane, 2-heptanone, alpha-pinene, d-limonene, ethyl lactate, ethylene glycol, ethylene glycol butyl ether, ethylene glycol methyl ether, gamma-butyrolactone, glycerol, glycerol acetate, glycerol diacetate, glycerol triacetate, hexadecane, hexylene glycol, isoamyl acetate, isobornyl acetate, isooctane, isophorone, isopropylbenzene, isopropyl myristate, lactic acid, laurylamine, mesityl oxide, methoxypropanol, methyl isoamyl ketone, methyl isobutyl ketone, methyl laurate, methyl octanoate, methyl oleate, methylene chloride, m-xylene, n-hexane, n-octylamine, octadecanoic acid, octylamine acetate, oleic acid, oleylamine, o-xylene, phenol, polyethylene glycol, propionic acid, propyl lactate, propylene carbonate, propylene glycol, propylene glycol methyl ether, p-xylene, toluene, triethyl phosphate, triethylene glycol, xylenesulfonic acid, paraffin, mineral oil, trichloroethylene, perchloroethylene, ethyl acetate, amyl acetate, butyl acetate, propylene glycol methyl ether, diethylene glycol methyl ether, methanol, ethanol, isopropanol, and alcohols of higher molecular weight, such as amyl alcohol, tetrahydro-furfuryl alcohol, hexanol, octanol, ethylene glycol, propylene glycol, glycerol, N-methyl-2-pyrrolidone and the like.

Suitable solid carriers are, for example, talc, titanium dioxide, pyrophyllite clay, silica, attapulgite clay, kieselguhr, limestone, calcium carbonate, bentonite, calcium montmorillonite, cottonseed husks, wheat flour, soybean flour, pumice, wood flour, ground walnut shells, lignin and similar substances.

A large number of surface-active substances can advantageously be used in both solid and liquid formulations, especially in those formulations which can be diluted with a carrier prior to use. Surface-active substances may be anionic, cationic, non-ionic or polymeric and they can be used as emulsifiers, wetting agents or suspending agents or for other purposes. Typical surface-active substances include, for example, salts of alkyl sulfates, such as diethanolammonium lauryl sulfate; salts of alkylarylsulfonates, such as calcium dodecylbenzenesulfonate; alkylphenol/alkylene oxide addition products, such as nonylphenol ethoxylate; alcohol/alkylene oxide addition products, such as tridecylalcohol ethoxylate; soaps, such as sodium stearate; salts of alkylnaphthalenesulfonates, such as sodium dibutylnaphthalenesulfonate; dialkyl esters of sulfosuccinate salts, such as sodium di(2-ethylhexyl)sulfosuccinate; sorbitol esters, such as sorbitol oleate; quaternary amines, such as lauryltrimethylammonium chloride, polyethylene glycol esters of fatty acids, such as polyethylene glycol stearate; block copolymers of ethylene oxide and propylene oxide; and salts of mono- and di-alkylphosphate esters; and also further substances described e.g. in McCutcheon's Detergents and Emulsifiers Annual, MC Publishing Corp., Ridgewood N.J. (1981).

Further adjuvants that can be used in pesticidal formulations include crystallisation inhibitors, viscosity modifiers, suspending agents, dyes, anti-oxidants, foaming agents, light absorbers, mixing auxiliaries, antifoams, complexing agents, neutralising or pH-modifying substances and buffers, corrosion inhibitors, fragrances, wetting agents, take-up enhancers, micro-nutrients, plasticisers, glidants, lubricants, dispersants, thickeners, antifreezes, microbicides, and liquid and solid fertilisers.

The compositions according to the invention can include an additive comprising an oil of vegetable or animal origin, a mineral oil, alkyl esters of such oils or mixtures of such oils and oil derivatives. The amount of oil additive in the composition according to the invention is generally from 0.01 to 10%, based on the mixture to be applied. For example, the oil additive can be added to a spray tank in the desired concentration after a spray mixture has been prepared. Preferred oil additives comprise mineral oils or an oil of vegetable origin, for example rapeseed oil, olive oil or sunflower oil, emulsified vegetable oil, alkyl esters of oils of vegetable origin, for example the methyl derivatives, or an oil of animal origin, such as fish oil or beef tallow. Preferred oil additives comprise alkyl esters of $C_8$-$C_{22}$ fatty acids, especially the methyl derivatives of $C_{12}$-$C_{18}$ fatty acids, for example the methyl esters of lauric acid, palmitic acid and oleic acid (methyl laurate, methyl palmitate and methyl oleate, respectively). Many oil derivatives are known from the Compendium of Herbicide Adjuvants, $10^{th}$ Edition, Southern Illinois University, 2010.

The herbicidal compositions generally comprise from 0.1 to 99% by weight, especially from 0.1 to 95% by weight, compounds of Formula (I) and from 1 to 99.9% by weight of a formulation adjuvant which preferably includes from 0 to 25% by weight of a surface-active substance. The inventive compositions generally comprise from 0.1 to 99% by weight, especially from 0.1 to 95% by weight, of compounds of the present invention and from 1 to 99.9% by weight of a formulation adjuvant which preferably includes from 0 to 25% by weight of a surface-active substance. Whereas commercial products may preferably be formulated as concentrates, the end user will normally employ dilute formulations.

The rates of application vary within wide limits and depend on the nature of the soil, the method of application, the crop plant, the pest to be controlled, the prevailing climatic conditions, and other factors governed by the method of application, the time of application and the target crop. As a general guideline compounds may be applied at a rate of from 1 to 2000 I/ha, especially from 10 to 1000 I/ha.

Preferred formulations can have the following compositions (weight %):

Emulsifiable concentrates:

| | |
|---|---|
| active ingredient: | 1 to 95%, preferably 60 to 90% |
| surface-active agent: | 1 to 30%, preferably 5 to 20% |
| liquid carrier: | 1 to 80%, preferably 1 to 35% |

Dusts:

| | |
|---|---|
| active ingredient: | 0.1 to 10%, preferably 0.1 to 5% |
| solid carrier: | 99.9 to 90%, preferably 99.9 to 99% |

Suspension concentrates:

| | |
|---|---|
| active ingredient: | 5 to 75%, preferably 10 to 50% |
| water: | 94 to 24%, preferably 88 to 30% |
| surface-active agent: | 1 to 40%, preferably 2 to 30% |

-continued

Wettable powders:

| | |
|---|---|
| active ingredient: | 0.5 to 90%, preferably 1 to 80% |
| surface-active agent: | 0.5 to 20%, preferably 1 to 15% |
| solid carrier: | 5 to 95%, preferably 15 to 90% |

Granules:

| | |
|---|---|
| active ingredient: | 0.1 to 30%, preferably 0.1 to 15% |
| solid carrier: | 99.5 to 70%, preferably 97 to 85% |

The composition of the present may further comprise at least one additional pesticide. For example, the compounds according to the invention can also be used in combination with other herbicides or plant growth regulators. In a preferred embodiment the additional pesticide is a herbicide and/or herbicide safener.

Thus, compounds of Formula (I) can be used in combination with one or more other herbicides to provide various herbicidal mixtures. Specific examples of such mixtures include (wherein "I" represents a compound of Formula (I)):—I+acetochlor; I+aciflurofen (including aciflurofen-sodium); I+aclonifen; 1+ametryn; I+amicarbazone; I+aminopyralid; I+aminotriazole; I+atrazine; I+beflubutamid-M; I+benquitrione; I+bensulfuron (including bensulfuron-methyl); I+bentazone; I+bicyclopyrone; I+bilanafos; I+bispyribac-sodium; I+bixlozone; I+bromacil; I+bromoxynil; I+butachlor; I+butafenacil; I+carfentrazone (including carfentrazone-ethyl); I+cloransulam (including cloransulam-methyl); I+chlorimuron (including chlorimuron-ethyl); I+chlorotoluron; I+chlorsulfuron; I+cinmethylin; I+clacyfos; I+clethodim; I+clodinafop (including clodinafop-propargyl); I+clomazone; I+clopyralid; I+cyclopyranil; I+cyclopyrimorate; I+cyclosulfamuron; I+cyhalofop (including cyhalofop-butyl); I+2,4-D (including the choline salt and 2-ethylhexyl ester thereof); I+2,4-DB; I+desmedipham; I+dicamba (including the aluminium, aminopropyl, bis-aminopropylmethyl, choline, dichloroprop, diglycolamine, dimethylamine, dimethylammonium, potassium and sodium salts thereof); I+diclosulam; I+diflufenican; I+diflufenzopyr; I+dimethachlor; I+dimethenamid-P; I+diquat dibromide; I+diuron; I+epyrifenacil; I+ethalfluralin; I+ethofumesate; I+fenoxaprop (including fenoxaprop-P-ethyl); I+fenoxasulfone; I+fenquinotrione; I+fentrazamide; I+flazasulfuron; I+florasulam; I+florpyrauxifen (including florpyrauxifen-benzyl); I+fluazifop (including fluazifop-P-butyl); I+flucarbazone (including flucarbazone-sodium); I+flufenacet; I+flumetsulam; I+flumioxazin; I+fluometuron; I+flupyrsulfuron (including flupyrsulfuron-methyl-sodium); I+fluroxypyr (including fluroxypyr-meptyl); 1+fomesafen; I+foramsulfuron; I+glufosinate (including the ammonium salt thereof); I+glyphosate (including the diammonium, isopropylammonium and potassium salts thereof; I+halauxifen (including halauxifen-methyl); I+haloxyfop (including haloxyfop-methyl); I+hexazinone; I+hydantocidin; I+imazamox; I+imazapic; I+imazapyr; I+imazethapyr; I+indaziflam; I+iodosulfuron (including iodosulfuron-methyl-sodium); I+iofensulfuron (including iofensulfuron-sodium); I+ioxynil; I+isoproturon; I+isoxaflutole; I+lancotrione; I+MCPA; I+MCPB; I+mecoprop-P; I+mesosulfuron (including mesosulfuron-methyl); I+mesotrione; I+metamitron; I+metazachlor; I+methiozolin; I+metolachlor; I+metosulam; I+metribuzin; I+metsulfuron; I+napropamide; I+nicosulfuron; I+norflurazon; I+oxadiazon; I+oxasulfuron; I+oxyfluorfen; I+paraquat dichloride; I+pendimethalin; I+penoxsulam; I+phenmedipham; I+picloram; I+pinoxaden; I+pretilachlor; I+primisulfuron-methyl; I+prometryne; I+propanil; I+propaquizafop; I+propyrisulfuron; I+propyzamide; I+prosulfocarb; I+prosulfuron; I+pyraclonil; I+pyraflufen (including pyraflufen-ethyl); I+pyrasulfotole; I+pyridate; I+pyriftalid; I+pyrimisulfan; I+pyroxasulfone; I+pyroxsulam; I+quinclorac; I+quinmerac; I+quizalofop (including quizalofop-P-ethyl and quizalofop-P-tefuryl); I+rimsulfuron; I+saflufenacil; I+sethoxydim; I+simazine; I+S-metalochlor; I+sulfentrazone; I+sulfosulfuron; I+tebuthiuron; I+tefuryltrione; I+tembotrione; I+terbuthylazine; I+terbutryn; I+tetflupyrolimet; I+thiencarbazone; I+thifensulfuron; I+tiafenacil; I+tolpyralate; I+topramezone; I+tralkoxydim; I+triafamone; I+triallate; I+triasulfuron; I+tribenuron (including tribenuron-methyl); I+triclopyr; I+trifloxysulfuron (including trifloxysulfuron-sodium); I+trifludimoxazin; I+trifluralin; I+triflusulfuron; I+3-(2-chloro-4-fluoro-5-(3-methyl-2,6-dioxo-4-trifluoromethyl-3,6-dihydropyrimidin-1(2H)-yl)phenyl)-5-methyl-4,5-dihydroisoxazole-5-carboxylic acid ethyl ester; I+4-hydroxy-1-methoxy-5-methyl-3-[4-(trifluoromethyl)-2-pyridyl]imidazolidin-2-one; I+4-hydroxy-1,5-dimethyl-3-[4-(trifluoromethyl)-2-pyridyl]imidazolidin-2-one; I+5-ethoxy-4-hydroxy-1-methyl-3-[4-(trifluoromethyl)-2-pyridyl]imidazolidin-2-one; I+4-hydroxy-1-methyl-3-[4-(trifluoromethyl)-2-pyridyl]imidazolidin-2-one; I+4-hydroxy-1,5-dimethyl-3-[1-methyl-5-(trifluoromethyl) pyrazol-3-yl]imidazolidin-2-one; I+(4R)$_1$-(5-tert-butylisoxazol-3-yl)-4-ethoxy-5-hydroxy-3-methyl-imidazolidin-2-one; I+3-[2-(3,4-dimethoxyphenyl)-6-methyl-3-oxo-pyridazine-4-carbonyl]bicyclo[3.2.1]octane-2,4-dione; I+2-[2-(3,4-dimethoxyphenyl)-6-methyl-3-oxo-pyridazine-4-carbonyl]-5-methyl-cyclohexane-1,3-dione; I+2-[2-(3,4-dimethoxyphenyl)-6-methyl-3-oxo-pyridazine-4-carbonyl]cyclohexane-1,3-dione; I+2-[2-(3,4-dimethoxyphenyl)-6-methyl-3-oxo-pyridazine-4-carbonyl]-5,5-dimethyl-cyclohexane-1,3-dione; I+6-[2-(3,4-dimethoxyphenyl)-6-methyl-3-oxo-pyridazine-4-carbonyl]-2,2,4,4-tetramethyl-cyclohexane-1,3,5-trione; I+2-[2-(3,4-dimethoxyphenyl)-6-methyl-3-oxo-pyridazine-4-carbonyl]-5-ethyl-cyclohexane-1,3-dione; I+2-[2-(3,4-dimethoxyphenyl)-6-methyl-3-oxo-pyridazine-4-carbonyl]-4,4,6,6-tetramethyl-cyclohexane-1,3-dione; I+2-[6-cyclopropyl-2-(3,4-dimethoxyphenyl)-3-oxo-pyridazine-4-carbonyl]-5-methyl-cyclohexane-1,3-dione; I+3-[6-cyclopropyl-2-(3,4-dimethoxyphenyl)-3-oxo-pyridazine-4-carbonyl]bicyclo[3.2.1]octane-2,4-dione; I+2-[6-cyclopropyl-2-(3,4-dimethoxyphenyl)-3-oxo-pyridazine-4-carbonyl]-5,5-dimethyl-cyclohexane-1,3-dione; I+6-[6-cyclopropyl-2-(3,4-dimethoxyphenyl)-3-oxo-pyridazine-4-carbonyl]-2,2,4,4-tetramethyl-cyclohexane-1,3,5-trione; I+2-[6-cyclopropyl-2-(3,4-dimethoxyphenyl)-3-oxo-pyridazine-4-carbonyl]cyclohexane-1,3-dione; I+4-[2-(3,4-dimethoxyphenyl)-6-methyl-3-oxo-pyridazine-4-carbonyl]-2,2,6,6-tetramethyl-tetrahydropyran-3,5-dione; I+4-[6-cyclopropyl-2-(3,4-dimethoxyphenyl)-3-oxo-pyridazine-4-carbonyl]-2,2,6,6-tetramethyl-tetrahydropyran-3,5-dione; I+4-amino-3-chloro-5-fluoro-6-(7-fluoro-1H-indol-6-yl) pyridine-2-carboxylic acid (including agrochemically acceptable esters thereof, for example, methyl 4-amino-3-chloro-5-fluoro-6-(7-fluoro-1H-indol-6-yl)pyridine-2-carboxylate, prop-2-ynyl 4-amino-3-chloro-5-fluoro-6-(7-fluoro-1H-indol-6-yl)pyridine-2-carboxylate and cyanomethyl 4-amino-3-chloro-5-fluoro-6-(7-fluoro-1H-indol-6-yl)pyridine-2-carboxylate); I+3-ethylsulfanyl-N-(1,3,4-oxadiazol-2-yl)-5-(trifluoromethyl)-[1,2,4]triazolo[4,3-a] pyridine-8-carboxamide; I+3-(isopropylsulfanylmethyl)-N-(5-methyl-1,3,4-oxadiazol-2-yl)-5-(trifluoromethyl)-[1,2,4] triazolo[4,3-a]pyridine-8-carboxamide; I+3-

(isopropylsulfonylmethyl)-N-(5-methyl-1,3,4-oxadiazol-2-yl)-5-(trifluoromethyl)-[1,2,4]triazolo[4,3-a]pyridine-8-carboxamide; I+3-(ethylsulfonylmethyl)-N-(5-methyl-1,3,4-oxadiazol-2-yl)-5-(trifluoromethyl)-[1,2,4]triazolo[4,3-a]pyridine-8-carboxamide; I+ethyl 2-[[3-[[3-chloro-5-fluoro-6-[3-methyl-2,6-dioxo-4-(trifluoromethyl)pyrimidin-1-yl]-2-pyridyl]oxy]acetate; I+6-chloro-4-(2,7-dimethyl-1-naphthyl)-5-hydroxy-2-methyl-pyridazin-3-one; I+1-[2-chloro-6-(5-chloropyrimidin-2-yl)oxy-phenyl]-4,4,4-trifluoro-butan-1-one and I+5-[2-chloro-6-(5-chloropyrimidin-2-yl)oxy-phenyl]-3-(difluoromethyl) isoxazole. The mixing partners of the compound of Formula (I) may also be in the form of esters or salts, as mentioned e.g. in The Pesticide Manual, Fourteenth Edition, British Crop Protection Council, 2006.

The compound of Formula (I) can also be used in mixtures with other agrochemicals such as fungicides, nematicides or insecticides, examples of which are given in The Pesticide Manual.

The mixing ratio of the compound of Formula (I) to the mixing partner is preferably from 1:100 to 1000:1.

The mixtures can advantageously be used in the above-mentioned formulations (in which case "active ingredient" relates to the respective mixture of compound of Formula (I) with the mixing partner).

Compounds of Formula (I) of the present invention may also be combined with herbicide safeners. Preferred combinations (wherein "I" represents a compound of Formula (I)) include:— I+benoxacor, I+cloquintocet (including cloquintocet-mexyl); I+cyprosulfamide; I+dichlormid; I+fenchlorazole (including fenchlorazole-ethyl); I+fenclorim; I+fluxofenim; I+furilazole I+isoxadifen (including isoxadifen-ethyl); I+mefenpyr (including mefenpyr-diethyl); I+metcamifen; I+N-(2-methoxybenzoyl)-4-[(methyl-aminocarbonyl)amino] benzenesulfonamide and I+oxabetrinil.

Particularly preferred are mixtures of a compound of Formula (I) with cyprosulfamide, isoxadifen (including isoxadifen-ethyl), cloquintocet (including cloquintocet-mexyl) and/or N-(2-methoxybenzoyl)-4-[(methyl-aminocarbonyl)amino]benzenesulfonamide.

The safeners of the compound of Formula (I) may also be in the form of esters or salts, as mentioned e.g. in The Pesticide Manual, 14$^{th}$ Edition (BCPC), 2006. The reference to cloquintocet-mexyl also applies to a lithium, sodium, potassium, calcium, magnesium, aluminium, iron, ammonium, quaternary ammonium, sulfonium or phosphonium salt thereof as disclosed in WO 02/34048, and the reference to fenchlorazole-ethyl also applies to fenchlorazole, etc.

Preferably the mixing ratio of compound of Formula (I) to safener is from 100:1 to 1:10, especially from 20:1 to 1:1.

The mixtures can advantageously be used in the above-mentioned formulations (in which case "active ingredient" relates to the respective mixture of compound of Formula (I) with the safener).

The compounds of Formula (I) of this invention are useful as herbicides. The present invention therefore further comprises a method for controlling unwanted plants comprising applying to the said plants or a locus comprising them, an effective amount of a compound of the invention or a herbicidal composition containing said compound. 'Controlling' means killing, reducing or retarding growth or preventing or reducing germination. Generally the plants to be controlled are unwanted plants (weeds). 'Locus' means the area in which the plants are growing or will grow.

The rates of application of compounds of Formula (I) may vary within wide limits and depend on the nature of the soil, the method of application (pre-emergence; post-emergence; application to the seed furrow; no tillage application etc.), the crop plant, the weed(s) to be controlled, the prevailing climatic conditions, and other factors governed by the method of application, the time of application and the target crop. The compounds of Formula (I) according to the invention are generally applied at a rate of from 10 to 2000 g/ha, especially from 50 to 1000 g/ha.

The application is generally made by spraying the composition, typically by tractor mounted sprayer for large areas, but other methods such as dusting (for powders), drip or drench can also be used.

Useful plants in which the composition according to the invention can be used include crops such as cereals, for example barley and wheat, cotton, oilseed rape, sunflower, maize, rice, soybeans, sugar beet, sugar cane and turf.

Crop plants can also include trees, such as fruit trees, palm trees, coconut trees or other nuts. Also included are vines such as grapes, fruit bushes, fruit plants and vegetables.

Crops are to be understood as also including those crops which have been rendered tolerant to herbicides or classes of herbicides (e.g. ALS-, GS-, EPSPS-, PPO-, ACCase- and HPPD-inhibitors) by conventional methods of breeding or by genetic engineering. An example of a crop that has been rendered tolerant to imidazolinones, e.g. imazamox, by conventional methods of breeding is Clearfield@ summer rape (canola). Examples of crops that have been rendered tolerant to herbicides by genetic engineering methods include e.g. glyphosate- and glufosinate-resistant maize varieties commercially available under the trade names RoundupReady® and LibertyLink®.

Crops are also to be understood as being those which have been rendered resistant to harmful insects by genetic engineering methods, for example Bt maize (resistant to European corn borer), Bt cotton (resistant to cotton boll weevil) and also Bt potatoes (resistant to Colorado beetle).

Examples of Bt maize are the Bt 176 maize hybrids of NK® (Syngenta Seeds). The Bt toxin is a protein that is formed naturally by *Bacillus thuringiensis* soil bacteria. Examples of toxins, or transgenic plants able to synthesise such toxins, are described in EP-A-451 878, EP-A-374 753, WO 93/07278, WO 95/34656, WO 03/052073 and EP-A-427 529. Examples of transgenic plants comprising one or more genes that code for an insecticidal resistance and express one or more toxins are KnockOut® (maize), Yield Gard® (maize), NuCOTIN33B® (cotton), Bollgard® (cotton), NewLeaf® (potatoes), NatureGard® and Protexcta®. Plant crops or seed material thereof can be both resistant to herbicides and, at the same time, resistant to insect feeding ("stacked" transgenic events). For example, seed can have the ability to express an insecticidal Cry3 protein while at the same time being tolerant to glyphosate.

Crops are also to be understood to include those which are obtained by conventional methods of breeding or genetic engineering and contain so-called output traits (e.g. improved storage stability, higher nutritional value and improved flavour).

Other useful plants include turf grass for example in golf-courses, lawns, parks and roadsides, or grown commercially for sod, and ornamental plants such as flowers or bushes.

Compounds of Formula (I) and compositions of the invention can typically be used to control a wide variety of monocotyledonous and dicotyledonous weed species. Examples of monocotyledonous species that can typically be controlled include *Alopecurus myosuroides, Avena fatua, Brachiaria plantaginea, Bromus tectorum, Cyperus escu-*

*lentus, Digitaria sanguinalis, Echinochloa crus-galli, Lolium perenne, Lolium multiflorum, Panicum miliaceum, Poa annua, Setaria viridis, Setaria faberi* and *Sorghum bicolor*. Examples of dicotyledonous species that can be controlled include *Abutilon theophrasti, Amaranthus retroflexus, Bidens pilosa, Chenopodium album, Euphorbia heterophylla, Galium aparine, Ipomoea hederacea, Kochia scoparia, Polygonum convolvulus, Sida spinosa, Sinapis arvensis, Solanum nigrum, Stellaria media, Veronica persica* and *Xanthium strumarium*. Weeds can also include plants which may be considered crop plants but which are growing outside a crop area ('escapes'), or which grow from seed left over from a previous planting of a different crop ('volunteers'). Such volunteers or escapes may be tolerant to certain other herbicides.

Various aspects and embodiments of the present invention will now be illustrated in more detail by way of example. It will be appreciated that modification of detail may be made without departing from the scope of the invention.

PREPARATION EXAMPLES

Example 1 Preparation of [5-[3-chloro-6-fluoro-2-[2-(2-methyl-6-quinolyl)ethyl]phenyl]-1,3-dimethyl-6-oxo-pyridazin-4-yl] 2-methyipropanoate (A-3.034)

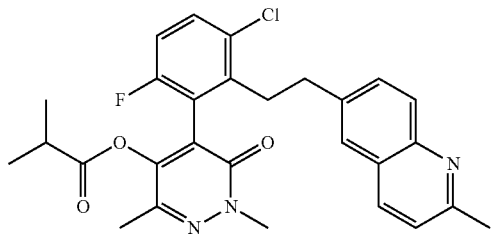

1.1 3-Allyl-2-bromo-1-chloro-4-fluoro-benzene

A solution of lithium diisopropylamide (2M in tetrahydrofuran, 3.6 ml, 7.2 mmol) was cooled to −78° C. under N₂. A solution of 2-bromo-1-chloro-4-fluoro-benzene (1.0 g, 4.8 mmol) in tetrahydrofuran was added dropwise at −78° C. The mixture was stirred for 45 minutes at the same temperature before being treated with allyl bromide (0.3 ml, 5.7 mmol). The reaction was continued at −78° C. for 2 h then allowed to warm to rt. The reaction was quenched with sat. NH₄Cl (aq) and extracted with ethyl acetate. The organics were separated and kept, then washed with brine. The organics were dried over sodium sulfate and concentrated under reduced pressure to give 3-allyl-2-bromo-1-chloro-4-fluoro-benzene (1.2 g, 100%) as an oil.

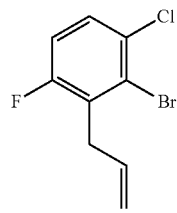

$^1$H NMR (400 MHz, CDCl₃) δ$_H$: 7.34-7.30 (m, 1H), 7.01-6.96 (m, 1H), 5.94-5.83 (m, 1H), 5.10-5.00 (m, 2H), 3.64-3.58 (m, 2H).

1.2 2-(2-Bromo-3-chloro-6-fluoro-phenyl)acetic Acid

A solution of 3-allyl-2-bromo-1-chloro-4-fluoro-benzene (15.0 g, 60.1 mmol) in dichloromethane (200 mL) in a 2-necked flask was cooled to −78° C. One side neck was connected to a trap containing an aqueous solution of KI. Ozone was bubbled through the solution until the starting material was fully consumed (5 hours). Air was bubbled through the solution for 10 minutes to remove excess ozone. Dimethyl sulfide (44 ml, 601 mmol) was added and the mixture allowed to warm to rt. The reaction was continued for 16 h at rt.

The mixture was washed with brine (2×100 mL) and the organic layer kept. The organics were dried over Na₂SO₄, filtered and concentrated under reduced pressure to give crude 2-(2-bromo-3-chloro-6-fluoro-phenyl)acetaldehyde (15.3 g) which was used for the next step without further purification.

Crude 2-(2-bromo-3-chloro-6-fluoro-phenyl)acetaldehyde (15.3 g, 60.8 mmol) was dissolved in a mixture of tert-butanol (92 mL) and water (46 mL) then cooled to 0° C. 2-methylbut-2-ene (64.5 mL, 608 mmol), sodium dihydrogen phosphate (34.6 g, 243 mmol) and sodium chlorite (16.5 g, 163 mmol) were added. The mixture was stirred for 2 h then diluted with brine (150 mL) and 2M hydrochloric acid (150 mL). The mixture was extracted with ethyl acetate (3×100 mL). The combined organic extracts were washed with a saturated aqueous solution of sodium metabisulfite (100 mL) then dried over Na₂SO₄, filtered and concentrated under reduced pressure to provide a pale yellow solid. The crude solid was dissolved in a mixture of water (100 mL) and 2.0 M NaOH (30 mL). The aqueous solution was washed with ethyl acetate (100 mL) and the organics discarded. The aqueous layer was acidified by addition of concentrated hydrochloric acid (20 mL) resulting in the formation of a white suspension. The mixture was extracted with ethyl acetate (3×200 mL). The combined organics were washed with brine, dried over Na₂SO₄, filtered and evaporated to provide 2-(2-bromo-3-chloro-6-fluoro-phenyl)acetic acid (8.0 g, 49%) as a white solid.

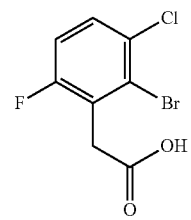 [SMILES: O=C(O)Cc1c(F)ccc(Cl)c1Br]

$^1$H NMR (400 MHz, DMSO-d₆) δ$_H$: 12.79 (br.s, 1H), 7.67-7.59 (m, 1H), 7.39-7.31 (m, 1H), 3.82 (s, 2H).

1.3 2-(2-Bromo-3-chloro-6-fluoro-phenyl)-N-methyl-acetohydrazide

To a stirred solution of 2-(2-bromo-3-chloro-6-fluoro-phenyl)acetic acid (2.0 g, 7.5 mmol) in dichloromethane (20 ml) at 0° C. was added N-(3-Dimethylaminopropyl)-N'-ethylcarbodiimide hydrochloride [EDC.HCl] (1.4 g, 9.0 mmol), followed by dropwise addition of methyl hydrazine (0.4 ml, 7.5 mmol). The temperature of the reaction mixture was maintained at 0° C. for 3 h. The reaction was then quenched with water and extracted into dichloromethane. The organics were separated, washed with brine and dried over Na$_2$SO$_4$. Concentration under reduced pressure gave crude 2-(2-bromo-3-chloro-6-fluoro-phenyl)-N-methyl-acetohydrazide (1.8 g, 81%) which was used in the next step without further purification.

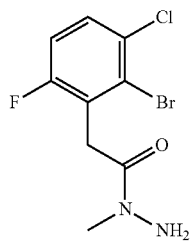

$^1$H NMR (400 MHz, DMSO-d6) δ$_H$: 7.59 (dd, J=8.9 and 5.4, 1H), 7.30 (t, J=8.9, 1H), 4.91 (s, 2H), 4.10 (br. s, 2H), 3.02 (s, 3H).

1.4 2-{[2-(2-Bromo-3-chloro-6-fluoro-phenyl)-acetyl]-methyl-hydrazono}-propionic Acid Ethyl Ester To a stirred solution of 2-(2-bromo-3-chloro-6-fluoro-phenyl)-N-methyl-acetohydrazide (1.8 g, 6.09 mmol) in ethanol (5 ml) was added ethyl pyruvate (0.7 ml, 6.7 mmol) dropwise. The reaction was heated at 80° C. for 4 h. The reaction mixture was then allowed to cool to rt, and evaporated under reduced pressure. The residue was purified by column chromatography on silica gel (eluent an ethyl acetate/hexane gradient) to give the desired compound 2-{[2-(2-Bromo-3-chloro-6-fluoro-phenyl)-acetyl]-methyl-hydrazono}-propionic acid ethyl ester (1.8 g, 75%) as an off-white solid.

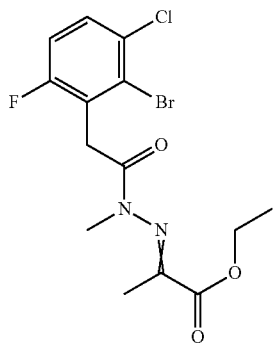 [SMILES: CCOC(=O)C(C)=NN(C)C(=O)Cc1c(F)ccc(Cl)c1Br]

$^1$H NMR (400 MHz, CDCl$_3$) δ$_H$: 7.40-7.35 (m, 1H), 7.04-6.98 (m, 1H), 4.32 (q, J=7.1, 2H), 4.24 (s, 2H), 3.41 (s, 3H), 2.32 (s, 3H), 1.36 (t, J=7.1, 3H).

1.5 4-(2-Bromo-3-chloro-6-fluoro-phenyl)-5-hydroxy-2,6-dimethyl-pyridazin-3-one

2-{[2-(2-Bromo-3-chloro-6-fluoro-phenyl)-acetyl]-methyl-hydrazono}-propionic acid ethyl ester (500 mg, 1.27 mmol) was dissolved in acetonitrile (2.5 ml) and treated with 1,8-diazabicyclo[5.4.0]undec-7-ene [DBU] (0.47 ml, 3.2 mmol). The mixture was heated to 125° C. using microwave irradiation for 1 h. The reaction mixture was then evaporated under reduced pressure. The residue was dissolved in water and acidified to pH 1 with 2N hydrochloric acid. The mixture was extracted with DCM, the organics separated and washed with brine solution. The organic solution was dried over Na$_2$SO$_4$ and concentrated under reduced pressure to give crude product. The crude was purified by column chromatography on silica gel (eluent an ethyl acetate/hexane gradient) to give 4-(2-bromo-3-chloro-6-fluoro-phenyl)-5-hydroxy-2,6-dimethyl-pyridazin-3-one (340 mg, 77.1%) as an off-white solid.

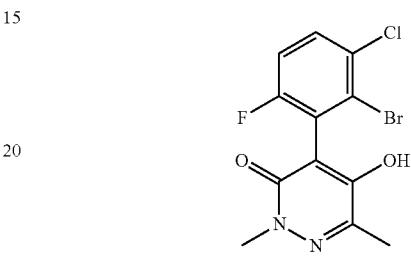

$^1$H NMR (400 MHz, DMSO-d6) δ$_H$: 11.01 (s, 1H), 7.77-7.73 (m, 1H), 7.39 (t, J=8.7, 1H), 3.58 (s, 3H), 2.24 (s, 3H).

1.6 [5-(2-Bromo-3-chloro-6-fluoro-phenyl)-1,3-dimethyl-6-oxo-pyridazin-4-yl] 2-methylpropanoate To a stirred solution of 4-(2-bromo-3-chloro-6-fluoro-phenyl)-5-hydroxy-2,6-dimethyl-pyridazin-3-one (1.4 g, 4.02 mmol) in dichloromethane (32 ml) at rt were added triethylamine (1.1 ml, 8.06 mmol), 4-(dimethylamino)pyridine [DMAP] (49 mg, 0.40 mmol) and isobutyryl chloride (0.6 ml, 4.83 mmol).

Once judged complete, the reaction was diluted with dichloromethane and water. The organic layer was separated, dried over Na$_2$SO$_4$, and concentrated under reduced pressure to give crude product. The crude was purified by column chromatography on silica gel (eluent an ethyl acetate/hexane gradient) to give [5-(2-bromo-3-chloro-6-fluoro-phenyl)-1,3-dimethyl-6-oxo-pyridazin-4-yl] 2-methylpropanoate (1.47 g, 87%).

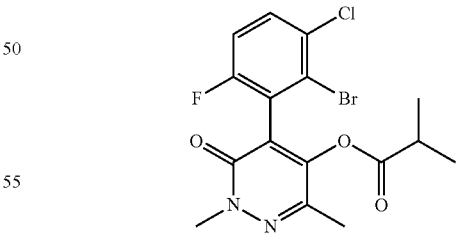

$^1$H NMR (400 MHz, CDCl$_3$) δ$_H$: 7.51-7.47 (m, 1H), 7.10-7.05 (m, 1H), 3.82 (s, 3H), 2.60-2.55 (m, 1H), 2.25 (s, 3H), 1.02-0.98 (m, 6H).

1.7 2-Methyl-6-[(E)-2-(4,4,5,5-tetramethyl-1,3,2-dioxaborolan-2-yl)vinyl]quinoline 4,4,5,5-Tetramethyl-2-vinyl-1,3,2-dioxaborolane (0.73 mL, 4.32 mmol) and N,N-diisopropylethylamine (1.25 mL, 7.20 mmol) were added to a stirred solution of 6-bromo-2-methyl-quinoline (800 mg, 3.6 mmol) and chloro[(tri-tert-butylphosphine)-2-(2-aminobiphenyl)] palladium(II) (92 mg, 0.18 mmol) in toluene (14 mL). The reaction mixture was heated to 95° C. under nitrogen for 4 h.

Upon completion the reaction mixture was allowed to cool to room temperature then filtered through Celite® (eluting with DCM). The filtrate was concentrated in vacuo then purified by flash column chromatography (silica, eluent an ethyl acetate/iso-hexane gradient) to give 2-methyl-6-[(E)-2-(4,4,5,5-tetramethyl-1,3,2-dioxaborolan-2-yl)vinyl]quinoline (886 mg, 83% yield).

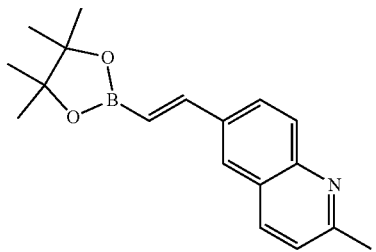

$^1$H NMR (400 MHz, Solvent) δ ppm 1.34 (s, 12H) 2.74 (s, 3H) 6.29 (d, J=18.46 Hz, 1H) 7.26-7.29 (m, 1H) 7.55 (d, J=18.4 Hz, 1H) 7.77 (d, J=1.47 Hz, 1H) 7.85-7.92 (m, 1H) 7.94-7.99 (m, 1H) 8.02 (d, J=8.4 Hz, 1H).

1.8 [5-[3-Chloro-6-fluoro-2-[(E)-2-(2-methyl-6-quinolyl)vinyl]phenyl]-1,3-dimethyl-6-oxo-pyridazin-4-yl] 2-methylpropanoate (A-4.034)

A stirred solution of [5-(2-bromo-3-chloro-6-fluoro-phenyl)-1,3-dimethyl-6-oxo-pyridazin-4-yl] 2-methylpropanoate (1.03 g, 2.47 mmol), Cs$_2$CO$_3$ (2.43 g, 7.40 mmol), 2-methyl-6-[(E)-2-(4,4,5,5-tetramethyl-1,3,2-dioxaborolan-2-yl)vinyl]quinoline (0.874 g, 2.96 mmol) and Pd(dppf)Cl$_2$.DCM (0.101 g, 0.123 mmol) in 1,4-dioxane (21 mL) and water (6 mL) was heated at reflux.

After 16 h, the reaction mixture was concentrated in vacuo to remove the bulk of the dioxane, then diluted with water and EtOAc. The organic layer was separated and the aqueous phase extracted with portions of EtOAc (2×). The pH of the aqueous phase was then adjusted to pH 2 with 2M HCl (aq) then extracted with a further portion of EtOAc.

The crude product was purified by flash column chromatography (silica, eluent an ethyl acetate/iso-hexane gradient) to give [5-[3-chloro-6-fluoro-2-[(E)-2-(2-methyl-6-quinolyl)vinyl]phenyl]-1,3-dimethyl-6-oxo-pyridazin-4-yl] 2-methylpropanoate (86 mg, 7% yield, A-4.034) and 4-[3-chloro-6-fluoro-2-[(E)-2-(2-methyl-6-quinolyl)vinyl]phenyl]-5-hydroxy-2,6-dimethyl-pyridazin-3-one (51 mg, 5% yield, A-2.034).

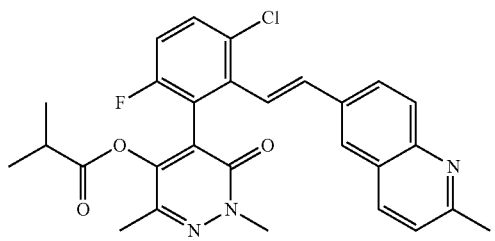 [SMILES: Cc1ccc2cc(/C=C/c3c(Cl)ccc(F)c3-c3c(OC(=O)C(C)C)c(C)nn(C)c3=O)ccc2n1]

$^1$H NMR (400 MHz, CDCl$_3$) δ ppm 1.11 (app t, J=7.1 Hz, 6H) 2.23 (s, 3H) 2.63-2.71 (m, 1H) 2.74 (s, 3H) 3.69 (s, 3H) 6.81 (d, J=16.4 Hz, 1H) 7.04 (t, J=8.7 Hz, 1H) 7.15 (d, J=16.5 Hz, 1H) 7.27 (s, 1H) 7.45 (dd, J=8.9, 5.07 Hz, 1H) 7.63 (d, J=1.7 Hz, 1H) 7.75-7.81 (m, 1H) 7.94 (d, J=8.8 Hz, 1H) 8.01 (d, J=8.3 Hz, 1H).

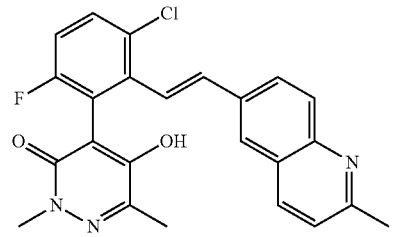 [SMILES: Cc1ccc2cc(/C=C/c3c(Cl)ccc(F)c3-c3c(O)c(C)nn(C)c3=O)ccc2n1]

$^1$H NMR (400 MHz, CDCl$_3$) δ ppm 2.24 (s, 3H) 2.66 (s, 3H) 3.66 (s, 3H) 6.72 (d, J=16.4 Hz, 1H) 6.93-7.07 (m, 2H) 7.26 (s, 1H) 7.38 (dd, J=8.9, 5.14 Hz, 1H) 7.55 (d, J=1.7 Hz, 1H) 7.66 (dd, J=8.8, 2.0 Hz, 1H) 7.84 (d, J=8.8 Hz, 1H) 7.99 (d, J=8.4 Hz, 1H)

1.9 [5-[3-Chloro-6-fluoro-2-[2-(2-methyl-6-quinolyl)ethyl]phenyl]-1,3-dimethyl-6-oxo-pyridazin-4-yl] 2-methylpropanoate (A-3.034)

[5-[3-Chloro-6-fluoro-2-[(E)-2-(2-methyl-6-quinolyl)vinyl]phenyl]-1,3-dimethyl-6-oxo-pyridazin-4-yl] 2-methylpropanoate (56 mg, 0.12 mmol, 4.034) was subjected to catalytic hydrogenation in tetrahydrofuran (0.3 mL) over 5% Pd/C catalyst (24 mg) at 3 bar H$_2$.

Upon completion, the reaction mixture was filtered through a pad of Celite®, eluting with DCM. The filtrate was concentrated in-vacuo to afford a crude residue.

The residue was adsorbed onto silica and purified by flash column chromatography (silica, eluent ethyl acetate/iso-hexane) to give [5-[3-chloro-6-fluoro-2-[2-(2-methyl-6-quinolyl)ethyl]phenyl]-1,3-dimethyl-6-oxo-pyridazin-4-yl] 2-methylpropanoate (15 mg, 27% yield, A-3.034) and a mixture of further-reduced products which was further purified by mass-directed reverse-phase preparative HPLC to give [5-[3-chloro-6-fluoro-2-[2-(2-methyl-1,2,3,4-tetrahydroquinolin-6-yl)ethyl]phenyl]-1,3-dimethyl-6-oxo-pyridazin-4-yl] 2-methylpropanoate (6 mg, 11% yield, A-3.030).

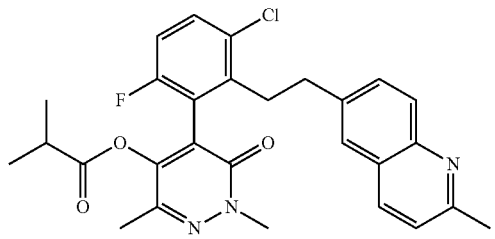 [SMILES: Cc1ccc2cc(CCc3c(Cl)ccc(F)c3-c3c(OC(=O)C(C)C)c(C)nn(C)c3=O)ccc2n1]

$^1$H NMR (400 MHz, CDCl$_3$) δ ppm 0.97 (dd, J=7.0, 4.4 Hz, 6H) 2.24 (s, 3H) 2.47-2.57 (m, 1H) 2.73 (s, 3H) 2.79-3.09 (m, 4H) 3.84 (s, 3H) 7.00 (t, J=8.6 Hz, 1H) 7.25 (d, J=8.3 Hz, 1H) 7.49 (app d, J=1.1 Hz, 3H) 7.90 (d, J=8.4 Hz, 1H) 7.96 (d, J=8.3 Hz, 1H).

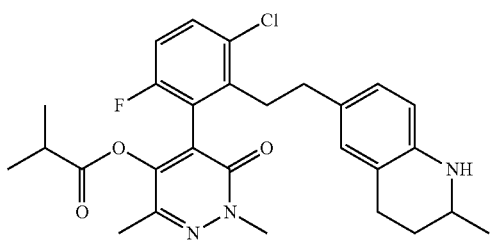 [SMILES: Cc1nn(C)c(=O)c(-c2c(F)ccc(Cl)c2CCc2ccc3c(c2)CCC(C)N3)c1OC(=O)C(C)C]

¹H NMR (400 MHz, CDCl₃) δ ppm 0.96 (dd, J=7.03, 2.02 Hz, 6H) 1.25 (d, J=6.24 Hz, 3H) 1.58-1.69 (m, 1H) 1.90-1.98 (m, 1H) 2.24 (s, 3H) 2.54 (dt, J=13.94, 6.97 Hz, 1H) 2.63-2.84 (m, 6H) 3.39 (td, J=6.51, 3.12 Hz, 1H) 3.83 (s, 3H) 6.52 (br d, J=6.48 Hz, 1H) 6.72-6.79 (m, 2H) 6.96 (t, J=8.62 Hz, 1H) 7.40 (dd, J=8.80, 5.14 Hz, 1H).

Example 2 Preparation of 4-[3-chloro-6-fluoro-2-[2-(1H-indol-5-yl)ethyl]phenyl]-5-hydroxy-2,6-dimethyl-pyridazin-3-one (A-1.021)

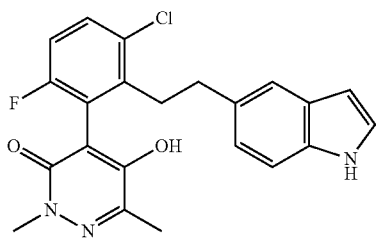 [SMILES: Cc1nn(C)c(=O)c(-c2c(F)ccc(Cl)c2CCc2ccc3[nH]ccc3c2)c1O]

2.1 5-Benzyloxy-4-(2-bromo-3-chloro-6-fluoro-phenyl)-2,6-dimethyl-pyridazin-3-one Benzyl bromide (0.19 mL, 1.58 mmol) was added to a stirred suspension of 4-(2-bromo-3-chloro-6-fluoro-phenyl)-5-hydroxy-2,6-dimethyl-pyridazin-3-one (500 mg, 1.44 mmol) and K₂CO₃ (0.22 g, 1.58 mmol) in acetone (2.9 mL) and the mixture heated at reflux for 2 hrs.

Upon completion the reaction mixture as allowed to cool to RT then filtered (eluting with acetone). The filtrate was concentrated in vacuo then purified by flash column chromatography (silica, eluent an ethyl acetate/iso-hexane gradient) to give 5-benzyloxy-4-(2-bromo-3-chloro-6-fluoro-phenyl)-2,6-dimethyl-pyridazin-3-one (560 mg, 89% yield).

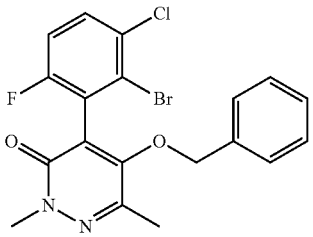 [SMILES: Cc1nn(C)c(=O)c(-c2c(F)ccc(Cl)c2Br)c1OCc1ccccc1]

¹H NMR (400 MHz, CDCl₃) δ ppm 2.29 (s, 3H) 3.77 (s, 3H) 4.59-4.76 (m, 2H) 7.09 (dd, J=8.93, 7.95 Hz, 1H) 7.13-7.20 (m, 2H) 7.29-7.36 (m, 3H) 7.52 (dd, J=8.93, 5.38 Hz, 1H).

2.2 2-[(E)-2-[2-(5-benzyloxy-2,6-dimethyl-3-oxo-pyridazin-4-yl)-6-chloro-3-fluoro-phenyl]vinyl]-6-methyl-1,3,6,2-dioxazaborocane-4,8-dione A stirred solution of 5-benzyloxy-4-(2-bromo-3-chloro-6-fluoro-phenyl)-2,6-dimethyl-pyridazin-3-one (1.00 g, 2.28 mmol), chloro[(tri-tert-butylphosphine)-2-(2-aminobiphenyl)]palladium(II) (59 mg, 0.11 mmol), N,N-diisopropylethylamine (0.80 mL, 4.57 mmol) and 6-methyl-2-vinyl-1,3,6,2-dioxazaborocane-4,8-dione (0.50 g, 2.74 mmol) in THF (23 mL) was heated at 90° C. for 5 hrs then at 70° C. for a further 16 hrs.

The reaction mixture was allowed to cool to room temperature then diluted with DCM and filtered through Celite®, eluting with further portions of DCM. The filtrate was concentrated in vacuo then purified by flash column chromatography (silica, eluent an ethyl acetate/methanol gradient) to give 5-benzyloxy-4-(2-bromo-3-chloro-6-fluoro-phenyl)-2,6-dimethyl-pyridazin-3-one; 2-[(E)-2-[2-(5-benzyloxy-2,6-dimethyl-3-oxo-pyridazin-4-yl)-6-chloro-3-fluoro-phenyl]vinyl]-6-methyl-1,3,6,2-dioxazaborocane-4,8-dione (904 mg, 74% yield).

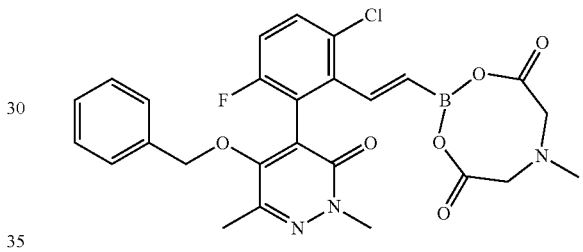

¹H NMR (400 MHz, CDCl₃) δ ppm 2.26 (s, 3H) 2.79 (s, 3H) 3.73 (s, 7H) 4.60 (s, 2H) 5.97 (d, J=18.6 Hz, 1H) 6.76 (d, J=18.5 Hz, 1H) 7.02 (t, J=8.6 Hz, 1H) 7.09 (dd, J=6.7, 3.00 Hz, 2H) 7.29-7.34 (m, 3H) 7.44 (dd, J=8.9, 5.1 Hz, 1H).

2.3 5-benzyloxy-4-[3-chloro-6-fluoro-2-[(E)-2-(1H-indol-5-yl)vinyl]phenyl]-2,6-dimethyl-pyridazin-3-one To a microwave-vial was added 2-[(E)-2-[2-(5-benzyloxy-2,6-dimethyl-3-oxo-pyridazin-4-yl) δ-chloro-3-fluoro-phenyl]vinyl]-6-methyl-1,3,6,2-dioxazaborocane-4,8-dione (300 mg, 0.56 mmol), 5-bromo-1H-indole (163 mg, 0.84 mmol), Pd(dppf)Cl₂.DCM (23 mg, 0.028 mmol,) and K₃PO₄.H₂O (512 mg, 2.22 mmol). The vial was then capped and purged with N₂ before addition of THF (5.6 mL) and water (0.2 mL). The reaction mixture was then heated to 90° C. for 30 mins in under microwave irradiation.

The reaction mixture was cooled to room temperature then partitioned between water (20 mL) and EtOAc (20 mL). The organic layer was separated and the aqueous layer extracted with extracted with EtOAc (2×20 mL). The combined organics were collected, dried (MgSO4), filtered, and concentrated in vacuo to give the crude product.

The crude product was purified by mass-directed reverse-phase preparative HPLC to give 5-benzyloxy-4-[3-chloro-6-fluoro-2-[(E)-2-(1H-indol-5-yl)vinyl]phenyl]-2,6-dimethyl-pyridazin-3-one (45 mg, 16% yield).

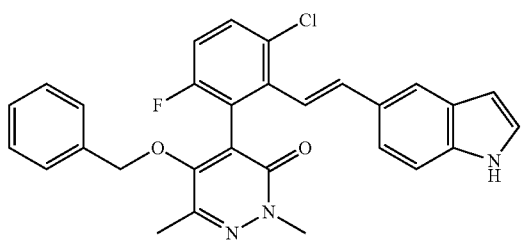 [SMILES: Cc1nn(C)c(=O)c(-c2c(F)ccc(Cl)c2/C=C/c2ccc3[nH]ccc3c2)c1OCc1ccccc1]

¹H NMR (400 MHz, CDCl₃) δ ppm 2.20 (s, 3H) 3.76 (s, 3H) 4.70 (d, J=5.3 Hz, 2H) 6.53 (t, J=2.1 Hz, 1H) 6.78-6.86 (m, 1H) 6.88-6.94 (m, 1H) 7.01 (t, J=8.6 Hz, 1H) 7.12-7.17 (m, 2H) 7.19 (t, J=2.8 Hz, 1H) 7.21-7.25 (m, 1H) 7.29-7.35 (m, 4H) 7.47 (dd, J=8.9, 5.3 Hz, 1H) 7.55 (s, 1H) 8.25-8.44 (m, 1H).

2.4 4-[3-chloro-6-fluoro-2-[2-(1H-indol-5-yl)ethyl]phenyl]-5-hydroxy-2,6-dimethyl-pyridazin-3-one (A-1.021)

5-benzyloxy-4-[3-chloro-6-fluoro-2-[(E)-2-(1H-indol-5-yl)vinyl]phenyl]-2,6-dimethyl-pyridazin-3-one (45 mg, 0.09 mmol) was subjected to catalytic hydrogenation in tetrahydrofuran (0.23 mL) over 5% Pd/C catalyst (38 mg×2) at 3 bar H₂.

Upon completion, the reaction mixture was filtered through a pad of Celite@, eluting with DCM. The filtrate was concentrated in-vacuo to afford a crude residue.

The residue was adsorbed onto silica and purified by flash column chromatography (silica, eluent ethyl acetate/isohexane) to give 4-[3-chloro-6-fluoro-2-[2-(1H-indol-5-yl)ethyl]phenyl]-5-hydroxy-2,6-dimethyl-pyridazin-3-one (24 mg, 65% yield, A-1.021).

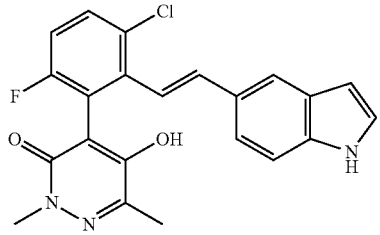 [SMILES: Cc1nn(C)c(=O)c(-c2c(F)ccc(Cl)c2/C=C/c2ccc3[nH]ccc3c2)c1O]

¹H NMR (400 MHz, CDCl₃) δ ppm 2.18 (s, 3H) 2.70-2.96 (m, 4H) 3.69 (s, 3H) 6.44 (ddd, J=3.0, 2.0, 0.7 Hz, 1H) 6.78 (dd, J=8.3, 1.6 Hz, 1H) 6.89 (t, J=8.6 Hz, 1H) 7.14-7.18 (m, 1H) 7.18-7.26 (m, 2H) 7.37 (dd, J=8.8, 5.14 Hz, 1H) 8.21 (br s, 1H).

Example 3 Preparation of 4-[3-chloro-6-fluoro-2-[2-(3-methylbenzotriazol-5-yl)ethyl]phenyl]-5-hydroxy-2,6-dimethyl-pyridazin-3-one (1.343)

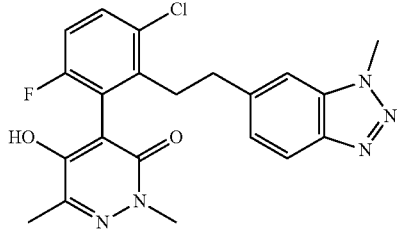 [SMILES: Cc1nn(C)c(=O)c(-c2c(F)ccc(Cl)c2CCc2ccc3nnn(C)c3c2)c1O]

3.1 [5-[3-Chloro-6-fluoro-2-[(E)-2-(6-methyl-4,8-dioxo-1,3,6,2-dioxazaborocan-2-yl)vinyl]phenyl]-1,3-dimethyl-6-oxo-pyridazin-4-yl] 2-methylpropanoate

[5-(2-Bromo-3-chloro-6-fluoro-phenyl)-1,3-dimethyl-6-oxo-pyridazin-4-yl] 2-methyl-propanoate (5.00 g, 11.97 mmol, 1.0 eq), 6-methyl-2-vinyl-1,3,6,2-dioxazaborocane-4,8-dione (2.63 g, 14.36 mmol, 1.2 eq) and chloro[(tri-tert-butylphosphine)-2-(2-aminobiphenyl)] palladium(II) (307 mg, 0.60 mmol, 0.05 eq) were charged into a 250 ml round bottom flask fitted with a condenser, stirrer bar and nitrogen bubbler. THF (100 mL) was added followed by N,N-diisopropylethylamine (4.2 mL, 23.94 mmol, 2.0 eq) against a flow of nitrogen and the mixture heated to reflux for 3 h.

The reaction mixture was allowed to cool to room temperature then diluted in DCM and filtered through Celite®, washing with further portions of DCM. The eluent was then concentrated to dryness.

The crude product purified by flash column chromatography to afford [5-[3-chloro-6-fluoro-2-[(E)-2-(6-methyl-4,8-dioxo-1,3,6,2-dioxazaborocan-2-yl)vinyl]phenyl]-1,3-dimethyl-6-oxo-pyridazin-4-yl] 2-methylpropanoate (5.91 g, 11.4 mmol, 95% yield) as an off white solid.

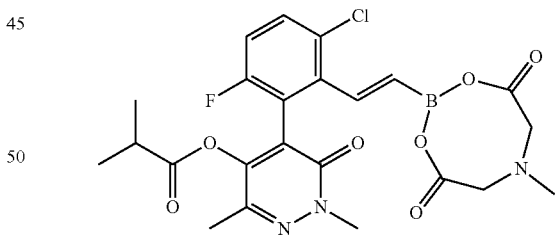

¹H NMR (400 MHz, DMSO-d6) δ=7.63 (dd, J=5.1, 8.9 Hz, 1H), 7.31 (t, J=8.9 Hz, 1H), 6.65 (d, J=18.3 Hz, 1H), 5.68 (d, J=18.3 Hz, 1H), 4.24 (dd, J=11.9, 17.2 Hz, 2H), 3.95-3.83 (m, 2H), 3.70 (s, 3H), 2.66 (spt, J=7.0 Hz, 1H), 2.16 (s, 3H), 0.90 (d, J=7.0 Hz, 3H), 0.89 (d, J=7.0 Hz, 3H)

3.2 [5-[3-chloro-6-fluoro-2-[(E)-2-(3-methylbenzotriazol-5-yl)vinyl]phenyl]-1,3-dimethyl-6-oxo-pyridazin-4-yl] 2-methylpropanoate (4.343)

[5-[3-Chloro-6-fluoro-2-[(E)-2-(6-methyl-4,8-dioxo-1,3,6,2-dioxazaborocan-2-yl)vinyl]phenyl]-1,3-dimethyl-6-oxo-pyridazin-4-yl] 2-methylpropanoate (700 mg, 1.35 mmol), 1,1-bis(diphenylphosphino)ferrocene]dichloropalladium(II) dichloromethane complex [PdCl$_2$(dppf).DCM] (55 mg, 0.067 mmol), 6-bromo-1-methyl-benzotriazole (371 mg, 1.75 mmol) and potassium phosphate (1.17 g, 5.39 mmol) were added to a 10-20 ml microwave vial. 2-methyltetrahydrofuran (10 ml) and water (0.5 ml) were added then the reaction mixture degassed by evacuation and backfilling with nitrogen (x3). The reaction mixture was heated 120° C. for 60 mins under microwave irradiation.

The reaction mixture was filtered through a plug of Celite®, washing through with EtOAc & EtOH. The filtrate was concentrated under reduced pressure to give a brown gum (853 mg). The crude material was purified by automated flash chromatography on silica gel eluting with a cyclohexane/ethyl acetate gradient to give [5-[3-chloro-6-fluoro-2-[(E)-2-(3-methylbenzotriazol-5-yl)vinyl]phenyl]-1,3-dimethyl-6-oxo-pyridazin-4-yl] 2-methylpropanoate (4.343) as an orange gum (622 mg, 87% yield)

The purified material was dissolved in acetonitrile (10 ml) and treated with SiliCycle SiliaMetS® Thiol (SH) metal scavenger resin (622 mg) at room temperature. The suspension was stirred at room temperature for 1.5 h, then filtered to remove the resin, washing with further acetonitrile. The filtrate was concentrated in vacuo to provide [5-[3-chloro-6-fluoro-2-[(E)-2-(3-methylbenzotriazol-5-yl)vinyl]phenyl]-1,3-dimethyl-6-oxo-pyridazin-4-yl] 2-methylpropanoate (4.343) as a white solid (583 mg, 87% yield)

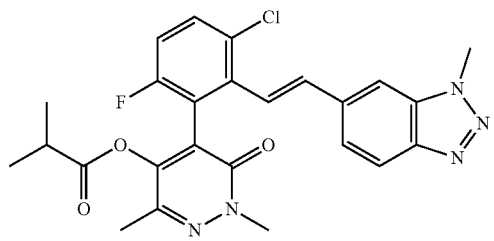 [SMILES: Cc1nn(C)c(=O)c(-c2c(F)ccc(Cl)c2/C=C/c2ccc3nnn(C)c3c2)c1OC(=O)C(C)C]

$^1$H NMR (400 MHz, chloroform) 7.96 (d, J=9.0 Hz, 1H), 7.39-7.49 (m, 3H), 7.15 (d, J=16.3 Hz, 1H), 7.05 (t, J=8.7 Hz, 1H), 6.81 (d, J=16.3 Hz, 1H), 4.29 (s, 3H), 3.68 (s, 3H), 2.67(spt, J=7.0 Hz, 1H), 2.23 (s, 3H), 1.13 (d, J=7.0 Hz, 3H), 1.09 (d, J=7.0 Hz, 3H)

3.3 [5-[3-chloro-6-fluoro-2-[2-(3-methylbenzotriazol-5-yl)ethyl]phenyl]-1,3-dimethyl-6-oxo-pyridazin-4-yl] 2-methylpropanoate

[5-[3-chloro-6-fluoro-2-[(E)-2-(3-methylbenzotriazol-5-yl)vinyl]phenyl]-1,3-dimethyl-6-oxo-pyridazin-4-yl] 2-methylpropanoate (496 mg, 1.00 mmol) was subjected to catalytic hydrogenation in EtOAc (10 mL) over 5% Pd/C (50% wet) catalyst (0.21 g) at 3 bar H$_2$ for 18 h.

The reaction mixture was filtered through a pad of Celite®, washing with ethyl acetate. The filtrate was concentrated in-vacuo to afford a crude residue (503 mg) which was purified by mass-directed reverse-phase HPLC to afford [5-[3-chloro-6-fluoro-2-[2-(3-methylbenzotriazol-5-yl)ethyl]phenyl]-1,3-dimethyl-6-oxo-pyridazin-4-yl] 2-methylpropanoate as a colourless gum (332 mg, 67% yield)

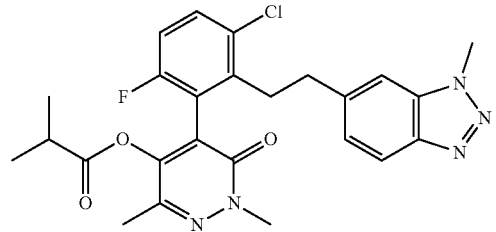 [SMILES: Cc1nn(C)c(=O)c(-c2c(F)ccc(Cl)c2CCc2ccc3nnn(C)c3c2)c1OC(=O)C(C)C]

$^1$H NMR (400 MHz, chloroform) δ=7.92 (d, J=8.6 Hz, 1H), 7.43 (dd, J=5.1, 8.7 Hz, 1H), 7.24 (br s, 1H), 7.17 (dd, J=1.3, 8.6 Hz, 1H), 7.01 (t, J=8.7 Hz, 1H), 4.26 (s, 3H), 3.81 (s, 3H), 3.11-2.91 (m, 3H), 2.86-2.72 (m, 1H), 2.54 (spt, J=7.0 Hz, 1H), 2.25 (s, 3H), 0.98 (d, J=7.1 Hz, 3H), 0.96 (d, J=7.0 Hz, 3H)

3.4 Preparation of 4-[3-chloro-6-fluoro-2-[2-(3-methylbenzotriazol-5-yl)ethyl]phenyl]-5-hydroxy-2,6-dimethyl-pyridazin-3-one (1.343)

[5-[3-chloro-6-fluoro-2-[2-(3-methylbenzotriazol-5-yl)ethyl]phenyl]-1,3-dimethyl-6-oxo-pyridazin-4-yl] 2-methylpropanoate (332 mg, 0.67 mmol) was) stirred in ethanol (5 ml) at room temperature. A solution of lithium hydroxide monohydrate (85 mg, 2.00 mmol) in water (2 ml) was added dropwise and the reaction stirred at room temperature for 21 h.

The ethanol solvent was removed under reduced pressure, then residue diluted with water (20 ml). The aqueous phase was acidified to ~pH 3-4 by the addition of 2M HCl (aq.), then extracted with EtOAc (3x10 ml). The combined organic extracts were concentrated under reduced pressure to give a white solid (240 mg). The crude residue was purified by automated flash chromatography on silica, eluting with a cyclohexane/ethyl acetate gradient to afford 4-[3-chloro-6-fluoro-2-[2-(3-methylbenzotriazol-5-yl)ethyl]phenyl]-5-hydroxy-2,6-dimethyl-pyridazin-3-one (1.343) as a white solid (196 mg, 69%)

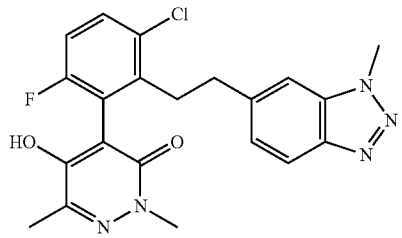 [SMILES: Cc1nn(C)c(=O)c(-c2c(F)ccc(Cl)c2CCc2ccc3nnn(C)c3c2)c1O]

$^1$H NMR (400 MHz, acetonitrile) δ ppm 7.83 (d, J=8.6 Hz, 1H), 7.57 (dd, J=5.2, 8.8 Hz, 1H), 7.33 (s, 1H), 7.10-7.18 (m, 2H), 4.22 (s, 3H), 3.64 (s, 3H), 2.84-3.07 (m, 4H) 2.21 (s, 3H)

Example 4 Preparation of 4-[2-[2-(1,3-benzothiazol-5-yl)ethyl]-3-chloro-6-fluoro-phenyl]-5-hydroxy-2,6-dimethyl-pyridazin-3-one (1.350)

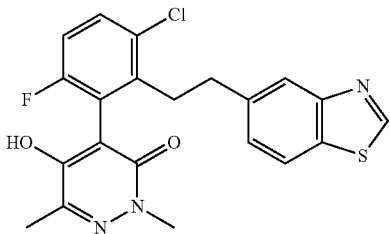 [SMILES: Cc1nn(C)c(=O)c(-c2c(F)ccc(Cl)c2CCc2ccc3scnc3c2)c1O]

4.1 4-[2-[(E)-2-(1,3-benzothiazol-5-yl)vinyl]-3-chloro-6-fluoro-phenyl]-5-hydroxy-2,6-dimethyl-pyridazin-3-one

[5-[3-chloro-6-fluoro-2-[(E)-2-(6-methyl-4,8-dioxo-1,3,6,2-dioxazaborocan-2-yl)vinyl]phenyl]-1,3-dimethyl-6-oxo-pyridazin-4-yl] 2-methylpropanoate (500 mg, 0.96 mmol), 5-bromo-1,3-benzothiazole (309 mg, 1.44 mmol) 1,1-bis(diphenylphosphino)ferrocene]dichloropalladium(II) dichloromethane complex [PdCl2(dppf).DCM] (4 mg, 0.05 mmol) and POTASSIUM CARBONATE (403 mg, 2.89 mmol) were added to a 10-20 ml microwave vial under an atmosphere of nitrogen. De-gassed acetonitrile (8 ml) and water (2 ml) were added and the mixture heated to 150° C. for 30 min under microwave irradiation.

The reaction mixture was concentrated to dryness. The residue was treated with water (10 ml) and the aqueous phase acidified to pH 4 by addition of 1M HCl (aq.). DCM (20 ml) was added and the layers separated. The aqueous phase was further extracted with DCM/MeOH (8:1) (2×10 ml), then the combined organic extracts were dried and concentrated to give a brown oil. The crude material was purified by automated flash chromatography on silica gel, eluting with a cyclohexane/ethyl acetate gradient to give 4-[2-[(E)-2-(1,3-benzothiazol-5-yl)vinyl]-3-chloro-6-fluoro-phenyl]-5-hydroxy-2,6-dimethyl-pyridazin-3-one as a white solid (302 mg, 73% yield).

The obtained product was dissolved in a 3:2 mixture of methanol/ethyl acetate (25 ml). The solution was treated with activated charcoal (100 mg) then stirred at rt for 1 h. The mixture was filtered through Celite®, then washed through with additional 3:2 MeOH/EtOAc (10 ml). The filtrate was treated with SiliCycle SiliaMetS® Thiol (SH) metal scavenger resin (300 mg) then stirred at rt for 16 h. The mixture was filtered to remove the resin, then the filtrate concentrated in vacuo to give an off white solid (286 mg).

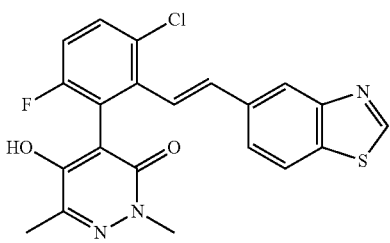 [SMILES: Cc1nn(C)c(=O)c(-c2c(F)ccc(Cl)c2/C=C/c2ccc3scnc3c2)c1O]

$^1$H NMR (400 MHz, DMSO-d6) δ=10.84 (br s, 1H), 9.41 (s, 1H), 8.14 (d, J=8.4 Hz, 1H), 8.00 (d, J=1.5 Hz, 1H), 7.62 (dd, J=5.1, 8.7 Hz, 1H), 7.54 (dd, J=1.5, 8.4 Hz, 1H), 7.29 (t, J=8.7 Hz, 1H), 7.09 (d, J=16.5 Hz, 1H), 6.74 (d, J=16.5 Hz, 1H), 3.54 (s, 3H), 2.18 (s, 3H)

4.2 4-[2-[2-(1,3-benzothiazol-5-yl)ethyl]-3-chloro-6-fluoro-phenyl]-5-hydroxy-2,6-dimethyl-pyridazin-3-one (1.350)

To a solution of 4-[2-[(E)-2-(1,3-benzothiazol-5-yl)vinyl]-3-chloro-6-fluoro-phenyl]-5-hydroxy-2,6-dimethyl-pyridazin-3-one (835 mg, 1.95 mmol) in tetrahydrofuran (30 ml) under a nitrogen atmosphere, was added N,N-Diisopropylethylamine (2.70 ml, 16.0 mmol). The stirred reaction mixture was heated to 70° C. and 2,4,6-Triisopropylbenzenesulfonyl hydrazide (5.17 g, 15.6 mmol) was added portionwise over 4 h then the mixture heated to reflux for 16 h. Additional N,N-Diisopropylethylamine (1.70 ml, 9.80 mmol) was added to the reaction mixture, followed by 2,4,6-Triisopropylbenzenesulfonyl hydrazide (3.24 g, 9.77 mmol) and the mixture heated to reflux for a further 6 h.

The reaction mixture was allowed to cool to room temperature, then concentrated directly onto silica. The crude material was partially purified by automated flash chromatography on silica gel eluting with a cyclohexane/ethyl acetate gradient. The material obtained was further purified by mass-directed reverse-phase HPLC to afford 4-[3-chloro-6-fluoro-2-[2-[4-(methylsulfanylmethyl)phenyl]ethyl]phenyl]-5-hydroxy-2,6-dimethyl-pyridazin-3-one (1.350) as a pale yellow solid (227 mg, 27% yield)

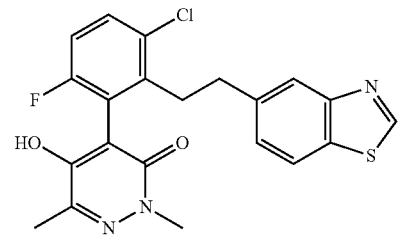 [SMILES: Cc1nn(C)c(=O)c(-c2c(F)ccc(Cl)c2CCc2ccc3scnc3c2)c1O]

1HNMR (500 MHz, DMSO-d6) δ ppm 10.84 (br. s, 1H), 9.35 (s, 1H), 8.03 (d, J=8.3 Hz, 1H), 7.71 (d, J=1.0 Hz, 1H), 7.55 (dd, J=5.2, 8.8 Hz, 1H), 7.23 (t, J=8.8 Hz, 1H), 7.16 (dd, J=1.0, 8.3 Hz, 1H), 3.62 (s, 3H), 2.93-2.70 (m, 4H), 2.26 (s, 3H)

Example 5 Preparation of [3-chloro-2-[2-(2,2-dimethyl-1,3-benzodioxol-5-yl)ethyl]-6-fluoro-phenyl]-5-hydroxy-2,6-dimethyl-pyridazin-3-one (1.361)

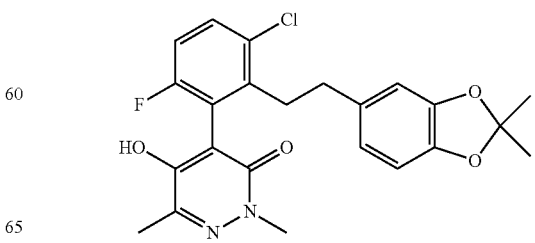

5.1 [5-[3-Chloro-6-fluoro-2-[2-(4,4,5,5-tetramethyl-1,3,2-dioxaborolan-2-yl)ethyl]phenyl]-1,3-dimethyl-6-oxo-pyridazin-4-yl] 2-methylpropanoate An oven-dried round-bottom flask was then charged with Ir(COD)Cl$_2$ (299 mg, 0.45 mmol) and 4-diphenylphosphanylbutyl(diphenyl)phosphane (0380 mg, 0.89 mmol). The flask was evacuated and backfilled with nitrogen (×3), then THF (75 mL) was added and the reaction was stirred at room temperature for 30 mins. A solution of [5-(3-chloro-6-fluoro-2-vinyl-phenyl)-1,3-dimethyl-6-oxo-pyridazin-4-yl] 2-methylpropanoate [prepared as described in Example 4] (6.7 g, 17.8 mmol) in THF was added dropwise and the mixture was stirred for 10 mins, followed by the dropwise addition of 4,4,5,5-tetramethyl-1,3,2-dioxaborolane (3.02 mL, 20.8 mmol). The reaction was stirred at 60° C. overnight.

After 24 h, the reaction was allowed to cool to room temperature then concentrated in vacuo. The crude product was purified by column chromatography on silica gel, eluting with a cyclohexane/ethylacetate gradient, to give [5-[3-chloro-6-fluoro-2-[2-(4,4,5,5-tetramethyl-1,3,2-dioxaborolan-2-yl)ethyl]phenyl]-1,3-dimethyl-6-oxo-pyridazin-4-yl] 2-methylpropanoate (4.50 g, 51% yield) as a yellow solid.

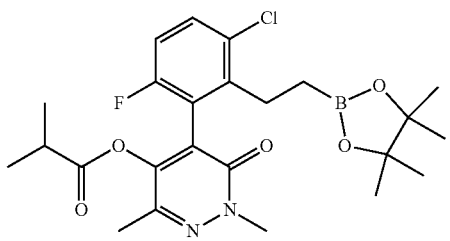 [SMILES: Cc1nn(C)c(=O)c(-c2c(F)ccc(Cl)c2CCB2OC(C)(C)C(C)(C)O2)c1OC(=O)C(C)C]

$^1$H NMR (500 MHz, chloroform) δ=7.35 (dd, J=5.2, 8.9 Hz, 1H), 6.90 (t, J=8.6 Hz, 1H), 3.81 (s, 3H), 2.59 (t, J=8.5 Hz, 2H), 2.53 (spt, J=7.0 Hz, 1H), 2.24 (s, 3H), 1.32-1.16 (m, 12H), 1.08-1.00 (m, 2H), 0.98 (d, J=7.0 Hz, 3H), 0.94 (d, J=7.0 Hz, 3H).

5.2 [3-chloro-2-[2-(2,2-dimethyl-1,3-benzodioxol-5-yl)ethyl]-6-fluoro-phenyl]-5-hydroxy-2,6-dimethyl-pyridazin-3-one (1.361)

5-bromo-2,2-dimethyl-1,3-benzodioxole (70 mg, 0.30 mmol) was charged into a 2-5 ml microwave vial. [5-[3-chloro-6-fluoro-2-[2-(4,4,5,5-tetramethyl-1,3,2-dioxaborolan-2-yl)ethyl]phenyl]-1,3-dimethyl-6-oxo-pyridazin-4-yl] 2-methylpropanoate (100 mg, 0.20 mmol) was added as a solution in 1,4-dioxane (2 ml), followed by chloro(2-dicyclohexylphosphino-2',6'-diisopropoxy-1,1'-biphenyl)[2-(2'-amino-1,1'-biphenyl)]palladium(II) (RuPhos Pd-G2) (26 mg, 0.03 mmol) as a solution in 1,4-dioxane (2 ml). A 2 M aqueous solution of potassium carbonate (0.30 ml, 0.61 mmol) was added and the mixture heated to 140° C. for 80 min under microwave irradiation.

The reaction mixture was cooled to room temperature then filtered through a pre-wetted 0.5 g Silica-TMT cartridge, washing through with acetonitrile (2×2 ml). The filtrate was concentrated to dryness, then purified by mass-directed reverse-phase HPLC to afford [3-chloro-2-[2-(2,2-dimethyl-1,3-benzodioxol-5-yl)ethyl]-6-fluoro-phenyl]-5-hydroxy-2,6-dimethyl-pyridazin-3-one (1.361) as a white solid (15 mg, 17% yield).

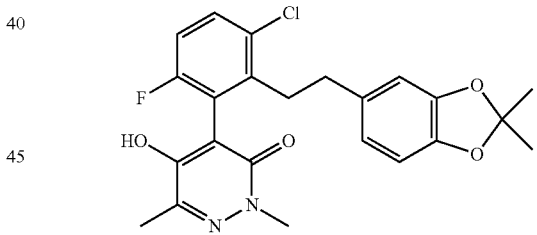

$^1$H NMR (500 MHz, chloroform) δ ppm 7.43 (dd, J=5.2, 8.7 Hz, 1H), 6.99 (t, J=8.7 Hz, 1H), 6.56 (d, J=7.7 Hz, 1H), 6.40-6.36 (m, 2H), 3.74 (s, 3H), 2.85-2.78 (m, 1H), 2.77-2.61 (m, 3H), 2.30 (s, 3H), 1.65 (s, 3H), 1.64 (s, 3H)

Compounds 1.019, 1.021, 1.027, 1.028, 1.036, 2.034, 3.030, 3.034, 4.034, 1.339, 1.340, 1.341, 1.342, 1.344, 1.345, 1.346, 1.347, 1.348, 1.349, 1.351, 1.352, 1.353, 1.354, 1.355, 1.356, 1.044, 1.053, 1.357, 1.358, 1.359, 1.360, 2.362, 2.363, and 4.342 were prepared using the general methods as described supra. Table 5 below shows the structure of these compounds and NMR characterising data.

TABLE 5

Preparation examples of compounds of formula (I). The numbering system used to describe the positions of X and Y is shown for the purposes of clarity only.

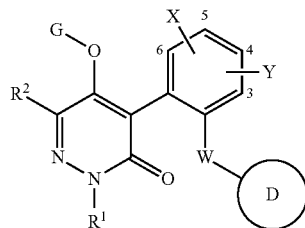

(I)

| Cmpd No. | R¹ | R² | G | X | Y | W | D | NMR details |
|---|---|---|---|---|---|---|---|---|
| 1.019 | —Me | —Me | —H | 6-F | 3-Cl | —CH$_2$—CH$_2$— | 1,2,3,4-tetrahydroquinolin-6-yl- | $^1$H NMR (400 MHz, chloroform) δ ppm 1.91 (br d, J = 5.26 Hz, 3 H) 2.30 (s, 3 H) 2.50-2.84 (m, 5 H) 3.19-3.30 (m, 2 H) 3.46 (s, 1 H) 3.73 (s, 3 H) 6.35 (d, J = 8.56 Hz, 1 H) 6.57-6.65 (m, 2 H) 6.97 (t, J = 8.56 Hz, 1 H) 7.41 (dd, J = 8.80, 5.14 Hz, 1 H) |
| 1.021 | —Me | —Me | —H | 6-F | 3-Cl | —CH$_2$—CH$_2$— | 1H-indol-5-yl- | $^1$H NMR (400 MHz, chloroform) δ ppm 2.18 (s, 3 H) 2.70-2.96 (m, 4 H) 3.69 (s, 3 H) 6.44 (ddd, J = 3.00, 2.02, 0.73 Hz, 1 H) 6.78 (dd, J = 8.31, 1.59 Hz, 1 H) 6.89 (t, J = 8.56 Hz, 1 H) 7.14-7.18 (m, 1 H) 7.18-7.26 (m, 2 H) 7.37 (dd, J = 8.80, 5.14 Hz, 1 H) 8.21 (br s, 1 H) |
| 1.027 | —Me | —Me | —H | 6-F | 3-Cl | —CH$_2$—CH$_2$— | 2-(trifluoromethyl)-4-quinolyl- | $^1$H NMR (400 MHz, chloroform) δ ppm 2.28 (s, 3 H) 2.81-2.94 (m, 1 H) 3.01 (br d, J = 6.11 Hz, 1 H) 3.35 (s, 2 H) 3.75 (s, 3 H) 7.04 (t, J = 8.56 Hz, 1 H) 7.42-7.49 (m, 2 H) 7.58 (ddd, J = 8.31, 6.97, 1.10 Hz, 1 H) 7.79 (ddd, J = 8.41, 6.94, 1.28 Hz, 1 H) 7.86 (d, J = 8.07 Hz, 1 H) 8.20 (d, J = 8.56 Hz, 1 H) |
| 1.028 | —Me | —Me | —H | 6-F | 3-Cl | —CH$_2$—CH$_2$— | 2-ethyl-1,3-benzoxazol-6-yl- | $^1$H NMR (400 MHz, methanol) δ = 7.49 (dd, J = 5.3, 8.8 Hz, 1H), 7.40 (d, J = 8.3 Hz, 1H), 7.26 (d, J = 1.2 Hz, 1H), 7.08 (t, J = 8.8 Hz, 1H), 7.02 (dd, J = 1.2, 8.3 Hz, 1H), 3.73 (s, 3H), 2.96 (q, J = 7.6 Hz, 2H), 2.91-2.74 (m, 4H), 2.33 (s, 3H), 1.42 (t, J = 7.6 Hz, 3H) |
| 1.036 | —Me | —Me | —H | 6-F | 3-Cl | —CH$_2$—CH$_2$— | 4-quinolyl- | $^1$H NMR (400 MHz, chloroform) δ ppm 2.28 (s, 3 H) 2.88-3.02 (m, 2 H) 3.24 (ddd, J = 19.47, 10.48, 6.24 Hz, 2 H) 3.74 (s, 3 H) 7.00 (t, J = 8.56 Hz, 1 H) 7.17 (d, J = 4.52 Hz, 1 H) 7.38-7.51 (m, 2 H) 7.64-7.79 (m, 2 H) 8.03 (d, J = 8.19 Hz, 1 H) 8.65 (d, J = 4.40 Hz, 1 H) |

TABLE 5-continued

Preparation examples of compounds of formula (I). The numbering system used to describe the positions of X and Y is shown for the purposes of clarity only.

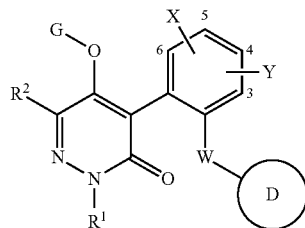

(I)

| Cmpd No. | R¹ | R² | G | X | Y | W | D | NMR details |
|---|---|---|---|---|---|---|---|---|
| 2.034 | —Me | —Me | —H | 6-F | 3-Cl | (E)-CH=CH— | 2-methyl-6-quinolyl- | ¹H NMR (400 MHz, Solvent) δ ppm 1.11 (t, J = 7.15 Hz, 6 H) 2.23 (s, 3 H) 2.63-2.71 (m, 1 H) 2.74 (s, 3 H) 3.69 (s, 3 H) 6.81 (d, J = 16.38 Hz, 1 H) 7.04 (t, J = 8.68 Hz, 1 H) 7.15 (d, J = 16.51 Hz, 1 H) 7.27 (s, 1 H) 7.45 (dd, J = 8.86, 5.07 Hz, 1 H) 7.63 (d, J = 1.71 Hz, 1 H) 7.75-7.81 (m, 1 H) 7.94 (d, J = 8.80 Hz, 1 H) 8.01 (d, J = 8.31 Hz, 1 H) |
| 3.030 | —Me | —Me | —(C=O)iPr | 6-F | 3-Cl | —CH₂—CH₂— | 2-methyl-1,2,3,4-tetrahydroquinolin-6-yl- | ¹H NMR (400 MHz, Solvent) δ ppm 0.96 (dd, J = 7.03, 2.02 Hz, 6 H) 1.25 (d, J = 6.24 Hz, 3 H) 1.58-1.69 (m, 1 H) 1.90-1.98 (m, 1 H) 2.24 (s, 3 H) 2.54 (dt, J = 13.94, 6.97 Hz, 1 H) 2.63-2.84 (m, 6 H) 3.39 (td, J = 6.51, 3.12 Hz, 1 H) 3.83 (s, 3 H) 6.52 (br d, J = 6.48 Hz, 1 H) 6.72-6.79 (m, 2 H) 6.96 (t, J = 8.62 Hz, 1 H) 7.40 (dd, J = 8.80, 5.14 Hz, 1 H) |
| 3.034 | —Me | —Me | —(C=O)iPr | 6-F | 3-Cl | —CH₂—CH₂— | 2-methyl-6-quinolyl- | ¹H NMR (400 MHz, Solvent) δ ppm 0.97 (dd, J = 6.97, 4.40 Hz, 6 H) 2.24 (s, 3 H) 2.47-2.57 (m, 1 H) 2.73 (s, 3 H) 2.79-3.09 (m, 4 H) 3.84 (s, 3 H) 7.00 (t, J = 8.62 Hz, 1 H) 7.25 (d, J = 8.31 Hz, 1 H) 7.49 (d, J = 1.10 Hz, 3 H) 7.90 (d, J = 8.44 Hz, 1 H) 7.96 (d, J = 8.31 Hz, 1 H) |
| 4.034 | —Me | —Me | —(C=O)iPr | 6-F | 3-Cl | (E)-CH=CH— | 2-methyl-6-quinolyl- | ¹H NMR (400 MHz, Solvent) δ ppm 2.24 (s, 3 H) 2.66 (s, 3 H) 3.66 (s, 3 H) 6.72 (d, J = 16.38 Hz, 1 H) 6.93-7.07 (m, 2 H) 7.26 (s, 1 H) 7.38 (dd, J = 8.93, 5.14 Hz, 1 H) 7.55 (d, J = 1.71 Hz, 1 H) 7.66 (dd, J = 8.80, 1.96 Hz, 1 H) 7.84 (d, J = 8.80 Hz, 1 H) 7.99 (d, J = 8.44 Hz, 1 H) |
| 1.339 | —Me | —Me | —H | 6-F | 3-Cl | —CH₂—CH₂— | 2-methyl-5-1,3-benzothiazolyl- | ¹H NMR (500 MHz, chloroform) δ ppm 7.64 (d, J = 8.1 Hz, 1H), 7.52 (br s, 1H), 7.19 (dd, J = 5.1, 8.6 Hz, 1H), 7.01 (br d, J = 8.1 Hz, 1H), 6.92 |

TABLE 5-continued

Preparation examples of compounds of formula (I). The numbering system used to describe the positions of X and Y is shown for the purposes of clarity only.

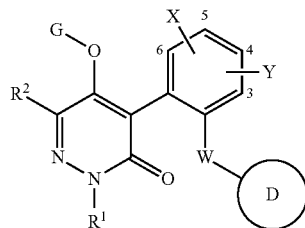

(I)

| Cmpd No. | R¹ | R² | G | X | Y | W | D | NMR details |
|---|---|---|---|---|---|---|---|---|
| | | | | | | | | (t, J = 8.6 Hz, 1H), 3.80 (s, 3H), 2.90-2.74 (m, 4H), 2.69 (s, 3H), 2.32 (s, 3H) |
| 1.340 | —Me | —Me | —H | 6-F | 3-Cl | —CH₂—CH₂— | 2,2-dimethyl-6-3H-benzofuranyl- | ¹H NMR (400 MHz, methanol) δ ppm 7.50 (dd, J = 5.1, 8.8 Hz, 1H), 7.08 (t, J = 8.8 Hz, 1H), 6.97 (d, J = 7.5 Hz, 1H), 6.44 (dd, J = 1.2, 7.5 Hz, 1H), 6.29 (d, J = 1.2 Hz, 1H), 3.73 (s, 3H), 2.93 (s, 2H), 2.79-2.50 (m, 4H), 2.33 (s, 3H), 1.41 (s, 6H) |
| 1.341 | —Me | —Me | —H | 6-F | 3-Cl | —CH₂—CH₂— | 2-methyl-6-1,3-benzoxazolyl- | ¹H NMR (400 MHz, DMSO-d6) δ ppm 10.83 (br.s, 1H), 7.54 (dd, J = 5.2, 8.9 Hz, 1H), 7.50 (d, J = 8.1 Hz, 1H), 7.24 (d, J = 1.4 Hz, 1H), 7.22 (t, J = 8.9 Hz, 1H), 6.96 (dd, J = 1.4, 8.1 Hz, 1H), 3.61 (s, 3H), 2.87-2.66 (m, 4H), 2.57 (s, 3H), 2.25 (s, 3H) |
| 1.342 | —Me | —Me | —H | 6-F | 3-Cl | —CH₂—CH₂— | 2,2-difluoro-5-1,3-benzodioxolyl- | ¹H NMR (400 MHz, chloroform) δ ppm 7.38 (dd, J = 8.8, 5.1 Hz, 1H), 6.94 (t, J = 8.8 Hz, 1H), 6.87 (d, J = 8.1 Hz, 1H), 6.70-6.63 (m, 2H), 3.68 (s, 3H), 2.76-2.65 (m, 4H), 2.26 (s, 3H) |
| 1.344 | —Me | —Me | —H | 6-F | 3-Cl | —CH₂—CH₂— | 1-methyl-3-indazolyl- | ¹H NMR (400 MHz, DMSO-d6) δ ppm 10.86 (s, 1H), 7.59-7.53 (m, 2H), 7.34 (t, J = 7.2 Hz, 1H), 7.27-7.21 (m, 2H), 7.02 (t, J = 7.2 Hz, 1H), 3.93 (s, 3H), 3.58 (s, 3H), 2.99-2.92 (m, 2H), 2.87-2.83 (m, 2H), 2.23 (s. 3H) |
| 1.345 | —Me | —Me | —H | 6-F | 3-Cl | —CH₂—CH₂— | 1-methyl-5-pyrrolo[2,3-b]pyridinyl- | ¹H NMR (400 MHz, methanol) δ ppm 8.12 (d, J = 1.7 Hz, 1H), 7.95 (d, J = 1.7 Hz, 1H), 7.52 (d, J = 3.5 Hz, 1H), 7.46 (dd, J = 5.1, 8.8 Hz, 1H), 7.10 (t, J = 8.8 Hz, 1H), 6.64 (d, J = 3.5 Hz, 1H), 3.93 (s, 3H), 3.63 (s, 3H), 3.11-2.99 (m, 2H), 2.98-2.82 (m, 2H), 2.30 (s, 3H) |
| 1.346 | —Me | —Me | —H | 6-F | 3-Cl | —CH₂—CH₂— | 5-benzofuranyl- | ¹H NMR (400 MHz, DMSO-d6) δ ppm 10.82 (s, 1H), 7.93 (d, J = 1.8 Hz,1H), 7.57-7.53 (m, 1H), 7.45 (d, J = 8.4 |

TABLE 5-continued

Preparation examples of compounds of formula (I). The numbering system used to describe the positions of X and Y is shown for the purposes of clarity only.

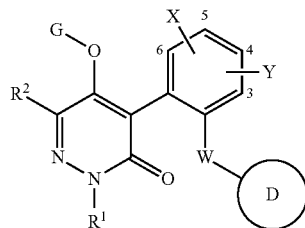

(I)

| Cmpd No. | R¹ | R² | G | X | Y | W | D | NMR details |
|---|---|---|---|---|---|---|---|---|
| | | | | | | | | Hz, 1H), 7.28 (br. s, 1H), 7.21 (t, J = 8.5 Hz, 1H), 6.92 (d, J = 8.4 Hz, 1H), 6.87 (br. s, 1H), 3.61 (s, 3H), 2.76-2.67 (m, 4H), 2.25 (s, 3H) |
| 1.347 | —Me | —Me | —H | 6-F | 3-Cl | —CH$_2$—CH$_2$— | 6-benzothiophenyl- | $^1$H NMR (400 MHz, DMSO-d6) δ ppm 10.83 (s, 1H), 7.87 (d, J = 8.24 Hz, 1H), 7.72 (d, J = 5.4 Hz,1H), 7.58-7.54 (m, 1H), 7.52 (s, 1H), 7.37 (d, J = 5.4 Hz, 1H), 7.22 (t, J = 8.8 Hz, 1H), 7.00 (d, J = 8.24 Hz, 1H), 3.61 (s, 3H), 2.79-2.69 (m, 4H), 2.25 (s. 3H) |
| 1.348 | —Me | —Me | —H | 6-F | 3-Cl | —CH$_2$—CH$_2$— | 5-benzothiophenyl- | $^1$H NMR (400 MHz, DMSO-d6) δ ppm 10.83 (s, 1H), 7.86 (m, 1H), 7.72 (m, 1H), 7.58-7.52 (m, 2H), 7.37 (m, 1H), 7.22 (m, 1H), 7.01-6.98 (m, 1H), 3.61 (s, 3H), 2.79-2.71 (m, 4H), 2.25 (s, 3H) |
| 1.349 | —Me | —Me | —H | 6-F | 3-Cl | —CH$_2$—CH$_2$— | 6-1,3-benzothiazolyl- | $^1$H NMR (400 MHz, DMSO-d6) δ ppm 10.81 (s, 1H), 9.30 (s, 1H), 7.95 (d, J = 8.3 Hz, 1H), 7.81 (s, 1H), 7.57-7.53 (m, 1H), 7.24-7.16 (m, 2H), 3.59 (s, 3H), 2.82-2.73 (m, 4H), 2.24 (s. 3H) |
| 1.351 | —Me | —Me | —H | 6-F | 3-Cl | —CH$_2$—CH$_2$— | 3-methyl-6-1,2-benzoxazolyl- | $^1$H NMR (400 MHz, DMSO-d6) δ ppm 10.81 (s, 1H), 7.70 (d, J = 8.04 Hz, 1H), 7.54 (m, 1H), 7.29 (s, 1H), 7.21 (t, J = 8.7 Hz, 1H), 7.01 (d, J = 8.04 Hz, 1H), 3.60 (s, 3H), 2.86-2.73 (m, 4H), 2.50 (s, 3H), 2.24 (s. 3H) |
| 1.352 | —Me | —Me | —H | 6-F | 3-Cl | —CH$_2$—CH$_2$— | 5-2-oxo-3H-1,3-benzoxazolyl- | $^1$H NMR (400 MHz, methanol) δ ppm 7.49 (dd, J = 5.1, 8.8 Hz, 1H), 7.09 (t, J = 8.8 Hz, 1H), 7.04 (d, J = 8.2 Hz, 1H), 6.74 (dd, J = 1.5, 8.2 Hz, 1H), 6.71 (d, J = 1.5 Hz, 1H), 3.72 (s, 3H), 2.88-2.65 (m, 4H), 2.32 (s, 3H) |
| 1.353 | —Me | —Me | —H | 6-F | 3-Cl | —CH$_2$—CH$_2$— | 6-1-methylindazolyl- | $^1$H NMR (400 MHz, methanol) δ ppm 7.90 (d, J = 1.0 Hz, 1H), 7.58 (dd, J = 0.6, 8.3 Hz, 1H), 7.51 (dd, J = 5.1, 8.8 Hz, |

TABLE 5-continued

Preparation examples of compounds of formula (I). The numbering system used to describe the positions of X and Y is shown for the purposes of clarity only.

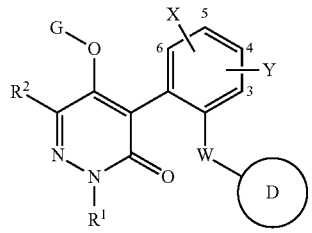

(I)

| Cmpd No. | R¹ | R² | G | X | Y | W | D | NMR details |
|---|---|---|---|---|---|---|---|---|
| | | | | | | | | 1H), 7.10 (br. s, 1H), 7.11 (t, J = 8.8 Hz, 1H), 6.81 (dd, J = 1.0, 8.3 Hz, 1H), 3.98 (s, 3H), 3.68 (s, 3H), 2.99-2.77 (m, 4H), 2.27 (s, 3H) |
| 1.354 | —Me | —Me | —H | 6-F | 3-Cl | —CH$_2$—CH$_2$— | 5-1-methylindazolyl- | $^1$H NMR (400 MHz, methanol) 7.86 (s, 1H), 7.49 (dd, J = 5.1, 8.8 Hz, 1H), 7.38 (d, J = 8.6 Hz, 1H), 7.35 (s, 1H), 7.09 (t, J = 8.8 Hz, 1H), 7.07 (d, J = 8.6 Hz, 1H), 4.00 (s, 3H), 3.70 (s, 3H), 2.92-2.74 (m, 4H), 2.30 (s, 3H) |
| 1.355 | —Me | —Me | —H | 6-F | 3-Cl | —CH$_2$—CH$_2$— | 6-1-methylindolyl- | $^1$H NMR (400 MHz, DMSO-d6) δ ppm 10.85 (s, 1H), 7.58-7.55 (m, 1H), 7.40 (d,1H), 7.23-7.20 (m, 2H), 6.93 (s, 1H), 6.66 (d, 1H), 6.33 (d, 1H), 3.71 (s, 3H), 3.62 (s, 3H), 2.76-2.68 (m, 4H), 2.26 (s, 3H) |
| 1.356 | —Me | —Me | —H | 6-F | 3-Cl | —CH$_2$—CH$_2$— | 5-1-methylindolyl- | $^1$H NMR (400 MHz, DMSO-d6) δ ppm 10.83 (s, 1H), 7.57-7.54 (m, 1H), 7.33-7.29 (m, 1H), 7.26 (d, 1H), 7.21 (t, 1H), 7.15 (s, 1H), 6.76 (d, 1H), 6.31 (d, 1H), 3.73 (s, 3H), 3.61 (s, 3H), 2.72-2.64 (m, 4H), 2.27 (s, 3H) |
| 1.044 | —Me | —Me | —H | 6-F | 3-Cl | —CH$_2$—CH$_2$— | 1-naphthyl- | $^1$H NMR (400 MHz, DMSO-d6) δ ppm 10.96 (s, 1H), 7.91 (d, J = 8.2 Hz, 1H), 7.77 (d, J = 8.2 Hz, 1H), 7.63-7.59 (m, 1H), 7.56 (d, J = 8.4 Hz, 1H), 7.50 (t, J = 7.6 Hz, 1H), 7.44-7.36 (m, 2H), 7.28-7.23 (m, 2H), 3.64 (s, 3H), 3.12-3.03 (m, 2H), 2.80-2.72 (m, 2H), 2.28 (s. 3H) |
| 1.053 | —Me | —Me | —H | 6-F | 3-Cl | —CH$_2$—CH$_2$— | 2-naphthyl- | $^1$H NMR (400 MHz, DMSO-d6) δ ppm 10.85 (s, 1H), 7.86-7.78 (m, 3H), 7.58-7.55 (m, 1H), 7.51-7.42 (m, 3H), 7.23 (t, J = 8.7 Hz, 1H), 7.16-7.14 (1H), 3.61 (s, 3H), 2.88-2.72 (m, 4H), 2.25 (s, 3H) |
| 1.357 | —Me | —Me | —H | 6-F | 3-Cl | —CH$_2$—CH$_2$— | 5-2-oxoindolinyl- | $^1$HNMR (400 MHz, DMSO-d6) 10.82 (br. s, 1H), 10.28 (s, 1H), 7.55 (dd, J = 5.3, 8.7 Hz, 1H), |

TABLE 5-continued

Preparation examples of compounds of formula (I). The numbering system used to describe the positions of X and Y is shown for the purposes of clarity only.

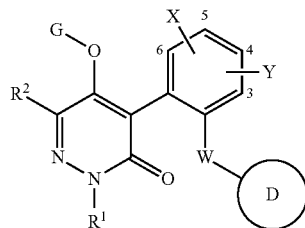

(I)

| Cmpd No. | R[1] | R[2] | G | X | Y | W | D | NMR details |
|---|---|---|---|---|---|---|---|---|
| | | | | | | | | 7.21 (t, J = 8.7 Hz, 1H), 6.85 (br. s, 1H), 6.79 (br.d, J = 7.8 Hz, 1H), 6.68 (d, J = 7.8 Hz, 1H), 3.61 (s, 3H), 3.40 (s, 2H), 2.73-2.52 (m, 4H), 2.26 (s, 3H) |
| 1.358 | —Me | —Me | —H | 6-F | 3-Cl | —CH$_2$—CH$_2$— | 2-methyl-1,3-dioxo-isoindolin-5-yl- | $^1$H NMR (500 MHz, chloroform) δ ppm 7.68 (d, J = 7.6 Hz, 1H), 7.52 (br s, 1H), 7.45 (dd, J = 5.2, 8.7 Hz, 1H), 7.39-7.34 (m, 1H), 7.05 (t, J = 8.7 Hz, 1H), 3.78 (s, 3H), 3.15 (s, 3H), 3.04-2.85 (m, 3H), 2.82-2.71 (m, 1H), 2.32 (s, 3H) |
| 1.359 | —Me | —Me | —H | 6-F | 3-Cl | —CH$_2$—CH$_2$— | 2-1,3-benzoxazolyl- | $^1$H NMR (400 MHz, d6-DMSO), δ ppm 10.81 (s, 1H), 7.65-7.57 (m, 3H), 7.36-7.30 (m, 2H), 7.28-7.23 (t, 1H), 3.53 (s, 3H), 3.09-2.99 (m, 4H), 2.19 (s, 3H) |
| 1.360 | —Me | —Me | —H | 6-F | 3-Cl | —CH$_2$—CH$_2$— | 2-1,3-benzothiazolyl | $^1$H NMR (400 MHz, DMSO-D6) δ ppm 10.85 (br. s, 1H), 8.04-8.02 (d, 1H), 7.91-7.89 (d, 1H), 7.61-7.58 (dd, 1H), 7.49-7.46 (t, 1H), 7.41-7.37 (t, 1H), 7.28-7.23 (t, 1H), 3.57 (s, 3H), 3.26-3.13 (m, 2H), 3.07-2.92 (m, 2H), 2.21 (s, 3H) |
| 2.362 | —Me | —Me | —H | 6-F | 3-Cl | (E)-CH═CH— | 6-2,2-dimethyl-3H-benzofuranyl- | $^1$H NMR (400 MHz, methanol) 7.52 (dd, J = 5.1, 8.8 Hz, 1H), 7.12 (t, J = 8.8 Hz, 1H), 7.05 (d, J = 7.6 Hz, 1H), 6.91 (d, J = 16.4 Hz, 1H), 6.70 (dd, J = 1.3, 7.6 Hz, 1H), 6.62 (s, 1H), 6.47 (d, J = 16.4 Hz, 1H), 3.66 (s, 3H), 2.97 (s, 2H), 2.26 (s, 3H), 1.42 (s, 6H) |
| 2.363 | —Me | —Me | —H | 6-F | 3-Cl | (E)-CH═CH— | 6-imidazo[1,2-a]pyrazinyl- | $^1$H NMR (400 MHz, DMSO-d6) 10.83 (br. s, 1H), 9.06 (s, 1H), 8.55 (d, J = 1.1 Hz, 1H), 8.07 (s, 1H), 7.79 (d, J = 1.1 Hz, 1H), 7.63 (dd, J = 5.3, 8.8 Hz, 1H), 7.48 (d, J = 15.9 Hz, 1H), 7.28 (t, J = 8.8 Hz, 1H), 6.65 (d, J = 15.9 Hz, 1H), 3.56 (s, 3H), 2.20 (s, 3H) |
| 4.342 | —Me | —Me | —(C═O)iPr | 6-F | 3-Cl | (E)-CH═CH— | 2,2-difluoro-5-1,3-benzodioxolyl- | $^1$H NMR (400 MHz, chloroform) δ = 7.43 (dd, J = 5.1, 8.9 Hz, 1H), 7.12 (d, J = 1.6 Hz, 1H), |

TABLE 5-continued

Preparation examples of compounds of formula (I). The numbering system used to describe the positions of X and Y is shown for the purposes of clarity only.

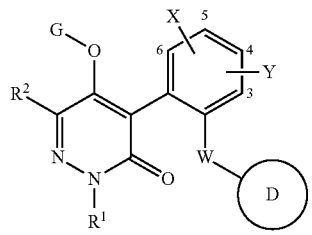

(I)

| Cmpd No. | R¹ | R² | G | X | Y | W | D | NMR details |
|---|---|---|---|---|---|---|---|---|
| | | | | | | | | 7.05-6.95 (m, 3H), 6.91 (d, J = 16.5 Hz, 1H), 6.60 (d, J = 16.5 Hz, 1H), 3.71 (s, 3H), 2.64 (spt, J = 7.0 Hz, 1H), 2.23 (s, 3H), 1.10 (d, J = 7.0 Hz, 3H), 1.07 (d, J = 7.0 Hz, 3H) |

BIOLOGICAL EXAMPLES

B1 Post-Emergence Efficacy—Test 1

Seeds of a variety of test species are sown in standard soil in pots:— *Solanum nigrum* (SOLNI), *Amaranthus retoflexus* (AMARE), *Setaria faberi* (SETFA), *Echinochloa crus-galli* (ECHCG), *Ipomoea hederacea* (IPOHE), *Lolium perenne* (LOLPE). After 8 days cultivation (post-emergence) under controlled conditions in a glasshouse (at 24/16° C., day/night; 14 hours light; 65% humidity), the plants are sprayed with an aqueous spray solution derived from the formulation of the technical active ingredient in acetone/water (50:50) solution containing 0.5% Tween 20 (polyoxyethylene sorbitan monolaurate, CAS RN 9005-64-5). Compounds are applied at 250 g/ha. The test plants are then grown in a glasshouse under controlled conditions in a glasshouse (at 24/16° C., day/night; 14 hours light; 65% humidity) and watered twice daily. After 13 days, the test is evaluated for the percentage damage caused to the plant. The biological activities are assessed on a five point scale (5=80-100%; 4=60-79%; 3=40-59%; 2=20-39%; 1=0-19%). A blank value in the table is indicative that the compound was not tested on that species.

TABLE 6

Control of weed species by compounds of formula (I) after post-emergence application

| Compound | AMARE | SOLNI | SETFA | LOLPE | ECHCG | IPOHE |
|---|---|---|---|---|---|---|
| 1.019 | 4 | 5 | 5 | 5 | 3 | 5 |
| 1.027 | 2 | | 4 | 4 | 4 | 5 |
| 1.028 | 5 | 5 | 5 | 5 | 5 | 5 |
| 1.036 | 5 | 5 | 5 | 5 | 5 | 5 |
| 2.034 | 1 | 5 | 2 | 2 | | 3 |
| 3.030 | 5 | 5 | 5 | 5 | 5 | 5 |
| 3.034 | 4 | 5 | 5 | 5 | 4 | 4 |
| 4.034 | 1 | 5 | 2 | 1 | | 3 |
| 1.357 | 5 | 5 | 5 | 5 | 4 | 5 |
| 4.342 | 0 | 4 | 1 | 2 | 1 | 3 |

B2 Post-Emergence Efficacy—Test 2

Seeds of a variety of test species are sown in standard soil in pots:— *Amaranthus retoflexus* (AMARE), *Setaria faberi* (SETFA), *Echinochloa crus-galli* (ECHCG), *Ipomoea hederacea* (IPOHE), *Zea Mays* (ZEAMX), *Abutilon theophrasti* (ABUTH). After 8 days cultivation (post-emergence) under controlled conditions in a glasshouse (at 24/16° C., day/night; 14 hours light; 65% humidity), the plants are sprayed with an aqueous spray solution derived from the formulation of the technical active ingredient in acetone/water (50:50) solution containing 0.5% Tween 20 (polyoxyethylene sorbitan monolaurate, CAS RN 9005-64-5). Compounds are applied at 250 g/ha. The test plants are then grown in a glasshouse under controlled conditions in a glasshouse (at 24/16° C., day/night; 14 hours light; 65% humidity) and watered twice daily. After 13 days, the test is evaluated for the percentage damage caused to the plant. The biological activities are assessed on a five point scale (5=80-100%; 4=60-79%; 3=40-59%; 2=20-39%; 1=0-19%). A blank value in the table is indicative that the compound was not tested on that species.

TABLE 7

Control of weed species by compounds of formula (I) after post-emergence application

| Compound | AMARE | ZEAMX | SETFA | ABUTH | ECHCG | IPOHE |
|---|---|---|---|---|---|---|
| 1.339 | 4 | 0 | 4 | 3 | 5 | 4 |
| 1.340 | 5 | 5 | 5 | 5 | 5 | 4 |
| 1.341 | 5 | 4 | 4 | 5 | 5 | 5 |
| 1.342 | 5 | 4 | 4 | 5 | 5 | 5 |
| 1.318 | 4 | 2 | 5 | 4 | 4 | 4 |
| 1.344 | 3 | 1 |   | 4 | 2 | 3 |
| 1.345 | 4 | 2 | 4 | 4 | 3 | 4 |
| 1.346 | 2 | 2 | 0 | 4 | 4 | 3 |
| 1.347 | 4 | 4 | 4 | 4 | 4 | 4 |
| 1.348 | 4 | 4 | 4 | 3 | 4 | 4 |
| 1.349 | 4 | 2 | 4 | 4 | 4 | 4 |
| 1.350 | 4 | 3 | 4 | 5 | 4 | 3 |
| 1.351 | 5 | 5 | 4 | 5 | 4 | 5 |
| 1.352 | 4 | 3 | 4 | 4 | 4 | 3 |
| 1.353 | 4 | 3 | 4 | 4 | 4 | 3 |
| 1.354 | 4 | 4 | 4 | 4 | 5 | 4 |
| 1.355 | 4 | 1 | 2 | 3 | 1 | 4 |
| 1.356 | 5 | 2 | 5 | 4 | 4 | 4 |
| 1.044 | 3 | 1 | 0 | 3 | 0 | 4 |
| 1.053 | 4 | 4 | 4 | 3 | 3 | 4 |
| 1.357 | 2 | 5 | 4 | 4 |   | 4 |
| 1.359 | 3 | 1 | 3 | 4 | 3 | 2 |
| 1.361 | 3 | 4 | 5 | 5 | 4 | 5 |
| 2.363 | 1 | 0 | 0 | 0 | 0 | 2 |

B3 Pre-Emergence Efficacy—Test 1

Seeds of a variety of test species were sown in standard soil in pots: *Solanum nigrum* (SOLNI), *Amaranthus retoflexus* (AMARE), *Setaria faberi* (SETFA), *Echinochloa crus-galli* (ECHCG), *Ipomoea hederacea* (IPOHE), *Lolium perenne* (LOLPE). After cultivation for one day (pre-emergence) under controlled conditions in a glasshouse (at 24/16° C., day/night; 14 hours light; 65% humidity), the plants were sprayed with an aqueous spray solution derived from the formulation of the technical active ingredient in acetone/water (50:50) solution containing 0.5% Tween 20 (polyoxyethelyene sorbitan monolaurate, CAS RN 9005-64-5). Compounds are applied at 250 g/ha. The test plants were then grown in a glasshouse under controlled conditions (at 24/16° C., day/night; 14 hours light; 65% humidity) and watered twice daily. After 13 days, the test is evaluated for the percentage damage caused to the plant. The biological activities are assessed on a five point scale (5=80-100%; 4=60-79%; 3=40-59%; 2=20-39%; 1=0-19%). A blank value in the table is indicative that the compound was not tested on that species.

TABLE 8

Control of weed species by compounds of formula (I) after pre-emergence application

| Compound | AMARE | SOLNI | SETFA | LOLPE | ECHCG | IPOHE |
|---|---|---|---|---|---|---|
| 1.019 | 5 | 5 | 4 | 3 | 1 | 1 |
| 1.027 | 1 | 4 | 1 | 3 | 3 | 3 |
| 1.028 | 5 | 5 | 5 | 5 | 1 | 5 |
| 1.036 | 5 | 5 | 5 | 5 | 5 | 5 |
| 2.034 | 1 | 2 | 1 | 1 | 1 | 0 |
| 3.030 | 5 | 5 | 5 | 5 | 5 | 5 |
| 3.034 | 5 | 5 | 5 | 5 | 5 | 2 |
| 4.034 | 0 | 1 | 0 | 0 | 0 | 0 |
| 4.342 | 1 | 3 | 0 | 0 | 0 | 1 |

B4 Pre-Emergence Efficacy—Test 2

Seeds of a variety of test species were sown in standard soil in pots: *Amaranthus retoflexus* (AMARE), *Setaria faberi* (SETFA), *Echinochloa crus-galli* (ECHCG), *Ipomoea hederacea* (IPOHE), *Zea Mays* (ZEAMX), *Abutilon theophrasti* (ABUTH). After cultivation for one day (pre-emergence) under controlled conditions in a glasshouse (at 24/16° C., day/night; 14 hours light; 65% humidity), the plants were sprayed with an aqueous spray solution derived from the formulation of the technical active ingredient in acetone/water (50:50) solution containing 0.5% Tween 20 (polyoxyethelyene sorbitan monolaurate, CAS RN 9005-64-5). Compounds are applied at 250 g/ha. The test plants were then grown in a glasshouse under controlled conditions (at 24/16° C., day/night; 14 hours light; 65% humidity) and watered twice daily. After 13 days, the test is evaluated for the percentage damage caused to the plant. The biological activities are assessed on a five point scale (5=80-100%; 4=60-79%; 3=40-59%; 2=20-39%; 1=0-19%). A blank value in the table is indicative that the compound was not tested on that species.

TABLE 9

Control of weed species by compounds of formula (I) after pre-emergence application

| Compound | AMARE | ZEAMX | SETFA | ABUTH | ECHCG | IPOHE |
|---|---|---|---|---|---|---|
| 1.339 | 5 | 1 | 5 | 4 | 5 | 2 |
| 1.340 | 5 | 3 | 5 | 5 | 5 | 5 |
| 1.341 | 5 | 4 | 5 | 5 | 5 | 5 |
| 1.342 | 5 | 1 | 5 | 4 | 5 |   |
| 1.318 | 5 | 2 | 5 | 3 | 5 | 4 |
| 1.344 | 3 | 0 | 2 | 4 | 2 | 3 |
| 1.345 | 5 | 1 | 5 | 4 | 2 | 5 |
| 1.346 | 3 | 1 | 0 | 4 | 0 | 3 |
| 1.347 | 5 | 3 | 3 | 5 | 2 | 5 |
| 1.348 | 5 | 1 | 3 | 3 | 4 | 5 |
| 1.349 | 5 | 4 | 5 | 4 | 5 | 5 |
| 1.350 | 5 | 4 | 5 | 5 | 5 | 5 |
| 1.351 | 5 | 5 | 5 | 5 | 5 | 5 |
| 1.352 | 5 | 4 | 5 | 4 | 3 | 3 |
| 1.353 | 5 | 4 | 5 | 4 | 5 | 5 |
| 1.354 | 4 | 4 | 5 | 4 | 5 | 5 |
| 1.355 | 3 | 1 | 1 | 0 | 0 | 2 |
| 1.356 | 3 | 0 | 1 | 1 | 1 | 2 |
| 1.044 | 2 | 1 | 0 | 3 | 0 | 3 |
| 1.053 | 4 | 1 | 2 | 2 | 2 | 1 |
| 1.357 | 4 | 1 | 4 | 4 | 4 | 3 |
| 1.359 | 5 | 3 | 5 | 5 | 5 | 4 |
| 1.361 | 4 | 1 | 5 | 5 | 3 | 4 |
| 2.363 | 5 | 2 | 4 | 5 | 5 | 5 |
| 1.339 | 1 | 0 | 1 | 0 | 1 | 0 |

The invention claimed is:
1. A compound of formula (I)

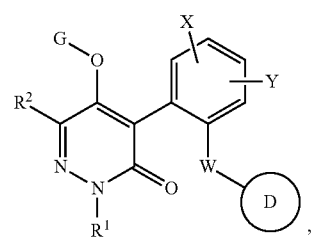

or a salt or N-oxide thereof, wherein $R^1$ is selected from the group consisting of $C_1$-$C_4$alkyl, $C_3$-$C_6$cycloalkyl, $C_3$-$C_6$alkoxy, $C_1$-$C_2$alkoxy-$C_1$-$C_2$alkyl-, $C_2$-$C_4$alkenyl, $C_1$-$C_4$haloalkyl, cyano-$C_1$-$C_4$alkyl, $C_2$-$C_4$haloalkenyl, $C_2$-$C_4$alkynyl and $C_2$-$C_4$haloalkynyl;

$R^2$ is selected from the group consisting of hydrogen, halogen, cyano, $C_1$-$C_6$alkyl, $C_1$-$C_6$haloalkyl, $C_1$-$C_6$haloalkoxy, $C_1$-$C_3$haloalkoxy-$C_1$-$C_3$alkyl-, $C_1$-$C_6$alkoxy, $C_1$-$C_3$alkoxy-$C_1$-$C_3$alkyl-, $C_1$-$C_3$alkoxy-$C_1$-$C_3$alkoxy-$C_1$-$C_3$alkyl-, $C_3$-$C_6$cycloalkyl, $C_2$-$C_6$alkenyl, $C_2$-$C_6$ haloalkenyl, $C_2$-$C_6$alkynyl, $C_1$-$C_6$hydroxyalkyl-, $C_1$-$C_6$alkylcarbonyl-, —S(O)$_m$$C_1$-$C_6$alkyl, amino, $C_1$-$C_6$alkylamino, $C_1$-$C_6$dialkylamino, —C($C_1$-$C_3$alkyl)=N—O—$C_1$-$C_3$alkyl and $C_2$-$C_6$ haloalkynyl;

G is hydrogen, or C(O)$R^3$;

$R^3$ is selected from the group consisting of $C_1$-$C_6$alkyl, $C_2$-$C_6$alkenyl, $C_2$-$C_6$alkynyl, $C_1$-$C_6$alkyl-S—, $C_1$-$C_6$alkoxy, —NR$^4$R$^5$ and phenyl optionally substituted by one or more $R^6$;

each $R^4$ and $R^5$ are independently selected from the group consisting of hydrogen, $C_1$-$C_6$ alkyl, $C_1$-$C_6$ alkoxy, and $C_3$-$C_6$cycloalkyl, or $R^4$ and $R^5$ together can form a morpholinyl ring; and, $R^6$ is selected from the group consisting of halogen, cyano, nitro, $C_1$-$C_3$alkyl, $C_1$-$C_3$haloalkyl, $C_1$-$C_3$alkoxy and $C_1$-$C_3$haloalkoxy;

X and Y are each independently hydrogen, $C_1$-$C_3$alkyl, cyclopropyl, $C_1$-$C_3$alkoxy, $C_1$-$C_3$haloalkyl, $C_1$-$C_3$haloalkoxy, or halogen;

D is either a substituted or unsubstituted naphthalene ring system, or a substituted or unsubstituted 8-10 membered bicyclic saturated, partially saturated or unsaturated, heterocyclic ring system containing 1, 2, 3, or 4 heteroatoms independently selected from oxygen, nitrogen and sulphur, and wherein when D is substituted it is substituted on at least one ring carbon atom with $R^8$ and/or on at least one ring nitrogen atom by $R^9$;

each $R^8$ is independently oxygen, hydroxyl, halogen, cyano, $C_1$-$C_6$alkyl, $C_1$-$C_6$haloalkyl, $C_3$-$C_6$-cycloalkyl, $C_1$-$C_6$alkoxy, $C_1$-$C_6$haloalkoxy, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_2$-$C_6$alkenyl, $C_2$-$C_6$haloalkenyl, $C_2$-$C_6$alkynyl, $C_2$-$C_6$haloalkynyl, $C_1$-$C_6$hydroxyalkyl-, $C_1$-$C_6$alkylcarbonyl-, $C_1$-$C_6$haloalkylcarbonyl-, $C_3$-$C_6$cycloalkylcarbonyl-, $C_1$-$C_6$alkyl-S(O)$_m$—, —S(O)$_m$—$C_1$-$C_6$haloalkyl, —S(O)$_m$—$C_3$-$C_6$cycloalkyl, —O—S(O)$_2$$C_1$-$C_3$alkyl, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, —NR$^4$R$^5$, —C(($C_1$-$C_3$alkyl)=N—O—$C_1$-$C_3$alkyl, —C(S)NH$_2$, $C_1$-$C_6$alkylaminothiocarbonyl-, di($C_1$-$C_6$alkyl)aminothiocarbonyl-, $C_3$-$C_6$-cycloalkylamino-thiocarbonyl-S(O)$_2$NH$_2$, —S(O)$_2$NHC(O)$C_1$-$C_3$alkyl, $C_1$-$C_6$alkylaminosulfonyl-, di($C_1$-$C_6$alkyl)aminosulfonyl-, $C_3$-$C_6$-cycloalkylamino-sulfonyl-, —C(O)OH, —C(O)O$C_1$-$C_6$alkyl, —C(O)NHS—(O)$_2$$C_1$-$C_6$alkyl, —C(O)NR$^4$R$^5$, —NR$^4$C(O)NR$^4$R$^5$, $C_1$-$C_6$alkylcarbonyl($C_1$-$C_6$alkyl)amino-, $C_1$-$C_6$haloalkylcarbonylamino-, $C_1$-$C_6$haloalkylcarbonyl($C_1$-$C_6$alkyl)amino-, $C_1$-$C_6$alkoxycarbonylamino-, $C_1$-$C_6$alkoxycarbonyl($C_1$-$C_6$alkyl)amino-, $C_1$-$C_6$alkylsulfonylamino-, $C_1$-$C_6$alkylsulfonyl($C_1$-$C_6$alkyl)amino-, $C_1$-$C_6$haloalkylsulfonylamino-, $C_1$-$C_6$haloalkylsulfonyl($C_1$-$C_6$alkyl)amino-, $C_3$-$C_6$cycloalkylsulfonylamino-, $C_3$-$C_6$cycloalkylsulfonyl($C_1$-$C_6$alkyl)amino-, $C_1$-$C_6$alkylaminocarbonylamino-, $C_1$-$C_6$alkylaminocarbonyl($C_1$-$C_6$alkyl)amino, di($C_1$-$C_6$alkyl)aminocarbonylamino-, $C_1$-$C_6$haloalkylaminocarbonylamino-, $C_1$-$C_6$haloalkylamino-carbonyl($C_1$-$C_6$alkyl)amino, di($C_1$-$C_6$haloalkyl)aminocarbonylamino-, di($C_1$-$C_6$haloalkyl)amino-carbonyl($C_1$-$C_6$alkyl)amino-, hydroxyamino-, hydroxy($C_1$-$C_6$alkyl)amino, $C_1$-$C_6$alkoxyamino-, $C_1$-$C_6$alkoxy($C_1$-$C_6$alkyl)amino, $C_1$-$C_6$haloalkoxyamino, $C_1$-$C_6$haloalkoxy($C_1$-$C_6$alkyl) amino; or a ring system selected from the group consisting: of a phenyl ring, a 5-6-membered heteroaryl ring and a 3-6-membered heterocyclyl ring, wherein said ring system is substituted by 0 to 5 $R^{16}$;

m is an integer of 0, 1, or 2;

each $R^9$ is independently $C_1$-$C_6$alkyl, $C_1$-$C_6$haloalkyl, hydroxyl, $C_1$-$C_4$alkoxy, $C_1$-$C_4$alkylthio, $C_3$-$C_6$-cycloalkyl, $C_1$-$C_3$alkoxy-$C_1$-$C_3$alkyl, $C_1$-$C_3$haloalkoxy-$C_1$-$C_3$alkyl-, $C_1$-$C_3$alkoxy-$C_1$-$C_3$alkoxy-$C_1$-$C_3$alkyl-, $C_1$-$C_6$hydroxyalkyl-, —$C_1$-$C_3$alkyl-S(O)$_m$—$C_1$-$C_6$alkyl, —$C_1$-$C_3$alkyl-S(O)$_m$—$C_1$-$C_6$haloalkyl, —$C_1$-$C_3$alkyl-S(O)$_m$—$C_3$-$C_6$cycloalkyl, cyano-$C_1$-$C_6$-alkyl-, or a ring system selected from the group consisting of: a phenyl ring, a 5-6-membered heteroaryl ring and a 3-6-membered heterocyclyl ring, wherein said ring system is substituted by 0 to 5 $R^{16}$;

each $R^{16}$ is independently halogen, cyano, $C_1$-$C_6$alkyl, $C_1$-$C_6$haloalkyl, $C_1$-$C_6$alkoxy or $C_1$-$C_6$haloalkoxy; and, W is

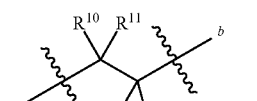

W1

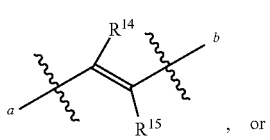

W2

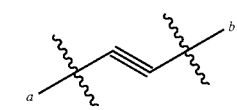

W3 wherein

"a" denotes the point of attachment to the phenyl-pyridazinone/phenyl-pyridazine dione moiety, "b" denotes the point of attachment to ring D, $R^{10}$, $R^{12}$, $R^{14}$ and $R^{15}$ are each independently hydrogen, $C_1$-$C_3$alkyl, or $C_1$-$C_3$haloalkyl; or $R^{10}$ and $R^{12}$ together with the carbon atoms to which they are joined form a $C_3$-$C_6$ carbocyclic ring; and $R^{11}$ and $R^{13}$ are each independently hydrogen, halogen, $C_1$-$C_3$alkyl, or $C_1$-$C_3$haloalkyl, provided that when one of $R^{11}$ or $R^{13}$ is halogen, $C_1$-$C_3$alkyl or $C_1$-$C_3$ haloalkyl, the other is hydrogen.

2. The compound according to claim 1, wherein G is hydrogen or C(O)$R^3$ wherein $R^3$ is isopropyl, t-butyl, methyl, ethyl, propargyl, methoxy, ethoxy, or tert-butoxy.

3. The compound to claim 1, wherein X is hydrogen, halogen, or $C_1$haloalkyl.

4. The compound to claim 1, wherein Y is hydrogen, $C_1$-$C_3$ alkyl, cyclopropyl, $C_1$-$C_3$haloalkyl, or halogen.

5. The compound according to claim 1, wherein X is ortho with respect to the pyrdazinone/pyridazine-dione moiety.

6. The compound according to claim 1, wherein Y is ortho with respect to the —W-D moiety.

7. The compound according to claim 1, wherein $R^1$ is methyl, ethyl, n-propyl, cyclopropyl, propargyl, or $C_1$haloalkyl.

8. The compound according to claim 1, wherein $R^2$ is selected from the group consisting of hydrogen, halogen, $C_1$-$C_6$alkyl, $C_1$-$C_6$haloalkyl, $C_1$-$C_6$alkoxy, $C_1$-$C_3$alkoxy-$C_1$-$C_3$alkyl, $C_3$-$C_6$cycloalkyl, $C_2$-$C_6$ alkenyl, $C_2$-$C_6$haloalkenyl, $C_2$-$C_6$alkynyl and $C_2$-$C_6$haloalkynyl.

9. The compound according to claim 1, wherein D is a substituted or unsubstituted naphthalene, indolizine, indole, iso-indole, indoline, isoindoline, 3-H-indole, benzofuran, benzothiophene, 1H-indazole, benzimidazole, benzthiazole, benzoxazole, benzodioxole, purine, 4H-quinolizine, quinoline, isoquinoline, tetrahydroquinoline, cinnoline, phthalazine, quinoxaline, 1-8-naphthyridine, pteridine, 1H-pyrrolo[2,3-b]pyridine, imidazo[1,2-a]pyrazine or 1H-benzotriazole ring system and wherein when D is substituted, it is substituted on at least one ring carbon atom by $R^8$ and/or on at least one ring nitrogen atom by $R^9$.

10. The compound according to claim 1, wherein D is a substituted or unsubstituted naphthalene, indolizine, indole, iso-indole, 3-H-indole, benzofuran, benzothiophene, 1H-indazole, benzimidazole, benzthiazole, benzoxazole, purine, 4H-quinolizine, quinoline, isoquinoline, tetrahydroquinoline, cinnoline, phthalazine, quinoxaline, 1-8-naphthyridine, or pteridine ring system, and wherein when D is substituted, it is substituted on at least one ring carbon atom by $R^8$ and/or on at least one ring nitrogen atom by $R^9$.

11. The compound according to claim 1, wherein each $R^8$ is independently oxygen, hydroxyl, halogen, cyano, $C_1$-$C_6$alkyl, $C_1$-$C_6$haloalkyl, $C_1$-$C_6$haloalkoxy, $C_1$-$C_3$haloalkoxy-$C_1$-$C_3$alkyl-, $C_1$-$C_6$alkoxy, $C_1$-$C_3$alkoxy-$C_1$-$C_3$alkyl, $C_1$-$C_3$alkoxy-$C_1$-$C_3$alkoxy-$C_1$-$C_3$alkyl-, $C_3$-$C_6$cycloalkyl, $C_2$-$C_6$ alkenyl, $C_2$-$C_6$ haloalkenyl, $C_2$-$C_6$ alkynyl, $C_1$-$C_6$hydroxyalkyl-, $C_1$-$C_6$alkylcarbonyl-, $C_1$-$C_6$alkyl-S(O)$_m$—, amino, $C_1$-$C_6$alkylamino, $C_1$-$C_6$dialkylamino, —C($C_1$-$C_3$alkyl)=N—O—$C_1$-$C_3$alkyl or $C_2$-$C_6$ haloalkynyl.

12. The compound according to claim 1, wherein each $R^9$ is independently $C_1$-$C_4$alkyl, $C_1$-$C_4$haloalkyl, hydroxyl, $C_1$-$C_4$alkoxy, or $C_1$-$C_4$alkylthio.

13. The compound according to claim 1, wherein W is W1 and each of $R^{10}$, $R^{11}$, $R^{12}$, and $R^{13}$ is hydrogen.

14. The compound according to claim 1, wherein W is W2 and each of $R^{14}$ and $R^{15}$ is hydrogen.

15. The compound according to claim 1, wherein W is cis

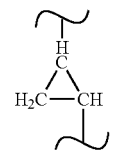

or trans

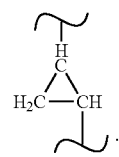

16. A herbicidal composition comprising a herbicidal compound according to claim 1 and an agriculturally acceptable formulation adjuvant.

17. A herbicidal composition according to claim 16, further comprising at least one additional pesticide.

18. A herbicidal composition according to claim 17, wherein the additional pesticide is a herbicide or herbicide safener.

19. A method of controlling unwanted plant growth, comprising applying a compound of formula (I) as defined in claim 1, to the unwanted plants or to the locus thereof.

20. A method of controlling unwanted plant growth, comprising applying an herbicidal composition according to claim 16, to the unwanted plants or to the locus thereof.

21. A compound of formula (I),

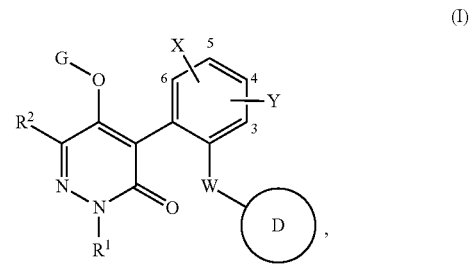

(I)

as defined by the below table

| # | $R^1$ | $R^2$ | G | X | Y | W | D |
|---|---|---|---|---|---|---|---|
| 1 | —Me | —Me | —H | 6-F | 3-Cl | —CH$_2$—CH$_2$— | 1,2,3,4-tetrahydro-quinolin-6-yl- |
| 2 | —Me | —Me | —H | 6-F | 3-Cl | —CH$_2$—CH$_2$— | 1H-indol-5-yl- |
| 3 | —Me | —Me | —H | 6-F | 3-Cl | —CH$_2$—CH$_2$— | 2-(trifluoromethyl)-4-quinolyl- |
| 4 | —Me | —Me | —H | 6-F | 3-Cl | —CH$_2$—CH$_2$— | 2-ethyl-1,3-benzoxazol-6-yl- |
| 5 | —Me | —Me | —H | 6-F | 3-Cl | —CH$_2$—CH$_2$— | 4-quinolyl- |
| 6 | —Me | —Me | —H | 6-F | 3-Cl | (E)—CH=CH— | 2-methyl-6-quinolyl- |
| 7 | —Me | —Me | —(C=O)iPr | 6-F | 3-Cl | —CH$_2$—CH$_2$— | 2-methyl-1,2,3,4-tetrahydroquinolin-6-yl- |
| 8 | —Me | —Me | —(C=O)iPr | 6-F | 3-Cl | —CH$_2$—CH$_2$— | 2-methyl-6-quinolyl- |

-continued

| # | R¹ | R² | G | X | Y | W | D |
|---|----|----|---|---|---|---|---|
| 9 | —Me | —Me | —(C=O)iPr | 6-F | 3-Cl | (E)—CH=CH— | 2-methyl-6-quinolyl- |
| 10 | —Me | —Me | —H | 6-F | 3-Cl | —CH₂—CH₂— | 2-methyl-5-1,3-benzothiazolyl- |
| 11 | —Me | —Me | —H | 6-F | 3-Cl | —CH₂—CH₂— | 2,2-dimethyl-6-3H-benzofuranyl- |
| 12 | —Me | —Me | —H | 6-F | 3-Cl | —CH₂—CH₂— | 2-methyl-6-1,3-benzoxazolyl- |
| 13 | —Me | —Me | —H | 6-F | 3-Cl | —CH₂—CH₂— | 2,2-difluoro-5-1,3-benzodioxolyl- |
| 14 | —Me | —Me | —H | 6-F | 3-Cl | —CH₂—CH₂— | 1-methyl-3-indazolyl- |
| 15 | —Me | —Me | —H | 6-F | 3-Cl | —CH₂—CH₂— | 1-methyl-5-pyrrolo[2,3-b]pyridinyl- |
| 16 | —Me | —Me | —H | 6-F | 3-Cl | —CH₂—CH₂— | 5-benzofuranyl- |
| 17 | —Me | —Me | —H | 6-F | 3-Cl | —CH₂—CH₂— | 6-benzothiophenyl- |
| 18 | —Me | —Me | —H | 6-F | 3-Cl | —CH₂—CH₂— | 5-benzothiophenyl- |
| 19 | —Me | —Me | —H | 6-F | 3-Cl | —CH₂—CH₂— | 6-1,3-benzothiazolyl- |
| 20 | —Me | —Me | —H | 6-F | 3-Cl | —CH₂—CH₂— | 3-methyl-6-1,2-benzoxazolyl- |
| 21 | —Me | —Me | —H | 6-F | 3-Cl | —CH₂—CH₂— | 5-2-oxo-3H-1,3-benzoxazolyl- |
| 22 | —Me | —Me | —H | 6-F | 3-Cl | —CH₂—CH₂— | 6-1-methylindazolyl- |
| 23 | —Me | —Me | —H | 6-F | 3-Cl | —CH₂—CH₂— | 5-1-methylindazolyl- |
| 24 | —Me | —Me | —H | 6-F | 3-Cl | —CH₂—CH₂— | 6-1-methylindolyl- |
| 25 | —Me | —Me | —H | 6-F | 3-Cl | —CH₂—CH₂— | 5-1-methylindolyl- |
| 26 | —Me | —Me | —H | 6-F | 3-Cl | —CH₂—CH₂— | 1-naphthyl- |
| 27 | —Me | —Me | —H | 6-F | 3-Cl | —CH₂—CH₂— | 2-naphthyl- |
| 28 | —Me | —Me | —H | 6-F | 3-Cl | —CH₂—CH₂— | 5-2-oxoindolinyl- |
| 29 | —Me | —Me | —H | 6-F | 3-Cl | —CH₂—CH₂— | 2-methyl-1,3-dioxo-isoindolin-5-yl- |
| 30 | —Me | —Me | —H | 6-F | 3-Cl | —CH₂—CH₂— | 2-1,3-benzoxazolyl- |
| 31 | —Me | —Me | —H | 6-F | 3-Cl | —CH₂—CH₂— | 2-1,3-benzothiazolyl |
| 32 | —Me | —Me | —H | 6-F | 3-Cl | (E)—CH=CH— | 6-2,2-dimethyl-3H-benzofuranyl- |
| 33 | —Me | —Me | —H | 6-F | 3-Cl | (E)—CH=CH— | 6-imidazo[1,2-a]pyrazinyl- |
| 34 | —Me | —Me | —(C=O)iPr | 6-F | 3-Cl | (E)—CH=CH— | 2,2-difluoro-5-1,3-benzodioxolyl-. |

* * * * *